United States Patent
Sasaki et al.

(10) Patent No.: US 8,576,514 B2
(45) Date of Patent: Nov. 5, 2013

(54) THIN-FILM MAGNETIC HEAD, METHOD OF MANUFACTURING THE SAME, HEAD GIMBAL ASSEMBLY, AND HARD DISK DRIVE

(75) Inventors: Yoshitaka Sasaki, Milpitas, CA (US); Hiroyuki Ito, Milpitas, CA (US); Shigeki Tanemura, Milpitas, CA (US); Kazuki Sato, Milpitas, CA (US); Atsushi Iijima, Shatin (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/328,431

(22) Filed: Dec. 16, 2011

(65) Prior Publication Data
US 2013/0155550 A1   Jun. 20, 2013

(51) Int. Cl.
*G11B 5/127*   (2006.01)
(52) U.S. Cl.
USPC ............................................ 360/125.3
(58) Field of Classification Search
USPC ........................................ 360/125.02, 125.3
See application file for complete search history.

(56) References Cited

U.S. PATENT DOCUMENTS

| | | | |
|---|---|---|---|
| 6,156,375 A * | 12/2000 | Hu et al. | 427/116 |
| 6,721,138 B1 * | 4/2004 | Chen et al. | 360/317 |
| 7,889,456 B2 * | 2/2011 | Jiang et al. | 360/125.08 |
| 7,920,358 B2 * | 4/2011 | Jiang et al. | 360/125.17 |
| 8,218,264 B1 * | 7/2012 | Sasaki et al. | 360/125.16 |
| 8,243,386 B2 * | 8/2012 | Kameda et al. | 360/125.09 |
| 8,277,669 B1 * | 10/2012 | Chen et al. | 216/22 |
| 8,289,649 B2 * | 10/2012 | Sasaki et al. | 360/125.13 |
| 8,310,787 B1 * | 11/2012 | Sasaki et al. | 360/125.3 |
| 2008/0266710 A1 * | 10/2008 | Kameda et al. | 360/125.03 |
| 2009/0122445 A1 * | 5/2009 | Jiang et al. | 360/123.12 |
| 2011/0151279 A1 * | 6/2011 | Allen et al. | 428/815 |
| 2012/0125886 A1 * | 5/2012 | Hong et al. | 216/22 |
| 2012/0127611 A1 * | 5/2012 | Min | 360/123.12 |
| 2012/0154951 A1 * | 6/2012 | Hsiao et al. | 360/122 |
| 2012/0236431 A1 * | 9/2012 | Hirata et al. | 360/70 |
| 2012/0257305 A1 * | 10/2012 | Tang et al. | 360/125.03 |
| 2012/0268843 A1 * | 10/2012 | Linville et al. | 360/125.03 |

FOREIGN PATENT DOCUMENTS

| | | |
|---|---|---|
| JP | A-2007-272958 | 10/2007 |
| JP | A-2009-295262 | 12/2009 |
| JP | A-2010-157303 | 7/2010 |
| JP | A-2010-176732 | 8/2010 |

* cited by examiner

*Primary Examiner* — Will J Klimowicz
(74) *Attorney, Agent, or Firm* — Oliff & Berridge, PLC

(57) ABSTRACT

A thin-film magnetic head is constructed such that a main magnetic pole layer, a write shield layer, a gap layer, and a thin-film coil are laminated on a substrate. The thin-film magnetic head has a shield magnetic layer. The shield magnetic layer has a leading shield part. The leading shield part is disposed on a substrate side of the main magnetic pole layer. The leading shield part has a variable distance structure in which a rearmost part most distanced from the medium-opposing surface is distanced more from the main magnetic pole layer than is a foremost part on the main magnetic pole layer side.

12 Claims, 44 Drawing Sheets

Fig.10
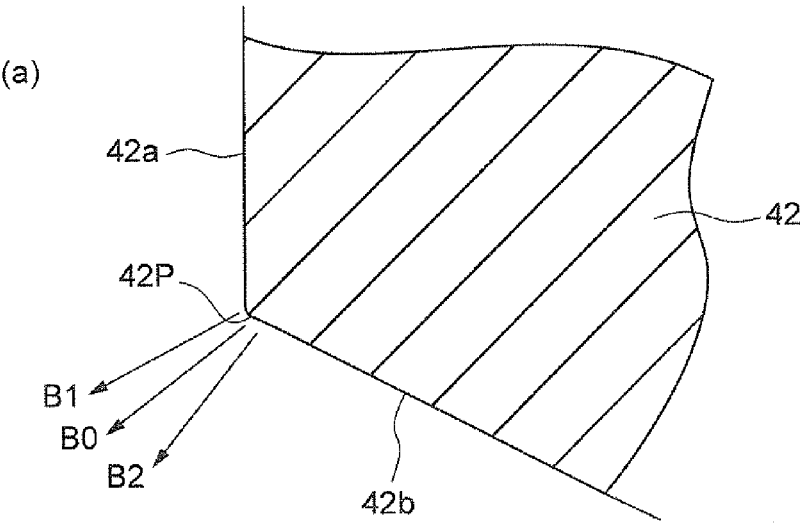
(a)
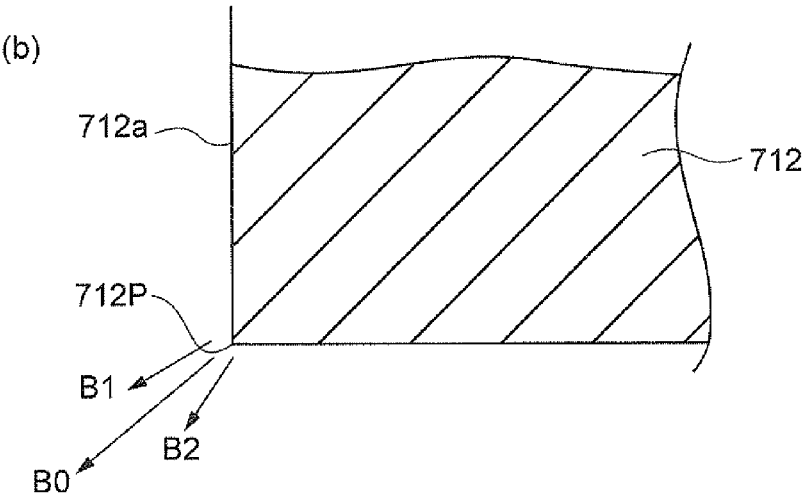
(b)

Fig.42
(a)
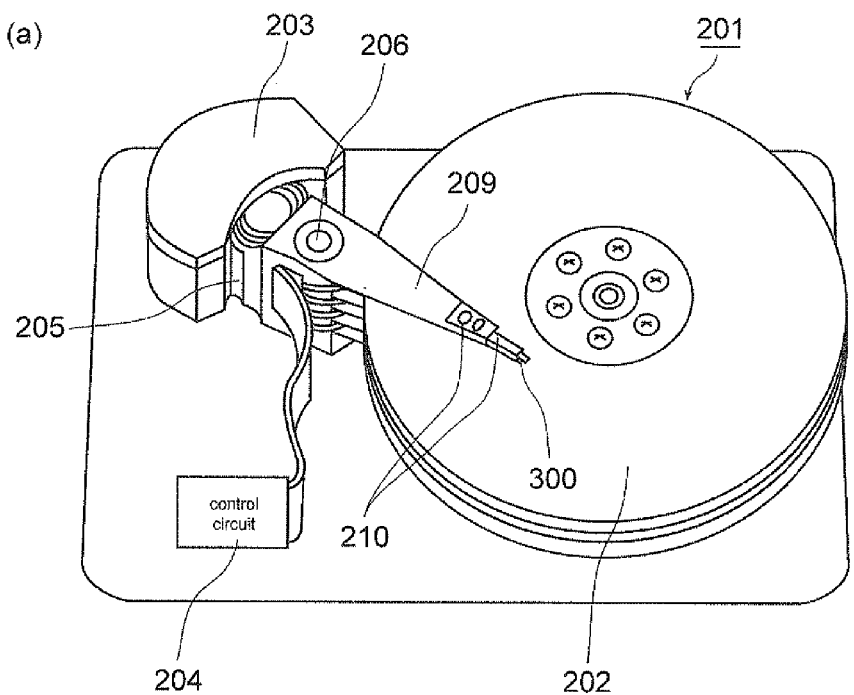
(b)
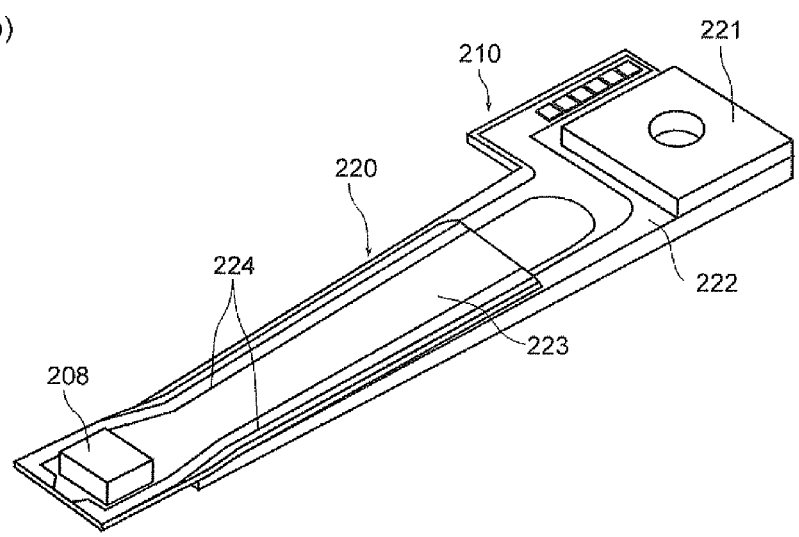

THIN-FILM MAGNETIC HEAD, METHOD OF MANUFACTURING THE SAME, HEAD GIMBAL ASSEMBLY, AND HARD DISK DRIVE

BACKGROUND

1. Field of the Invention

The present invention relates to a thin-film magnetic head which performs a magnetic recording action by a perpendicular magnetic recording scheme, a method of manufacturing the same, a head gimbal assembly, and a hard disk drive.

2. Related Background Art

A hard disk drive has a large recording capacity and is used as the heart of a storage device. The hard disk drive records and reproduces data to/from a hard disk (recording medium) by a thin-film magnetic head.

The thin-film magnetic heads can roughly be classified according to their recording schemes into those of longitudinal magnetic recording type and those of perpendicular magnetic recording type. The longitudinal magnetic recording scheme records data in a (longitudinal) direction within a recording surface of a hard disk (recording medium), while the perpendicular magnetic recording scheme records data such that the direction of recording magnetization formed in the hard disk is made perpendicular to the recording surface. The thin-film magnetic heads of perpendicular magnetic recording type have been considered more promising than those of longitudinal magnetic recording type, since they can realize a much higher recording density than that in the longitudinal magnetic recording scheme, while their recorded hard disks are less susceptible to heat fluctuation.

Meanwhile, a conventional magnetic head of perpendicular magnetic recording type (perpendicular magnetic recording head which will also be referred to as "PMR" in the following) has a magnetic pole layer and a thin-film coil. The PMR has a structure of electromagnet which the thin-film coil are wound around the magnetic pole layer.

As the conventional PMR, PMRs each including a shield layer on a trailing side of a main magnetic pole layer are disclosed, for example, in JP 2007-272958 (referred to also as Patent Document 1), JP 2010-176732 (referred to also as Patent Document 2), JP 2010-157303 (referred to also as Patent Document 3), JP 2009-295262 (referred to also as Patent Document 4) and so on. A PMR 600 illustrated in FIG. 43 is one example of such PMRs.

The PMR 600 has a main magnetic pole layer 601 through which a recording magnetic field along the direction perpendicular to the recording medium passes, a thin-film coil 602 wound around the main magnetic pole layer 601, a recording gap layer 603, and a shield layer 604 opposite to the main magnetic pole layer 601 with the recording gap layer 603 intervening therebetween.

SUMMARY OF THE INVENTION

The conventional PMR causes a current to flow through the thin-film coil, so as to generate a magnetic field, thereby recording data onto the recording medium. In the case of the PMR 600, for example, a current is caused to flow through the thin-film coil 602 so as to record data onto the recording medium.

However, the thin-film coil 602 generates heat when electric current is passed therethrough, and the heat conducts to the coil-insulating layer 605 around the thin-film coil 602. The coil-insulating layer 605 is formed of an organic material such as photoresist or the like and is thus larger in expansion coefficient than the thin-film coil 602. For this reason, when heat is applied, the coil-insulating layer 605 is likely to expand. When the coil-insulating layer 605 expands, the end part on the ABS 606 side of the shield layer 604 is pushed to the side outer than the ABS 606 and protrudes.

Such protrusion of the magnetic pole layer is mainly caused by heat generation of the thin-film coil. Therefore, to suppress the protrusion of the magnetic pole layer, it is sufficient to suppress the heat generation of the thin-film coil. Generally, the heat generated from the conductor through which the electric current flows is called Joule heat and is known to be proportional to the square of the magnitude of electric current and the electric resistance of the conductor (Joule's law). Accordingly, to suppress the heat generation of the thin-film coil, it is sufficient to reduce the electric resistance of the thin-film coil.

To reduce the electric resistance of the thin-film coil, it is sufficient to increase the sectional area of the thin-film coil. To this end, in the case of the PMR 600, for example, there are conceivable measures of widening the width w602 of the thin-film coil 602 or enlarging the thickness h602 of the thin-film coil 602.

However, widening the width w602 makes it difficult to shorten the magnetic path length. The magnetic path length is the length of the magnetic pole layer which the thin-film coil is wound around, and the size of the magnetic path length is affected mainly by a width LX illustrated in FIG. 43.

Incidentally, alternating current is passed through the thin-film coil, and the impedance during this time is proportional to the frequency and the inductance. Therefore, when alternating current having a high frequency is passed through the thin-film coil in order to increase the recording density on the magnetic recording medium, the impedance increases and thereby causes the electric current to hardly flow. To avoid this situation, it is effective to reduce the inductance and shorten the magnetic path length. However, when the width of the thin-film coil is widened, the magnetic path length needs to be increased, resulting in increased inductance of the PMR. This makes it impossible to increase the frequency of the recording signals, failing to increase the recording density on the magnetic recording medium. Further, the magnetic path length needs to be increased even by widening the thickness of the thin-film coil.

On the other hand, in the PMR 600, parts of the coil-insulating layer 605 are formed as coil-insulating layers 605a, 605b at a position closer to the medium-opposing surface 606 than is the thin-film coil 602 and at a position distanced more from the medium-opposing surface 606 than is the thin-film coil 602, respectively. Therefore, the width LX becomes larger by the width of the coil-insulating layer 605a and the width of the coil-insulating layer 605b (the widths in a direction intersecting the medium-opposing surface 606 of about 1.5 μm each, about 3 μm in total).

As a PMR capable of solving such problems, for example, a PMR 700 illustrated in FIG. 44 has been conventionally known. A similar PMR is described also in Patent Document 4. The PMR 700 has an upper thin-film coil 708 and a main magnetic pole layer 710 similar to that of the PMR 600. Besides, the PMR 700 has a lower thin-film coil 718, a shield magnetic layer 720 and insulating layers 731, 732.

In this PMR 700, an upper shield layer has a shield part 701 opposing the main magnetic pole layer 710, a front shield part 703 disposed on a medium-opposing surface 706 side of the upper thin-film coil 708, and a linking shield part 704 straddling the upper thin-film coil 708. Further, a connecting shield part 702 for the front shield part 703 and the opposing shield part 701 is formed. In this PMR 700, since a coil-insulating layer 709 is disposed between adjacent parts of the upper thin-film coils 708 but the coil-insulating layer 709 is not disposed outside the upper thin-film coil 708. Therefore, the magnetic path length can be made shorter than that of the above-described PMR 600.

Further, in the PMR 700, a shield magnetic layer 720 is formed in order to improve Adjacent Track Erasure (ATE).

However, in the PMR 700, the following problems due to the structure of a leading shield part 711 constituting the shield magnetic layer 720 are not solved. As illustrated in FIG. 44, the shield magnetic layer 720 has the leading shield part 711, a lower front shield part 712, a connecting shield part 713, and a linking shield part 714.

The leading shield part 711 is arranged very close to the main magnetic pole layer 710 via a nonmagnetic thin-film 734. In the leading shield part 711, the depth from the medium-opposing surface 706 is formed in a certain size in order to surely ensure a part thereof to be connected to the lower front shield part 712.

Then, in order to surely connect the leading shield part 711 and the lower front shield part 712 and to surely flow the magnetic flux from the leading shield part 711 to the lower front shield part 712 in the PMR 700, it is desirable to make the depth of the leading shield part 711 large.

However, since the leading shield part 711 is arranged very close to the main magnetic pole layer 710 via the nonmagnetic thin-film 734, a larger magnetic material is arranged very close to the main magnetic pole layer 710 as the depth is made larger. The leading shield part 711 is formed using a magnetic material as with the main magnetic pole layer 710 and therefore is high in magnetic permeability so that the magnetic flux easily passes therethrough. Therefore, as the depth of the leading shield part 711 is made larger, the magnetic flux is more likely to leak from the main magnetic pole layer 710 to the leading shield part 711, resulting in a degraded write performance of the PMR.

In consideration such a situation, it is desirable to make the depth of the leading shield part 711 as small as possible.

However, when the depth is made smaller, the size of the part of the leading shield part 711 connected to the lower front shield part 712 is accordingly decreased. Therefore, the path for the magnetic flux from the leading shield part 711 toward the lower front shield part 712 is narrowed, and the saturation of the magnetic flux becomes more likely to occur in the leading shield part 711. This causes the magnetic flux flowing back from the recording medium not to be taken into the leading shield part 47 but remain.

Then, the remaining magnetic flux tends to cause a phenomenon that data recorded on a track adjacent to a track on which data is to be recorded or a track located at a position distanced by about several μm to several tens μm from a track on which data is to be recorded is erased (these phenomena are referred also to as Adjacent Track Erasure (ATE) and Wide Area Track Erasure (WATE)).

The present invention is made to solve the above problem, and it is an object to provide a thin-film magnetic head in which the structure of a leading shield part is improved to be able to improve ATE and WATE, and a method of manufacturing the same and a head gimbal assembly and a hard disk drive.

To solve the above problem, the present invention is a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the shield magnetic layer includes a leading shield part arranged on the substrate side of the main magnetic pole layer and arranged on the medium-opposing surface side of the thin-film coil, and the leading shield part has a variable distance structure in which a rearmost part most distanced from the medium-opposing surface on the main magnetic pole layer side is distanced more from the main magnetic pole layer than is a foremost part closest to the medium-opposing surface on the main magnetic pole layer side.

In case of this thin-film magnetic head, since the leading shield part has the variable distance structure, a gap is ensured between a part of the leading shield part distanced from the medium-opposing surface and the main magnetic pole layer. Therefore, even if the depth of the leading shield part is not narrowed, the size of the magnetic material arranged near the main magnetic pole layer is reduced.

Further, in case of the above-described thin-film magnetic head, it is preferable that the main magnetic pole layer has a lower tilted surface formed in a descending slope like shape closer to the substrate as the lower tilted surface is distanced more from the medium-opposing surface, the leading shield part has an upper tilted surface formed in a descending slope like shape closer to the substrate as the upper tilted surface is distanced more from the medium-opposing surface, and a second formed angle between the upper tilted surface and the medium-opposing surface is formed to be larger than a first formed angle between the lower tilted surface and the medium-opposing surface.

In this thin-film magnetic head, the gap between the leading shield part and the main magnetic pole layer is surely ensured.

Further, in the above-described thin-film magnetic head, it is preferable that the thin-film magnetic head further includes a middle insulating layer arranged between the main magnetic pole layer and the leading shield part and having a variable thickness structure in which a thickness in a direction along the medium-opposing surface becomes larger as the middle insulating layer is distanced more from the medium-opposing surface.

In this thin-film magnetic head, leakage of the magnetic flux from the main magnetic pole layer is surely reduced by the middle insulating layer.

Besides, in case of the above-described thin-film magnetic head, it is preferable that the leading shield part has a front upper tilted surface along the lower tilted surface of the main magnetic pole layer at a position closer to the medium-opposing surface than is the upper tilted surface, and the front upper tilted surface is arranged closer to the main magnetic pole layer than is the upper tilted surface.

In this thin-film magnetic head, by forming the leading shield part in the above-described structure, it becomes unnecessary to decrease the size of the part of the leading shield part arranged in the medium-opposing surface.

Further, it is preferable that the thin-film magnetic head further includes a middle insulating layer having a variable thickness structure in which a thickness in a direction along the medium-opposing surface becomes larger as the middle insulating layer is distanced more from the medium-opposing surface, the middle insulating layer being not arranged between a front upper tilted surface of the leading shield part and the lower tilted surface of the main magnetic pole layer but being arranged between the upper tilted surface and the lower tilted surface.

Further, it is possible that the leading shield part is formed such that a rearmost height including the rearmost part is smaller than a foremost height including the foremost part along the medium-opposing surface.

In case of the above-described thin-film magnetic head, it is possible that a depth of the upper tilted surface along a direction intersecting the medium-opposing surface is formed to be larger than a depth of the front upper tilted surface along the intersecting direction in the leading shield part.

Further, it is preferable that the thin-film magnetic head further includes a base insulating layer formed on a side of a rear surface of the leading shield part distanced from the medium-opposing surface, the middle insulating layer is formed across the leading shield part and the base insulating layer.

Further, it is preferable that the shield magnetic layer includes a lower front shield part disposed on the substrate side of the leading shield part, and a front end angle representing an angle formed between a front end face disposed in the medium-opposing surface of the lower front shield part and a lower end face connected to the front end face and disposed at a position closest to the substrate in the lower front shield part is set at an obtuse angle.

Further, it is preferable that when a part where the front end face and the lower end face of the lower front shield part intersect each other is a front end convex part, the front end convex part corresponds to a convex-shape part where the front end face and the lower end face intersect each other more gently than a case that the front end angle is set at a right angle.

Further, the present invention provides a method of manufacturing a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; a shield magnetic layer forming step of forming the shield magnetic layer, including the following steps (1) to (2):

(1) a first removal step of removing a surface on the main magnetic pole layer side of a leading magnetic part for forming a leading shield part arranged on the substrate side of the main magnetic pole layer and arranged on the medium-opposing surface side of the thin-film coil, to cause an appearing surface to appear in a descending slope like shape closer to the substrate as the appearing surface is distanced more from the medium-opposing surface;

(2) a second removal step of removing a part of the appearing surface most distanced from the medium-opposing surface except the medium-opposing surface side, to form an upper tilted surface formed in a descending slope like shape closer to the substrate as the upper tilted surface is distanced more from the medium-opposing surface.

In case of the above-described method of manufacturing, it is preferable that the method of manufacturing further includes the following steps (3);

(3) a middle insulating layer forming step of forming a middle insulating layer which is in contact with the upper tilted surface of the leading magnetic part and has a variable thickness structure in which a thickness in a direction along the medium-opposing surface becomes larger as the middle insulating layer is distanced more from the medium-opposing surface.

Further, in case of the above-described method of manufacturing, it is preferable that the second removal step is performed by covering the appearing surface on the medium-opposing surface side with a resist pattern, and removing a part of the appearing surface not covered with the resist pattern.

Further, it is preferable that the second removal step is performed by covering the appearing surface on the medium-opposing surface side with a resist pattern, and removing a part of the appearing surface not covered with the resist pattern, the method further includes a middle insulating layer forming step of forming a middle insulating layer which is in contact with the upper tilted surface of the leading magnetic part and has a variable thickness structure in which a thickness in a direction along the medium-opposing surface becomes larger as the middle insulating layer is distanced more from the medium-opposing surface, by forming an insulating layer on a surface of a multilayer body with the resist pattern left.

Further, it is preferable that when covering the appearing surface on the medium-opposing surface side with the resist pattern, a depth of the part of the appearing surface not covered with the resist pattern along a direction intersecting the medium-opposing surface is made larger than a depth of a part of the appearing surface covered with the resist pattern along the intersecting direction.

It is preferable that the method of manufacturing further includes a main magnetic pole layer forming step of forming the main magnetic pole layer on surfaces of the part of the appearing surface on the medium-opposing surface side and the middle insulating layer, via a nonmagnetic thin-film.

Further, it is preferable that the method of manufacturing further includes a conductor layer forming step of forming a conductor layer for forming a substrate side coil layer disposed between the main magnetic pole layer and the substrate, among coil layers constituting the thin-film coil; and an opposing insulating layer forming step of forming an opposing insulating layer having a front end face disposed in the medium-opposing surface by flattening a surface of the conductor layer; the shield magnetic layer forming step further includes a lower front shield part forming step forming a lower front shield part disposed on the substrate side of the main magnetic pole layer and disposed on the medium-opposing surface side of the thin-film coil, in direct contact with a surface of the opposing insulating layer, such that a front end angle becomes an obtuse angle.

Further, it is preferable that the method of manufacturing further includes a tilt processing step of forming the surface of the opposing insulating layer in a descending slope like shape closer to the substrate as the surface of the opposing insulating layer is more distanced from the medium-opposing surface, the lower front shield part forming step is performed such that the lower front shield part is in direct contact with the surface of the opposing insulating layer formed in the descending slope like shape by the tilt processing step.

Further, the present invention provides a head gimbal assembly including a thin-film magnetic head formed on a support and a gimbal for securing the support; the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the shield magnetic layer includes a leading shield part arranged on the substrate side of the main magnetic pole layer and arranged on the medium-opposing surface side of the thin-film coil, and the leading shield part has a variable distance structure in which a rearmost part most distanced from the medium-opposing surface on the main magnetic pole layer side is distanced more from the main magnetic pole layer than is a foremost part closest to the medium-opposing surface on the main magnetic pole layer side.

Further, the present invention provides a hard disk drive including a head gimbal assembly having a thin-film magnetic head and a recording medium opposing the thin-film magnetic head; the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the shield magnetic layer includes a leading shield part arranged on the substrate side of the main magnetic pole layer and arranged on the medium-opposing surface side of the thin-film coil, and the leading shield part has a variable distance structure in which a rearmost part most distanced from the medium-opposing surface on the main magnetic pole layer side is distanced more from the main magnetic pole layer than is a foremost part closest to the medium-opposing surface on the main magnetic pole layer side.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 10 (*a*) is a sectional view illustrating a principal part of a lower front shield part according to an embodiment of the present invention with a part thereof omitted, FIG. 10 (*b*) is a sectional view illustrating a principal part of a conventional lower front shield part with a part thereof omitted;

FIG. 42 (a) is a perspective view illustrating a hard disk drive equipped with a thin-film magnetic head according to an embodiment of the present invention, FIG. 42 (b) is a perspective view illustrating a rear side of HGA;

DETAILED DESCRIPTION OF THE EMBODIMENTS

In the following, embodiments of the present invention will be described with reference to the drawings. Note that the same components will be referred to with the same numerals or letters, while omitting their overlapping descriptions.

First Embodiment (Structures of Thin-Film Magnetic Head)

Figure 1:
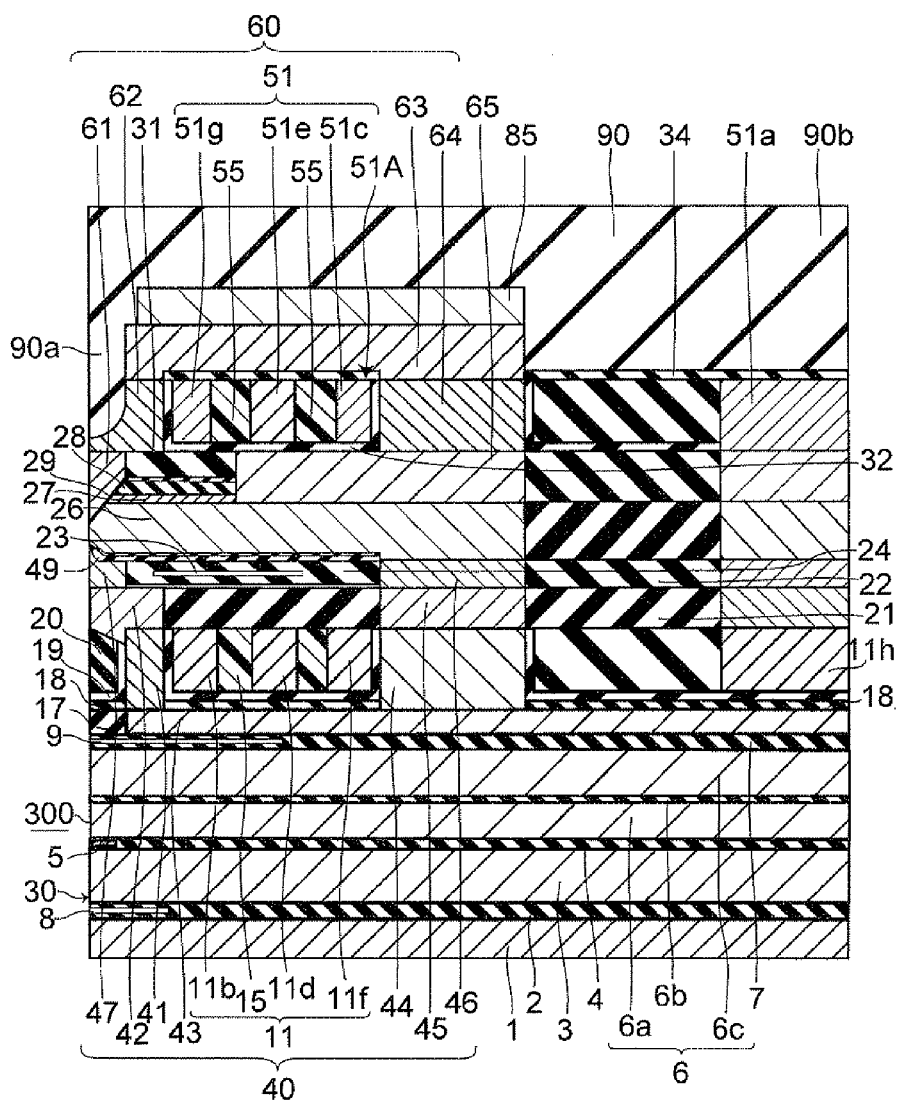
FIG. 1 is a sectional view of the thin-film magnetic head according to a first embodiment of the present invention taken along the line 1-1 of FIG. 2, along by a direction intersecting its air bearing surface.
Figure 2:
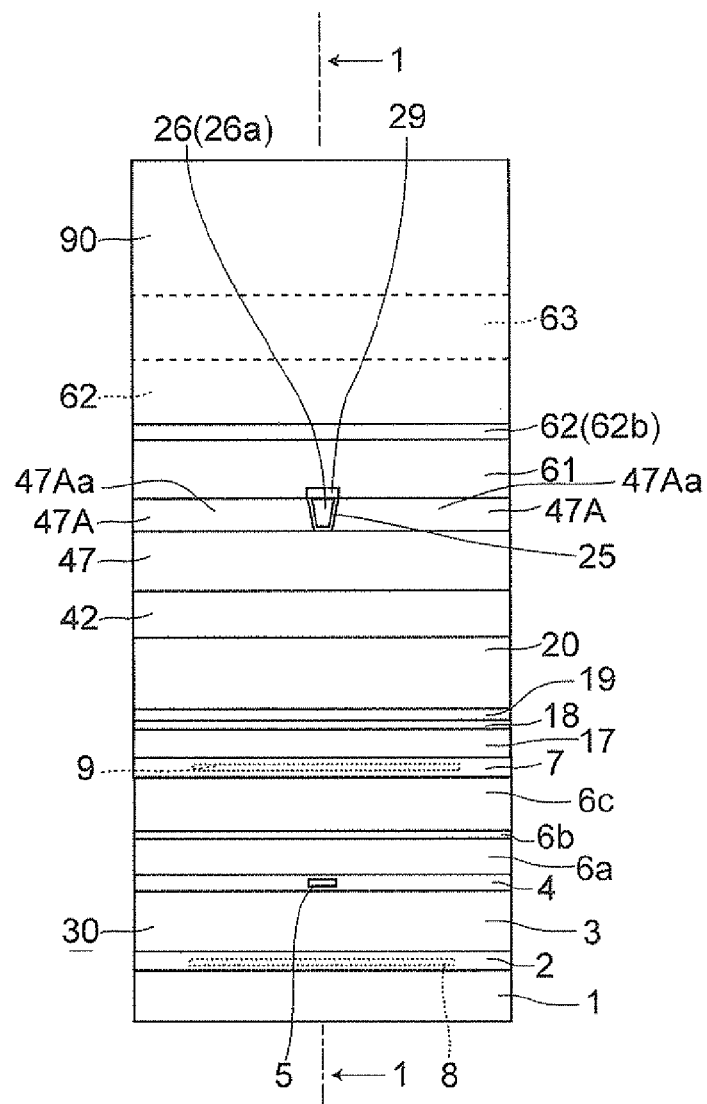
FIG. 2 is a front view illustrating an ABS of the thin-film magnetic head.
Figure 3:
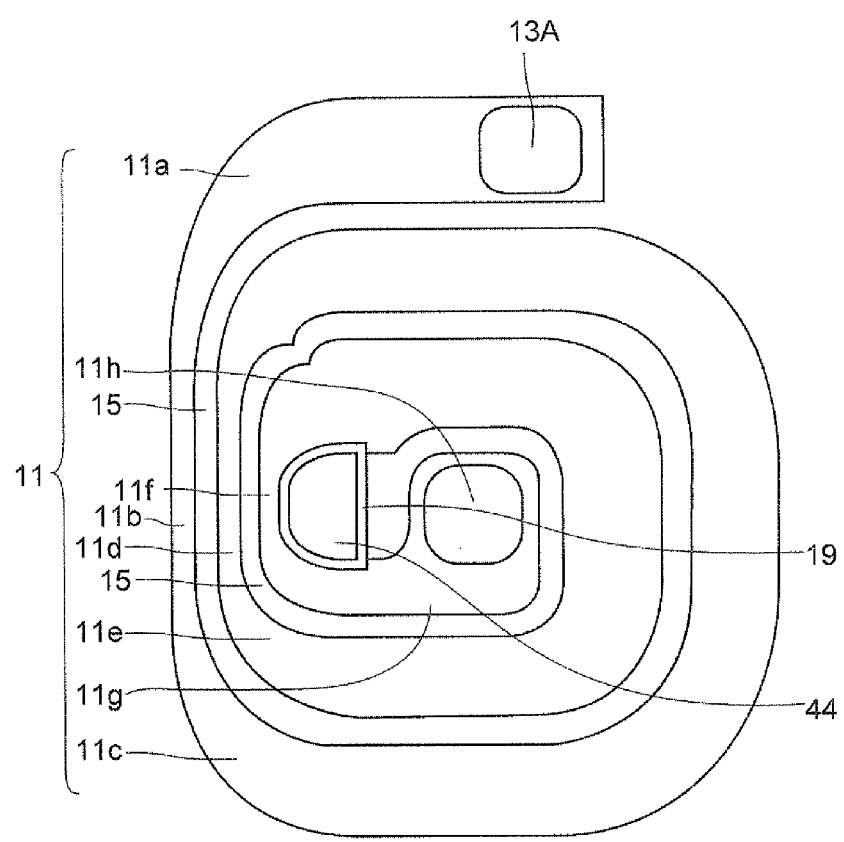
FIG. 3 is a plan view illustrating a lower thin-film coil.
Figure 4:
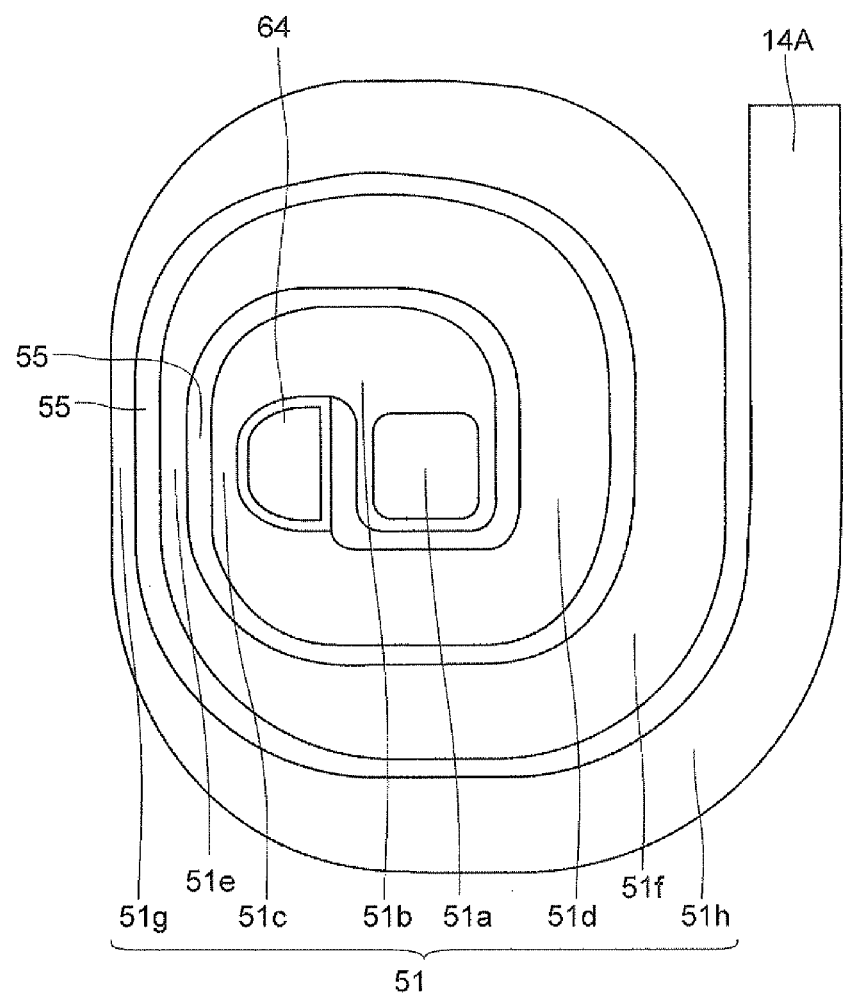
FIG. 4 is a plan view illustrating an upper thin-film coil.
Figure 5:
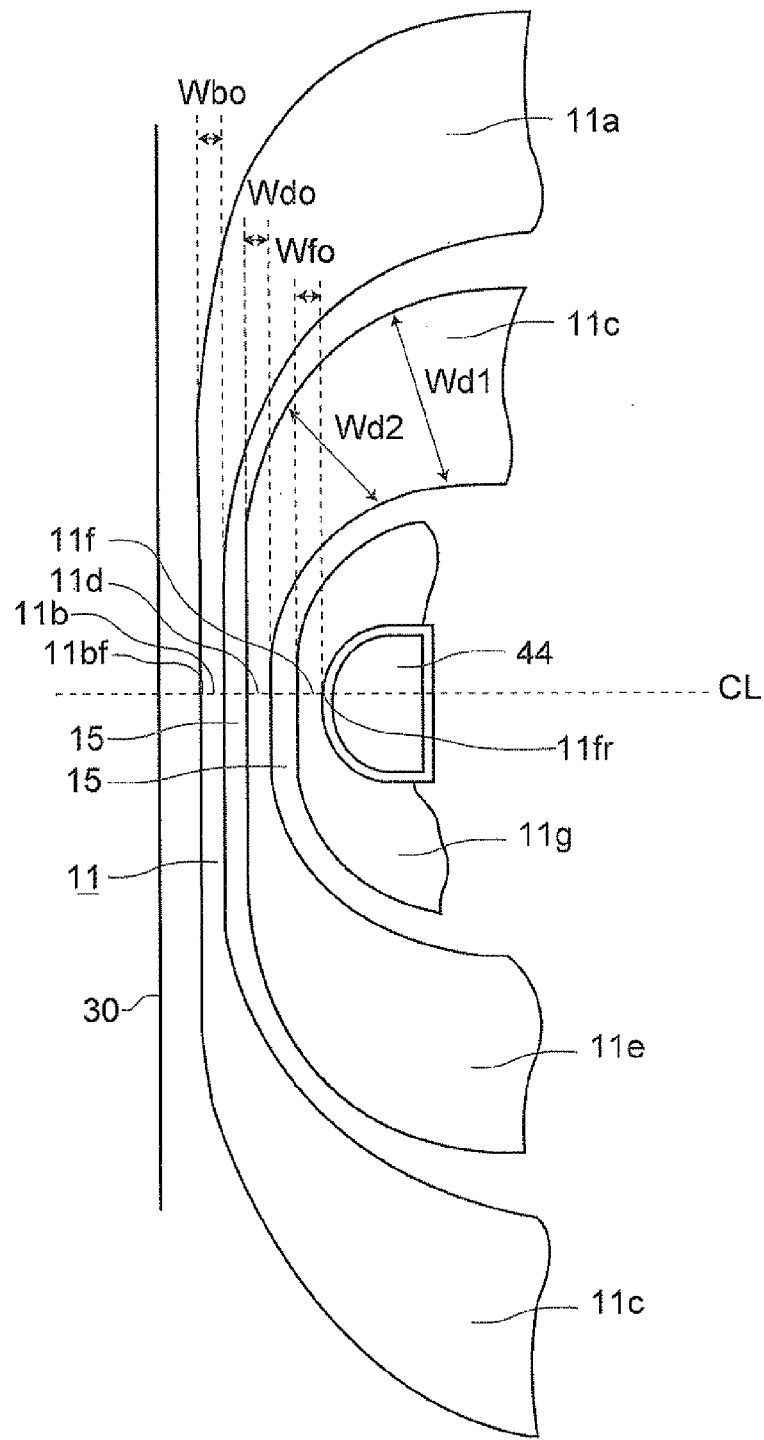
FIG. 5 is a plan view illustrating a principal part of the lower thin-film coil.
Figure 6:
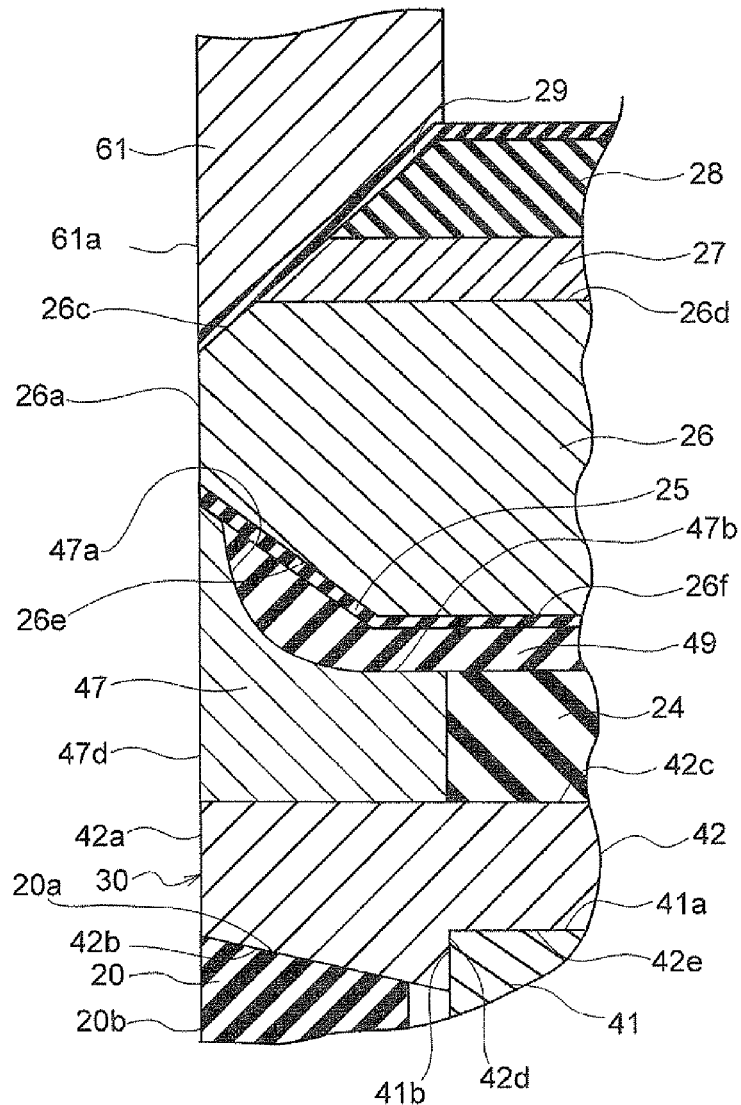
FIG. 6 is a sectional view illustrating an enlarged principal part of the ABS.
Figure 7:
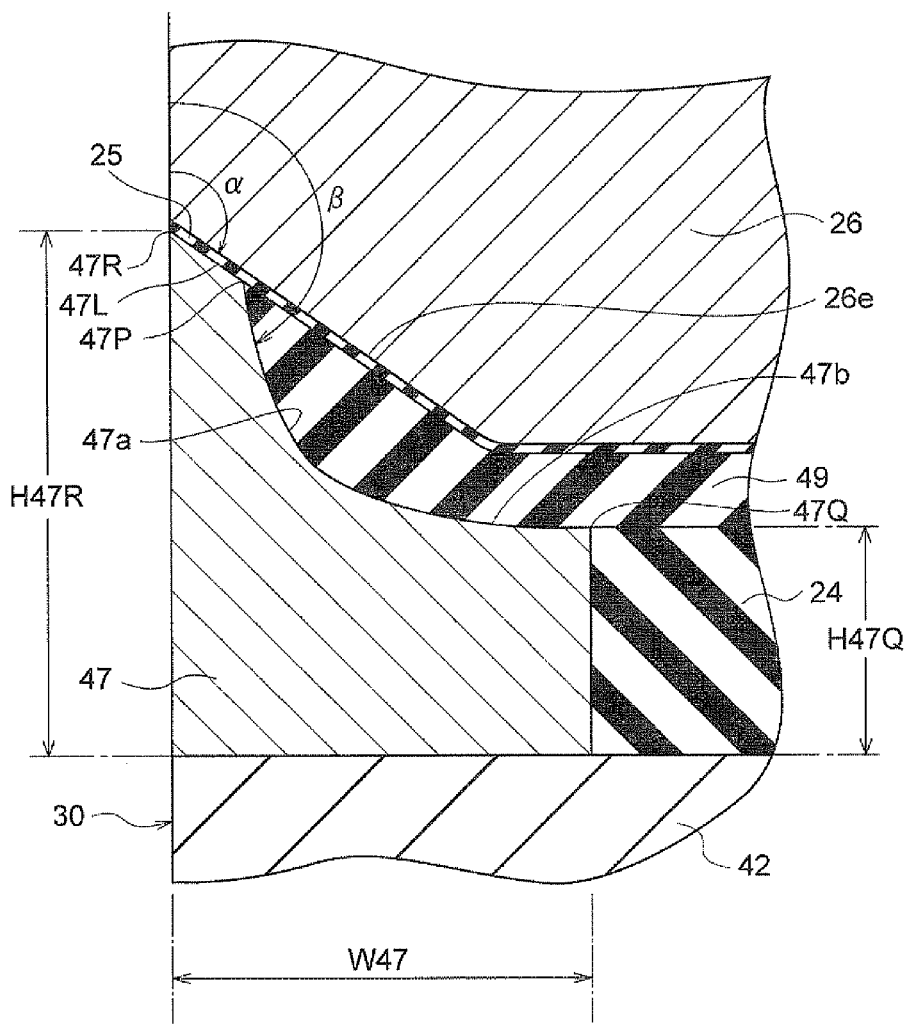
FIG. 7 is a sectional view illustrating an enlarged principal part of a leading shield part, a middle insulating layer and a main magnetic pole layer.
Figure 8:
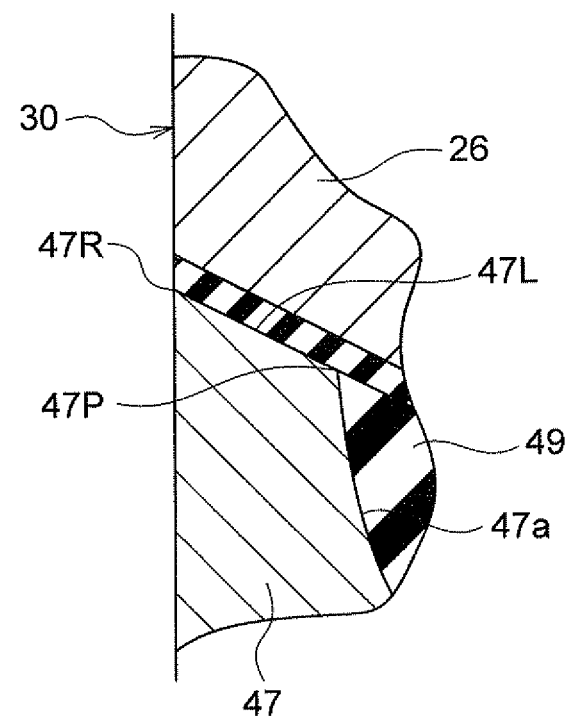
FIG. 8 is a sectional view illustrating an enlarged principal part of the ABS.
Figure 9:
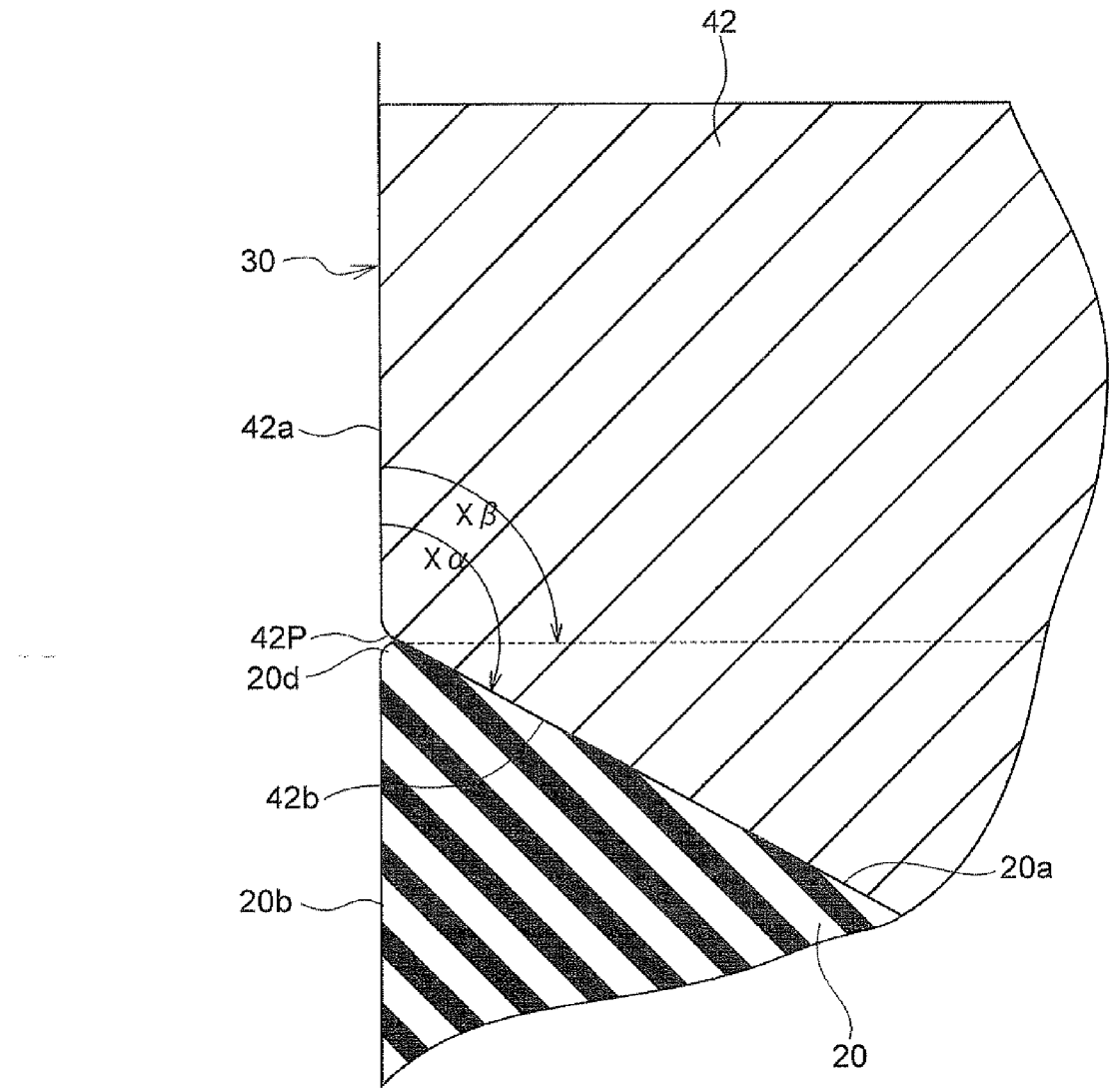
FIG. 9 is a sectional view illustrating an enlarged principal part of the ABS.
Figure 11:
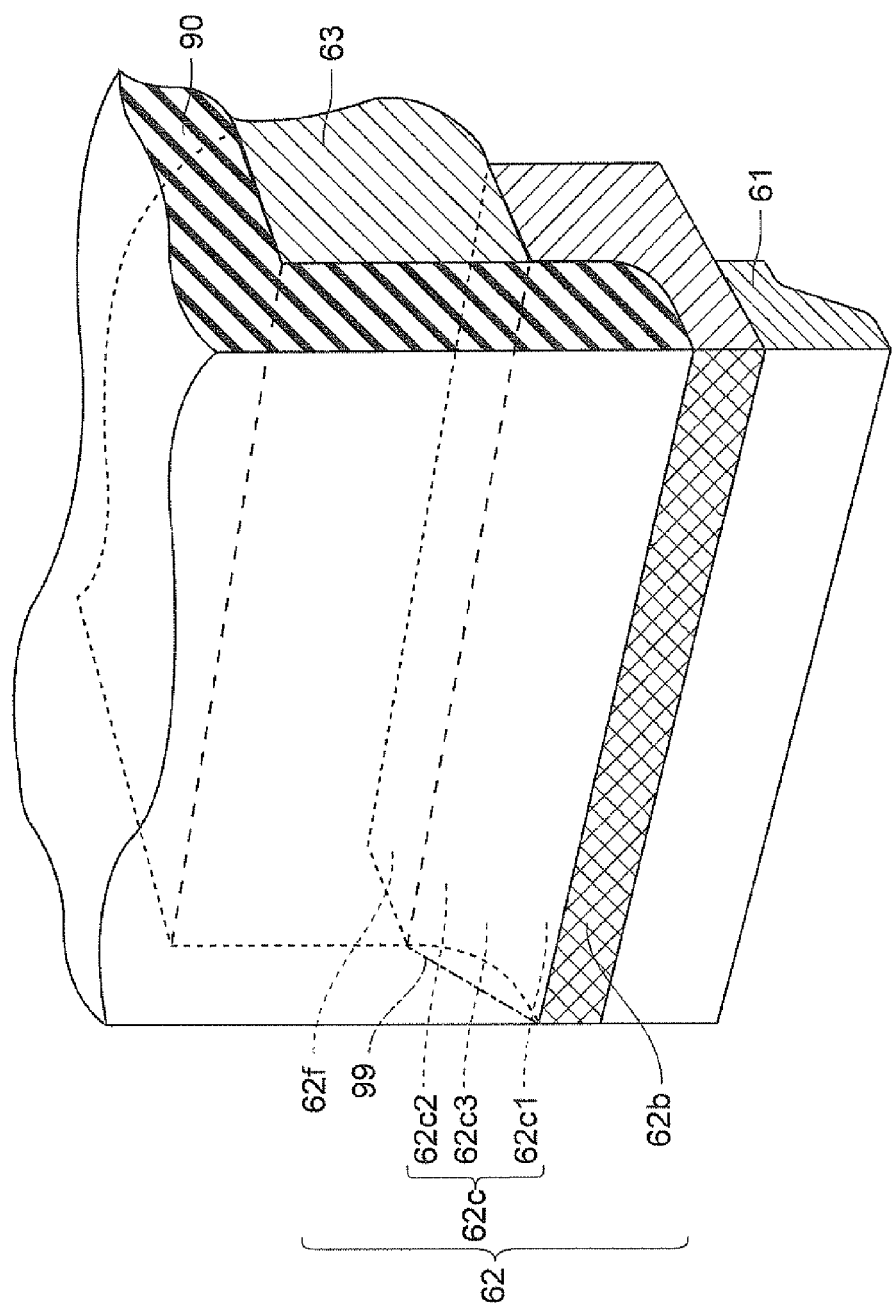
FIG. 11 is a perspective view illustrating principal parts of an opposing shield part, a front shield part and a linking shield part.
Figure 12:
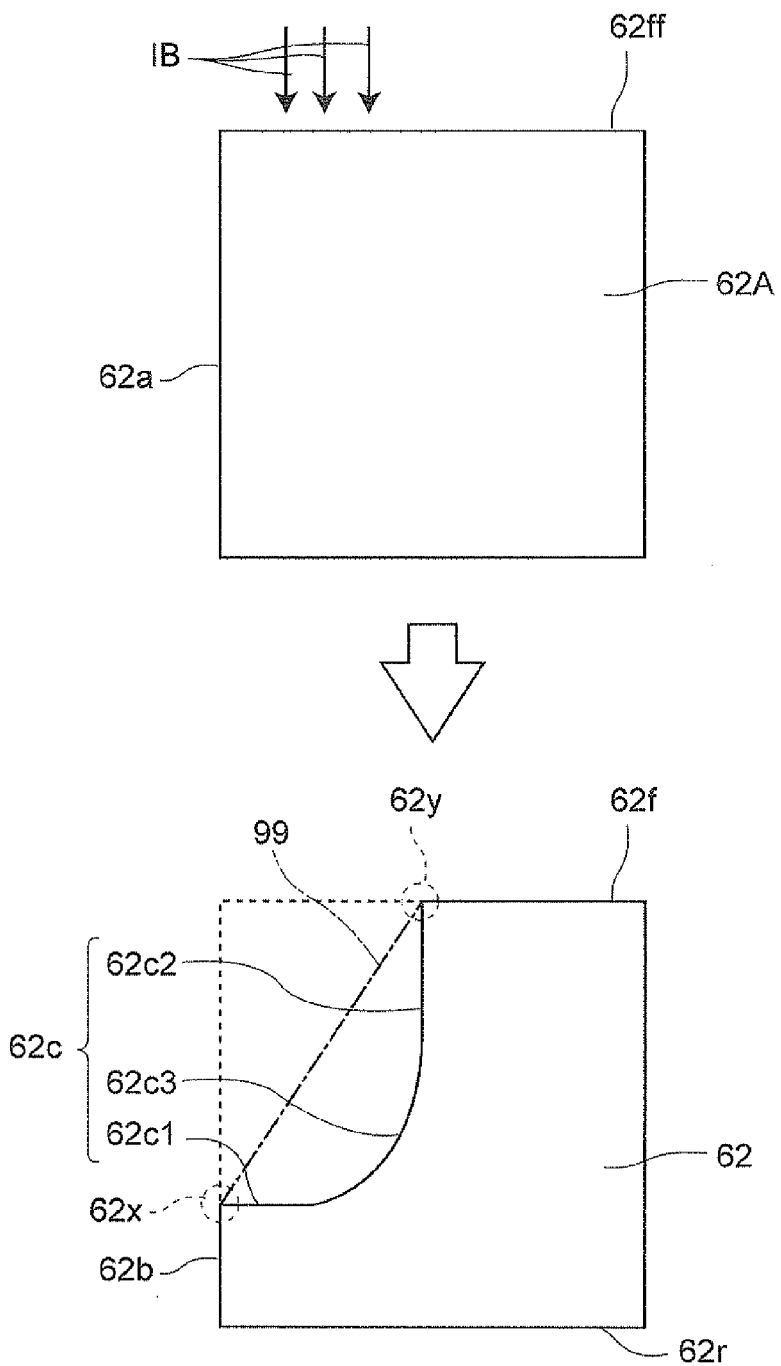
FIG. 12 is a side elevation view illustrating a pre-trim shield part and the upper front shield part.
Figure 13:
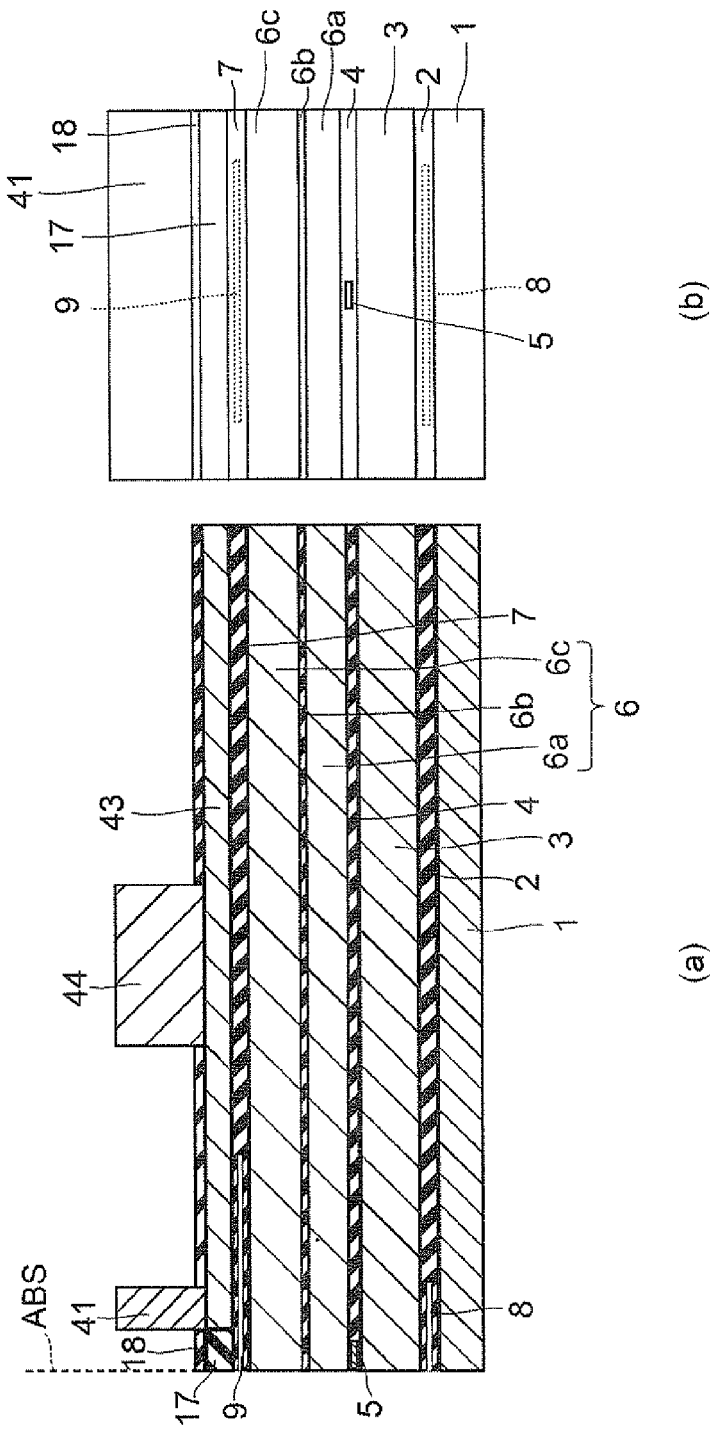
FIG. 13 illustrates a step of manufacturing the thin-film magnetic head illustrated in FIG. 1, in which (a) is a sectional view corresponding to FIG. 1, in which (b) is a front view corresponding to FIG. 2.
Figure 14:
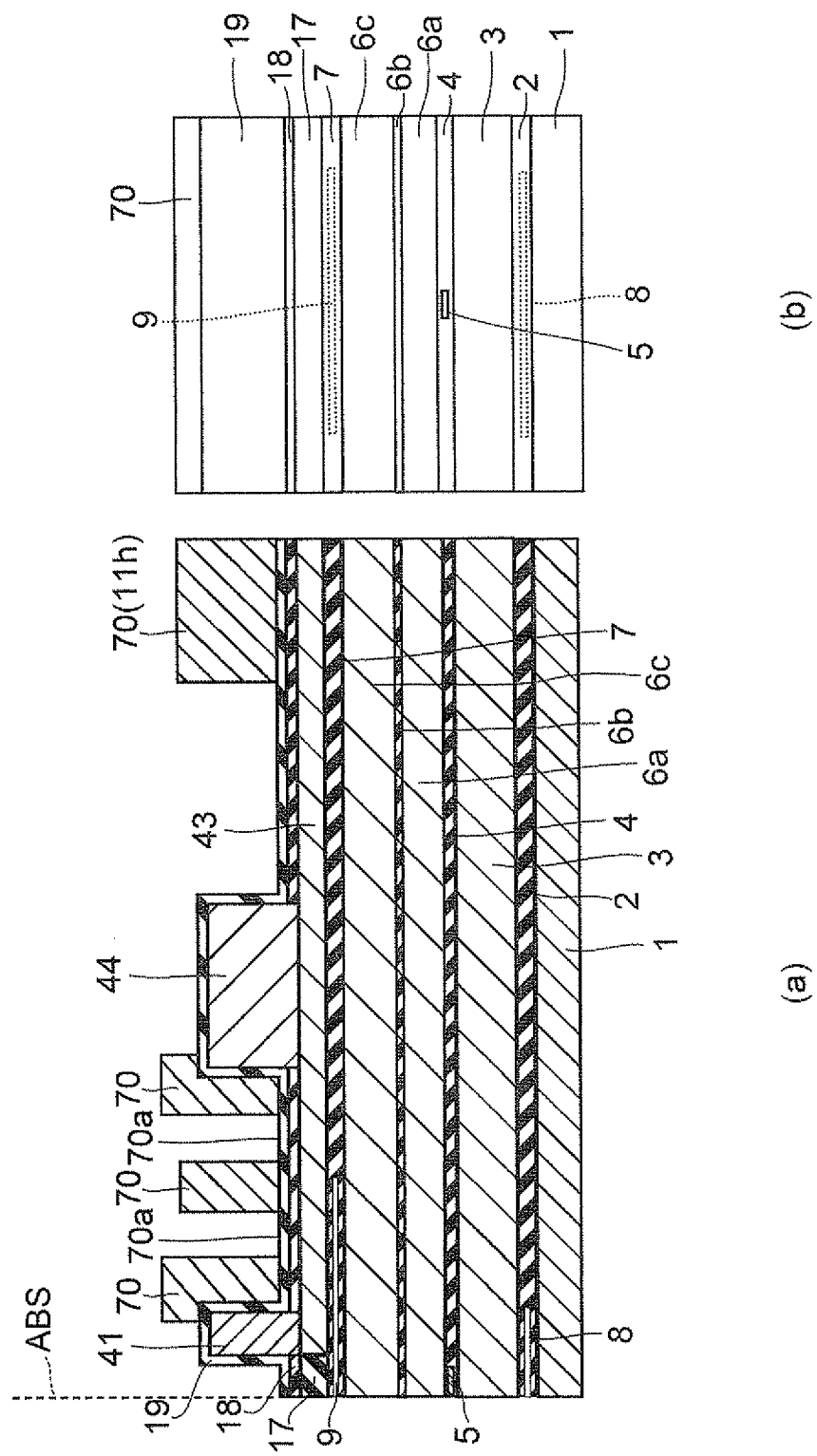
FIG. 14 illustrates a step subsequent to that of FIG. 13, in which (a) is a sectional view corresponding to FIG. 1, in which (b) is a front view corresponding to FIG. 2.
Figure 15:
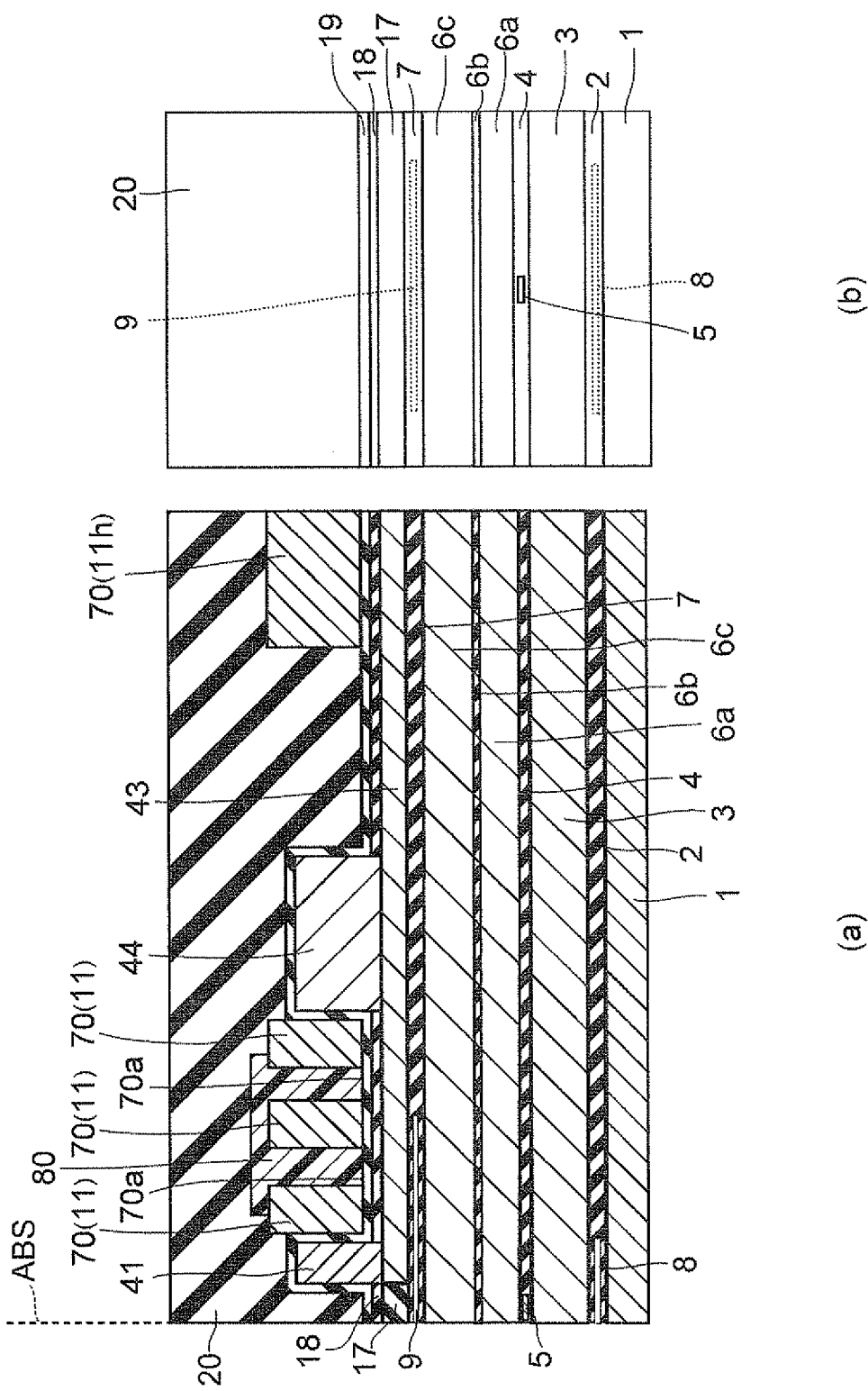
FIG. 15 illustrates a step subsequent to that of FIG. 14, in which (a) is a sectional view corresponding to FIG. 1, in which (b) is a front view corresponding to FIG. 2.
Figure 16:
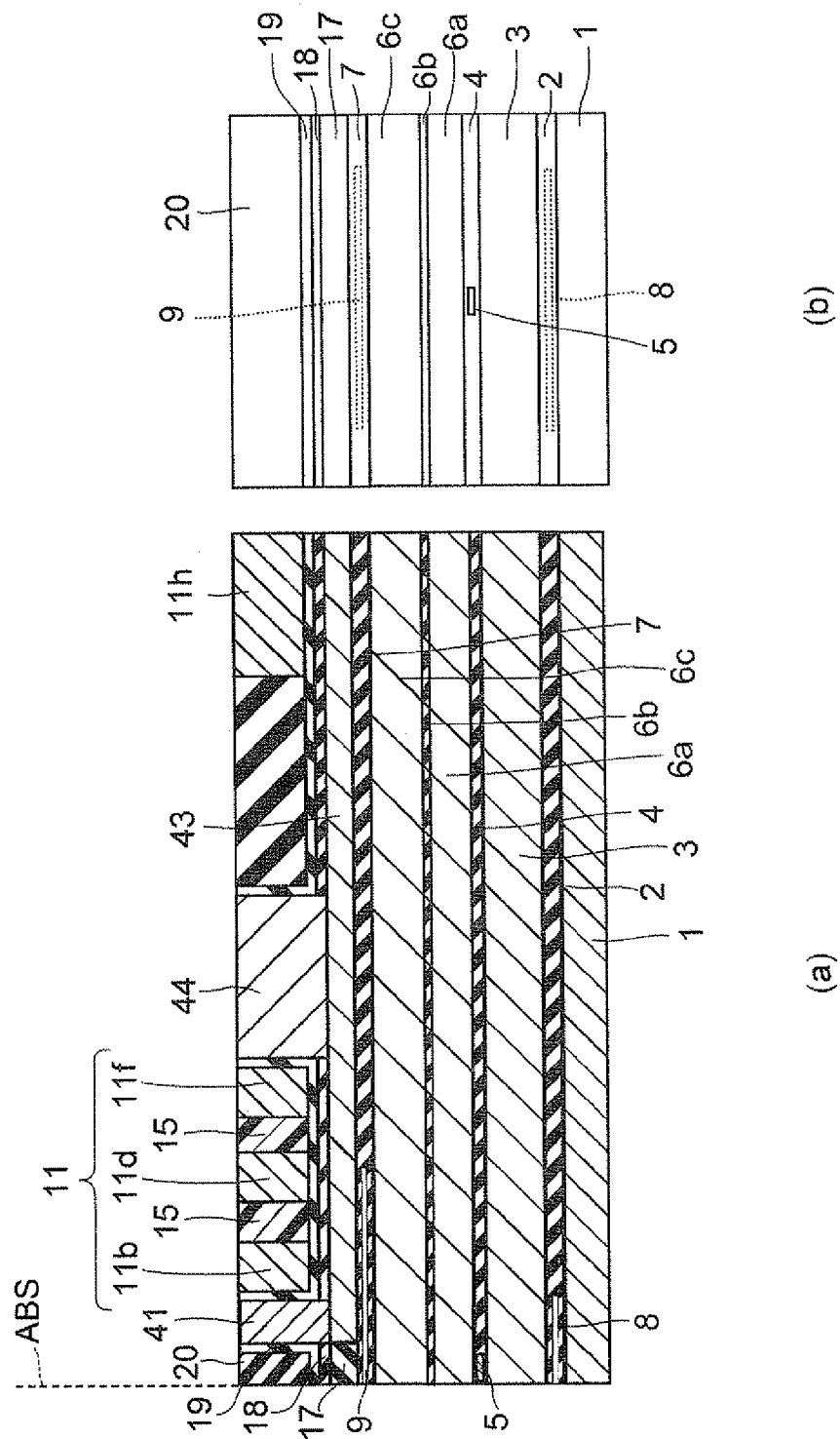
FIG. 16 illustrates a step subsequent to that of FIG. 15, in which (a) is a sectional view corresponding to FIG. 1, in which (b) is a front view corresponding to FIG. 2.
Figure 17:
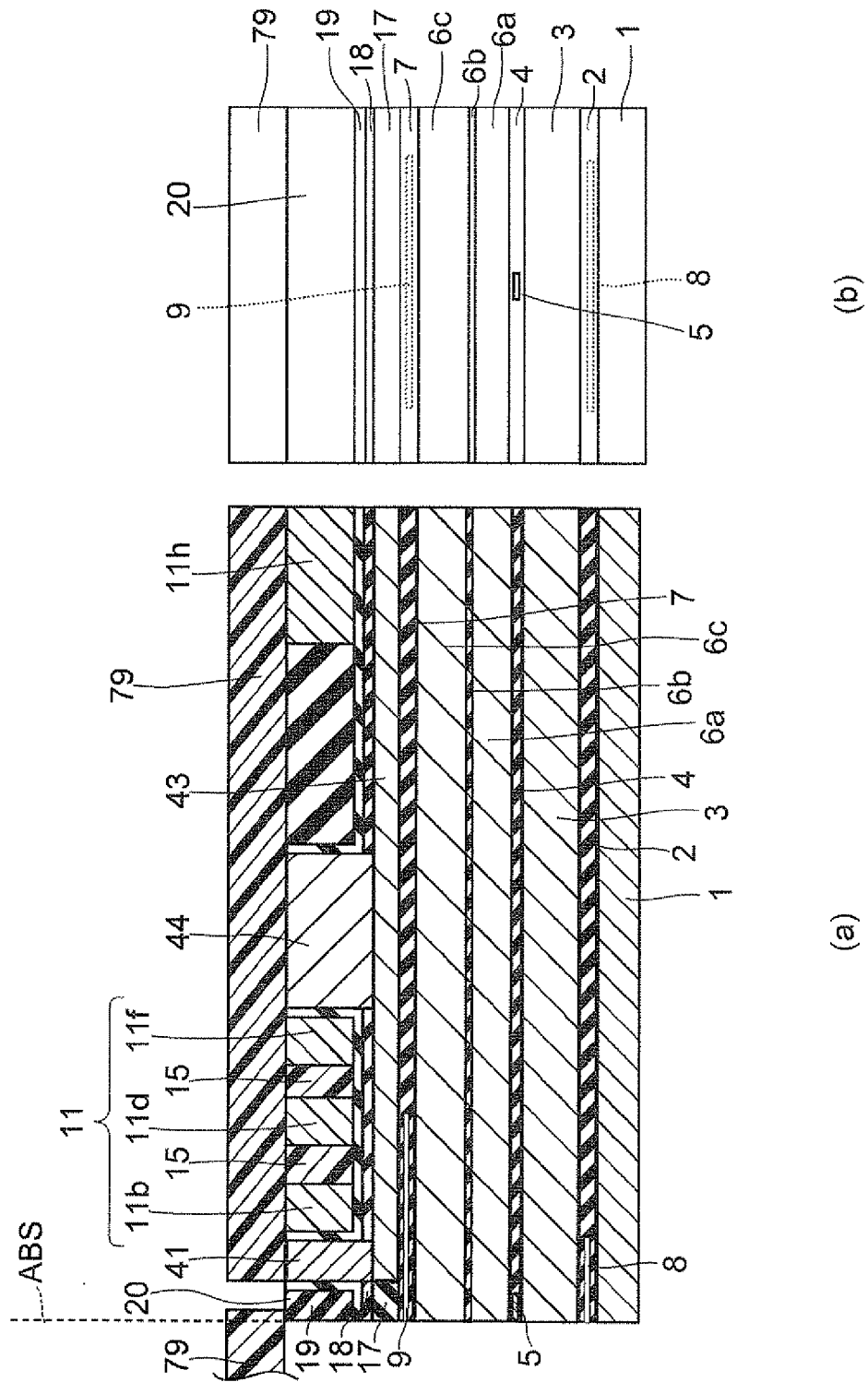
FIG. 17 illustrates a step subsequent to that of FIG. 16, in which (a) is a sectional view corresponding to FIG. 1, in which (b) is a front view corresponding to FIG. 2.
Figure 18:
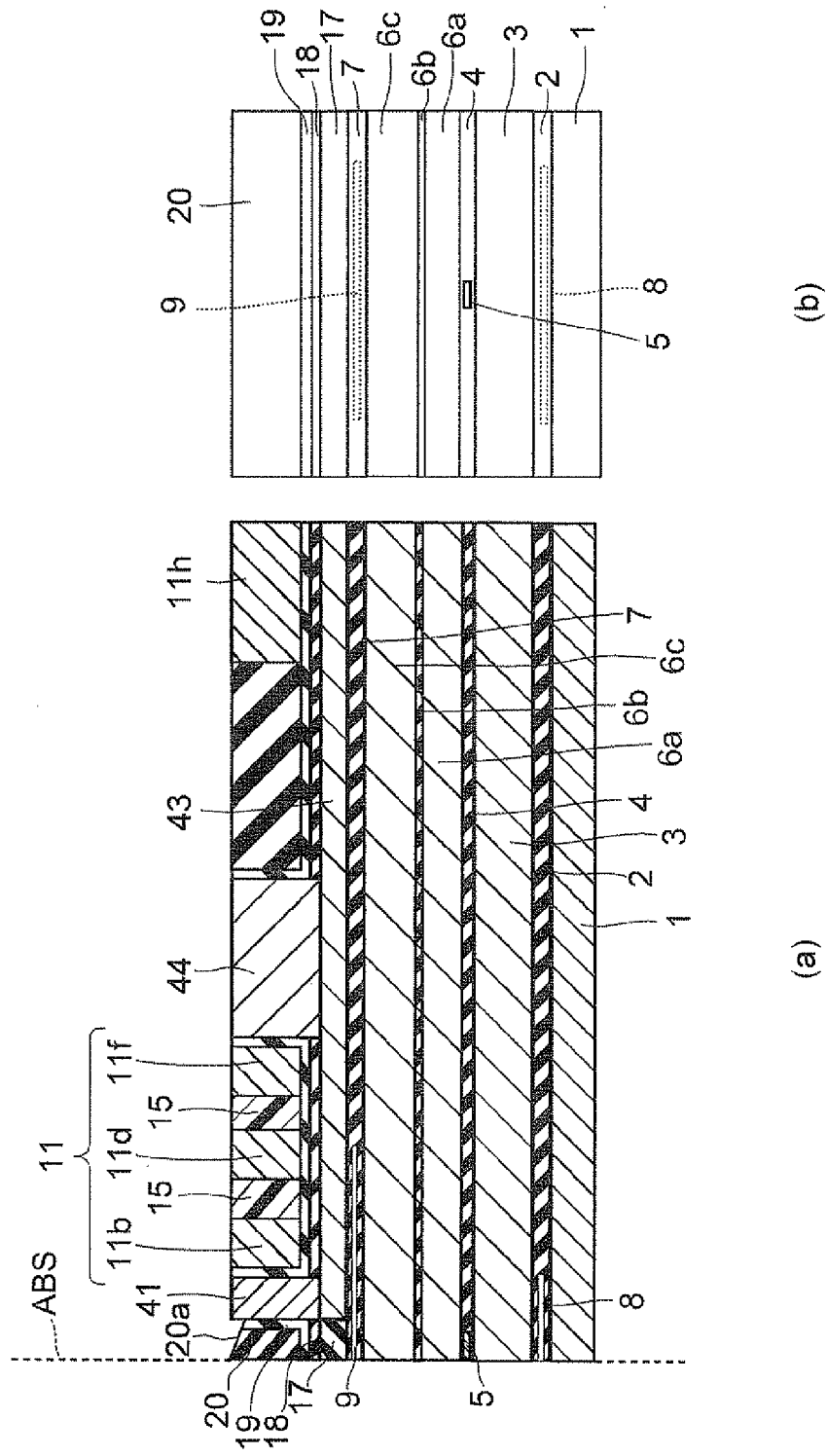
FIG. 18 illustrates a step subsequent to that of FIG. 17, in which (a) is a sectional view corresponding to FIG. 1, in which (b) is a front view corresponding to FIG. 2.
Figure 19:
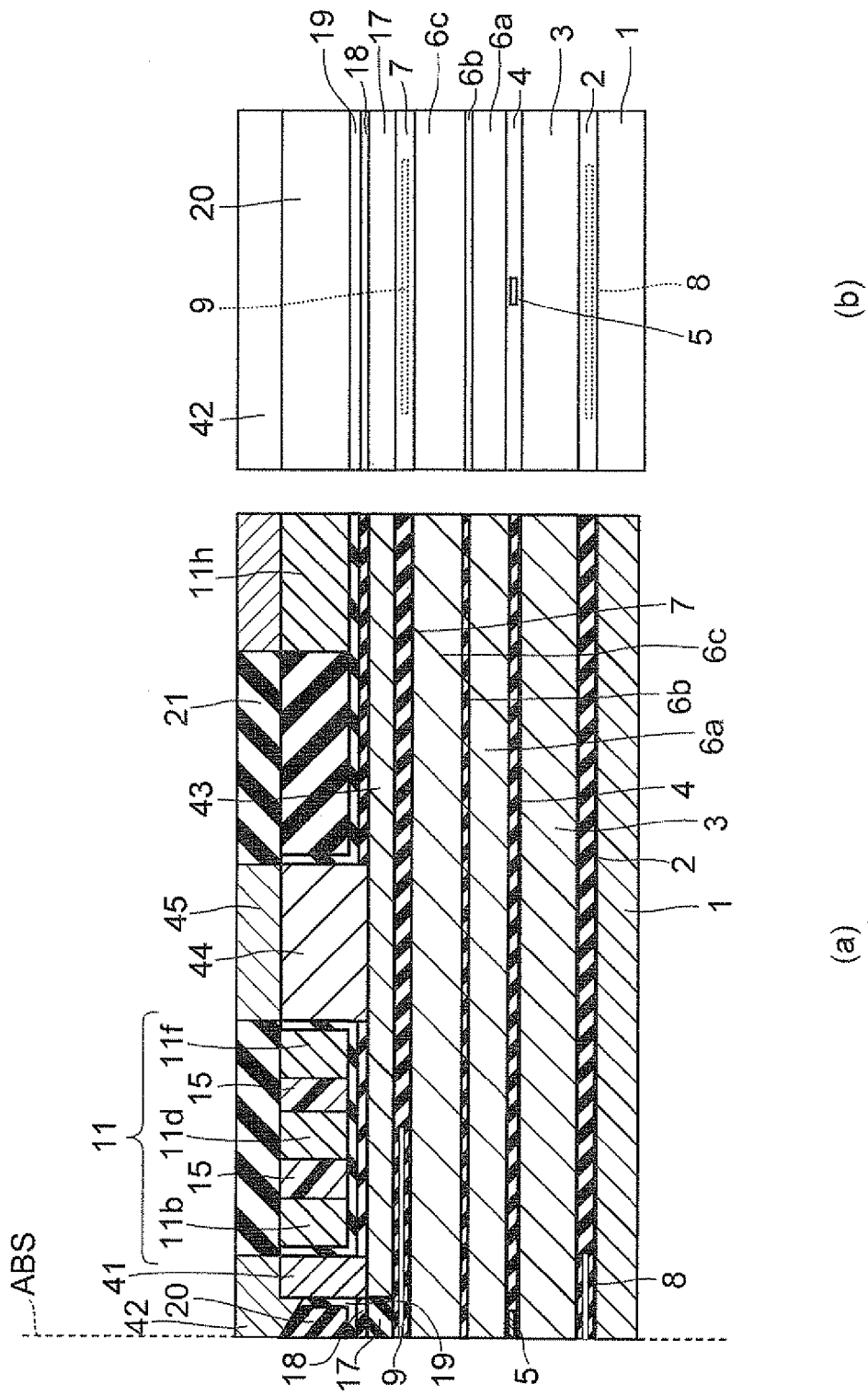
FIG. 19 illustrates a step subsequent to that of FIG. 18, in which (a) is a sectional view corresponding to FIG. 1, in which (b) is a front view corresponding to FIG. 2.

To begin with, the structure of a thin-film magnetic head of perpendicular magnetic recording type according to the first embodiment of the present invention will be explained with reference to FIG. 1 to FIG. 12. Here, FIG. 1 is a sectional view of the thin-film magnetic head 300 according to a first embodiment of the present invention taken along the line 1-1 of FIG. 2, along by a direction intersecting its air bearing surface (which will hereinafter be referred to as "ABS"), FIG. 2 is a front view illustrating the ABS 30 of the thin-film magnetic head 300. FIG. 3 is a plan view illustrating a lower thin-film coil 11. FIG. 4 is a plan view illustrating an upper thin-film coil 51. FIG. 5 is a plan view illustrating a principal part of the lower thin-film coil 11. FIG. 6 is a sectional view illustrating an enlarged principal part of the ABS 30. FIG. 7 is a sectional view illustrating an enlarged principal part of a leading shield part 47, a middle insulating layer 49 and a main magnetic pole layer 26. FIG. 8, FIG. 9 are sectional view illustrating an enlarged principal part of the ABS 30. FIG. 10 (a) is a sectional view illustrating an enlarged principal part of a lower front shield part 42, FIG. 10 (b) is a sectional view illustrating an enlarged principal part of a conventional lower front shield part 712. FIG. 11 is a perspective view illustrating principal parts of an opposing shield part 61, an upper front shield part 62 and a linking shield part 63. FIG. 12 is a side elevation view illustrating a pre-trim shield part and the upper front shield part.

The thin-film magnetic head 300 comprises a substrate 1 and reproducing and recording heads laminated on the substrate 1, while having the ABS 30 as a medium-opposing surface opposing a recording medium.

In the thin-film magnetic head 300, the leading shield part 47 which takes in a magnetic flux leaking from the main magnetic pole layer 26 to the leading side is improved to have a structure such that the middle insulating layer 49 is arranged between the leading shield part 47 and the main magnetic pole layer 26, thereby improving ATE and WATE (see paragraph numbers 0167-0168 and so on, for details).

The following will explain structures of main parts of the thin-film magnetic head 300, while structures of parts other than the main parts will later be explained in manufacturing steps.

The reproducing head has an MR device 5, arranged near the ABS 30, for detecting a magnetic signal. The reproducing head has an insulating layer 2 formed on the substrate 1, a lower shield layer 3 made of a magnetic material, and a shield gap film 4 shielding the MR device 5. The reproducing head further has an upper shield layer 6 made of a magnetic material formed on the shield gap film 4, and an insulating layer 7 formed on the upper shield layer 6. The reproducing head is arranged in a position closer to the substrate 1 than the recording head.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The upper shield layer 6 has an insulating part 6b in the middle thereof. Further, a first shield part 6a is formed on the lower side of the insulating part 6b and a second shield part 6c is formed on the upper side of the insulating part 6b.

In the thin-film magnetic head 300, a heating part 8 is formed in the insulating layer 2. The heating part 8 is also called a DFH (Disk flying heater) and has a function of generating heat by electric current flowing therethrough and conducting the heat to the upper shield layer 6 and the like. Further, a heat sensing part 9 is formed in the insulating layer 7. The heat sensing part 9 is also called an HDI (Head Disk Interlayer) sensor. The heat sensing part 9 is formed using an element which senses heat (temperature) near the upper shield layer 6 and changes in resistance value according to the sensed heat.

Further, in the thin-film magnetic head 300, the heating part 8 heats the upper shield layer 6 and the lower shield layer 3. The upper shield layer 6 and the lower shield layer 3 expand in volume by the heat received from the heating part 8. As a result, assuming that the upper shield layer 6 and the lower shield layer 3 come into contact with a recording medium not illustrated in FIG. 1, parts of the upper shield layer 6 and the lower shield layer 3 near the ABS 30 become heated due to friction. In the thin-film magnetic head 300, a judgment whether or not the upper shield layer 6 and the lower shield layer 3 have come into contact with the recording medium is made by detecting the change in resistance value of the heat sensing part 9 caused by the friction heat. Further, the frying height is controlled while controlling the current value flowing through the heating part 8 according to the judgment result.

The recording head has a lower thin-film coil 11, an opposing insulating layer 20, a main magnetic pole layer 26, a gap layer 29, a shield magnetic layer 40, a middle insulating layer 49, an upper thin-film coil 51, an write shield layer 60, an upper yoke layer 65, a displacement suppression layer 85 and protective insulating layer 90, which are laminated on the substrate 1.

In the thin-film magnetic head 300, the lower thin-film coil 11 and the upper thin-film coil 51 form a continuous thin-film coil. The lower thin-film coil 11 corresponds to a part of the continuous thin-film coil, disposed between the main magnetic pole layer 26 and the substrate 1. Therefore, the lower thin-film coil 11 corresponds to a substrate side coil layer according to the embodiment of the present invention.

As illustrated in FIG. 3, the lower thin-film coil 11 has three turn parts 11b, 11d, 11f. The turn parts 11b, 11d, 11f are arranged between a later-described connecting shield part 41 and a first rear shield part 44. The lower thin-film coil 11 has a structure which the turn parts 11b, 11d, 11f align with each other while interposing a photoresist layer 15 therebetween. Since the turn part 11b is arranged at a closest position to the ABS 30 of the turn parts 11b, 11d, 11f, the turn part 11b corresponds to a front turn part. The turn part 11f corresponds to a rear turn part.

The lower thin-film coil 11 has a loop part 11a extending from a lead part 13A to the turn part 11b, a one-loop part 11c extending from the turn part 11b to the turn part 11d, and a one-loop part 11e extending from the turn part 11d to a turn part 11f, and a half-loop part 11g extending from the turn part 11f to a connecting part 11h.

The lower thin-film coil 11 is constructed as a continuous line from the lead part 13A to the connecting part 11h, so as to be wound as a flat spiral about the shield magnetic layer 40, thus forming a three-turn loop as a whole. For convenience of illustration, FIG. 1 illustrates only the turn parts 11b, 11d, 11f and connecting part 11h in the lower thin-film coil 11. Each of the turn parts 11b, 11d, 11f has a longitudinally long structure in which the thickness (height in a direction (upper and lower direction) along with the ABS 30) greater than the lateral width. Note that the lateral width means width in a direction (intersecting direction) intersecting the ABS 30, in this embodiment.

In the lower thin-film coil 11, as illustrated in FIG. 5, the one-loop part 11c has a variable width structure in which the width gradually decreases toward the ABS 30 and becomes the smallest at the position closest to the ABS 30. Namely, when widths Wd1, Wd2, Wd0 are defined in the one-loop part 11c as illustrated in FIG. 5, Wd1>Wd2>Wd0. The narrowest part in the one-loop part 11c is the turn part 11d. The loop part 11a and the one-loop part 11e have a variable width structure similar to that of the one-loop part 11c, while the narrowest part is the turn part 11b, 11f. Here, the respective widths of the turn parts 11b, 11d, 11f are Wb0 (about 0.9 μm), Wd0 (about 0.9 μm) and Wf0 (about 0.9 μm).

The lower thin-film coil 11 forms a following continuous 3-turn loop. Namely, the lead part 13A is connected to the connecting part 11h through the loop part 11a, the one-loop part 11c, one-loop part 11e and the half-loop part 11g, whereby the 3-turn loop is formed.

Note that the distance from a front side face 11bf of the turn part 11b to the ABS 30 means a front distance of the lower thin-film coil 11. Besides, the distance from a rear side face 11fr of the turn part 11f to the ABS 30 means a rear distance of the lower thin-film coil 11.

Next, the upper thin-film coil 51 will be explained. As illustrated in FIG. 4, the upper thin-film coil 51 has three turn parts 51g, 51e, 51c. The turn parts 51g, 51e, 51c are arranged between a later-described upper front shield part 62 and a rear shield part 64. The upper thin-film coil 51 has a structure which the turn parts 51g, 51e, 51c align with each other while interposing a photoresist layer 55 therebetween. Since the turn part 51g is arranged at a closest position to the ABS 30 of the turn parts 51g, 51e, 51c, the turn part 51g corresponds to a front turn part. The turn part 51c corresponds to a rear turn part.

The upper thin-film coil 51 has a loop part 51b extending from a connecting part 51a to the turn part 51c, a one-loop part 51d extending from the turn part 51c to the turn part 51e, and a one-loop part 51f extending from the turn part 51e to a turn part 51g, and a half-loop part 51h extending from the turn part 51g to a lead part 14A.

The upper thin-film coil 51 is constructed as a continuous line from the connecting part 51a to the lead part 14A, so as to be wound as a flat spiral about the write shield layer 60, thus forming a three-turn loop as a whole. For convenience of illustration, FIG. 1 illustrates only the turn parts 51g, 51e, 51c and the connecting part 51a in the upper thin-film coil 51. Each of the turn parts 51g, 51e, 51c has the longitudinally long structure and the variable width structure similarly to the turn parts 11b, 11d, 11f. The narrowest part in the one-loop part 51f, one-loop part 51d and the loop part 51b are the turn part 51g, 51e, 51c respectively.

The upper thin-film coil 51 forms a following continuous 3-turn loop. Namely, the connecting part 51a is connected to the lead part 14A through the loop part 51b, the one-loop part 51d, one-loop part 51f and the half-loop part 51h, whereby the 3-turn loop is formed.

Figure 36:
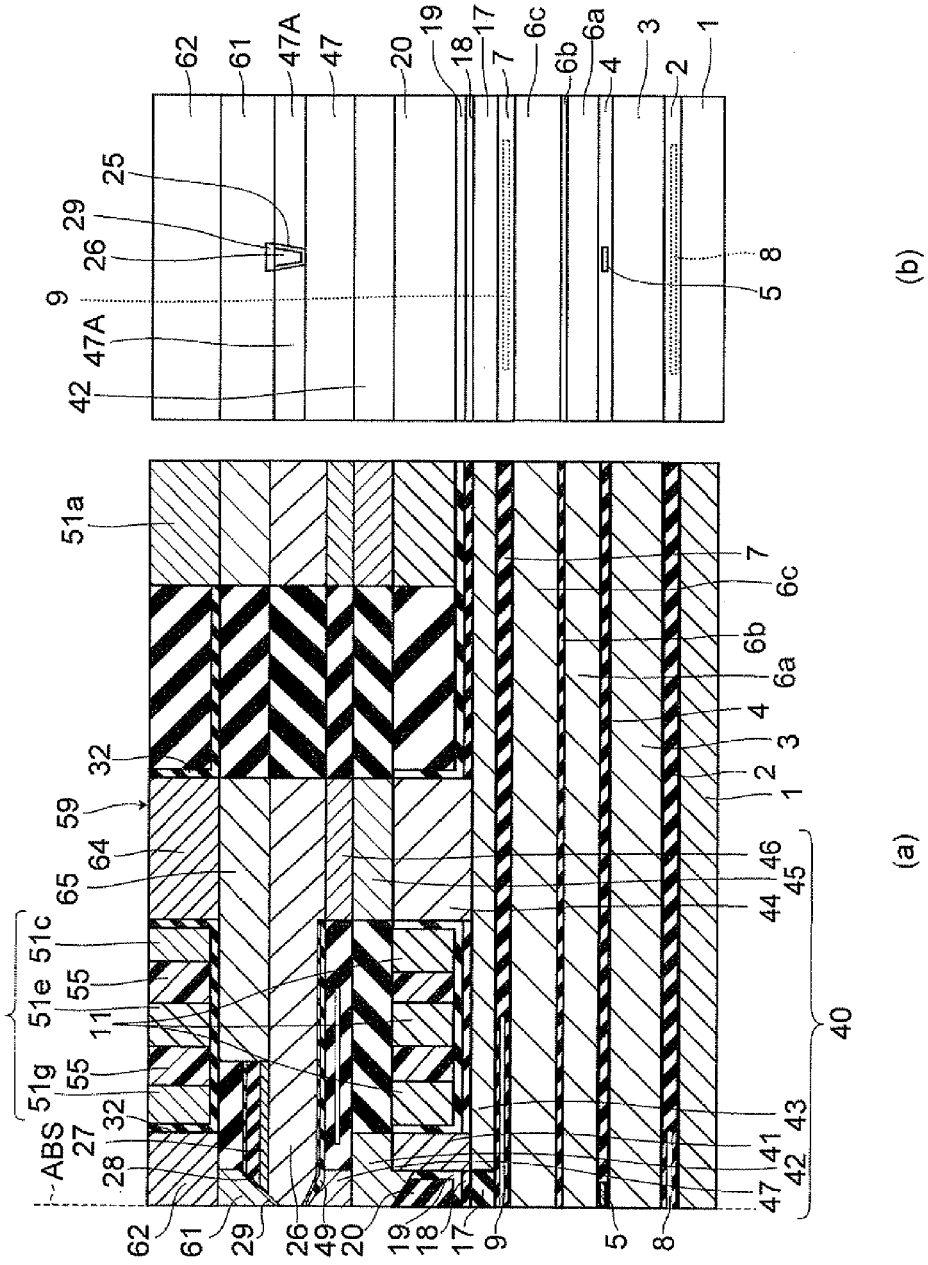
FIG. 36 illustrates a step subsequent to that of FIG. 35, in which (a) is a sectional view corresponding to FIG. 1, in which (b) is a front view corresponding to FIG. 2.
Figure 37:
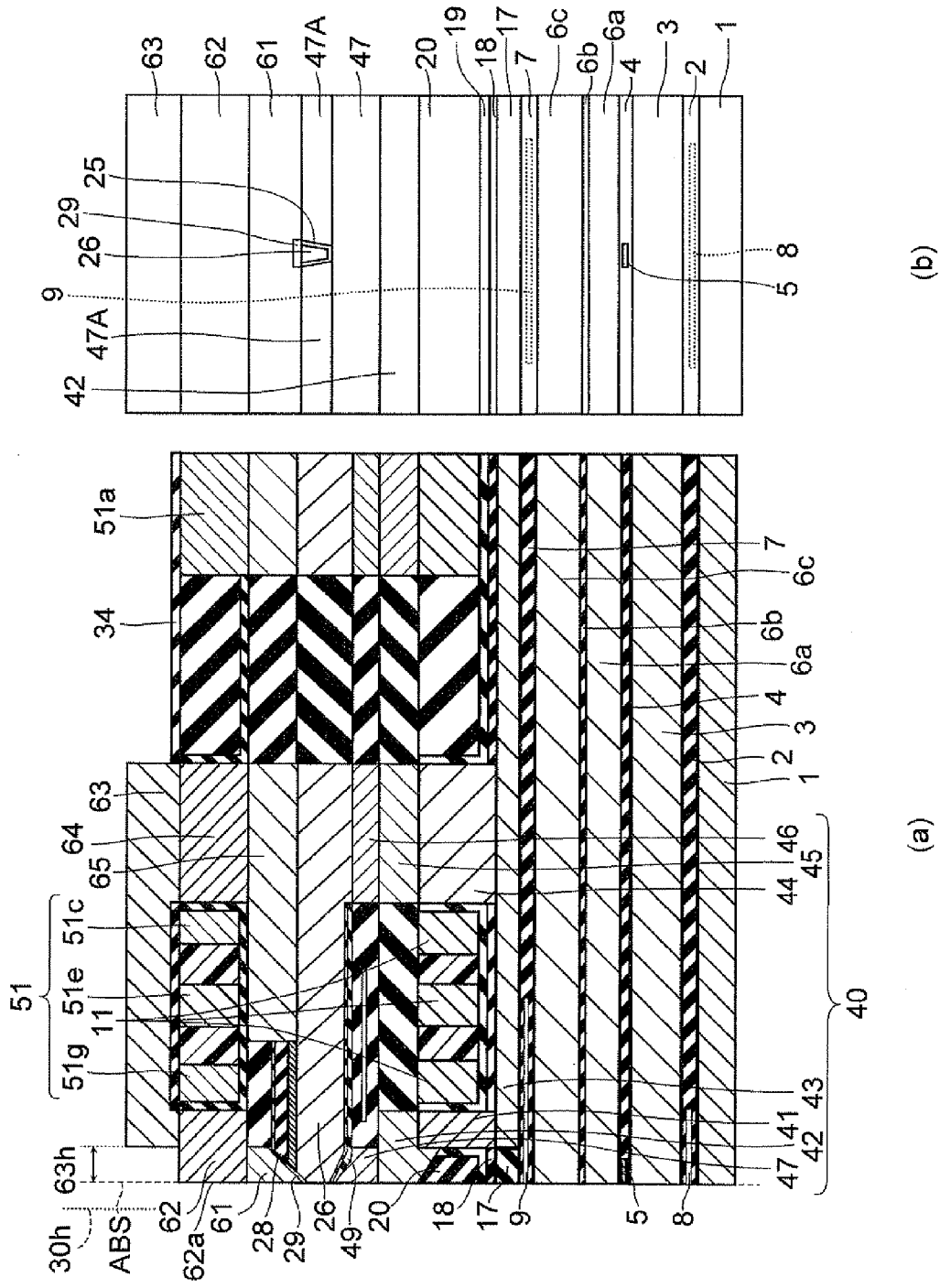
FIG. 37 illustrates a step subsequent to that of FIG. 36, in which (a) is a sectional view corresponding to FIG. 1, in which (b) is a front view corresponding to FIG. 2.
Figure 38:
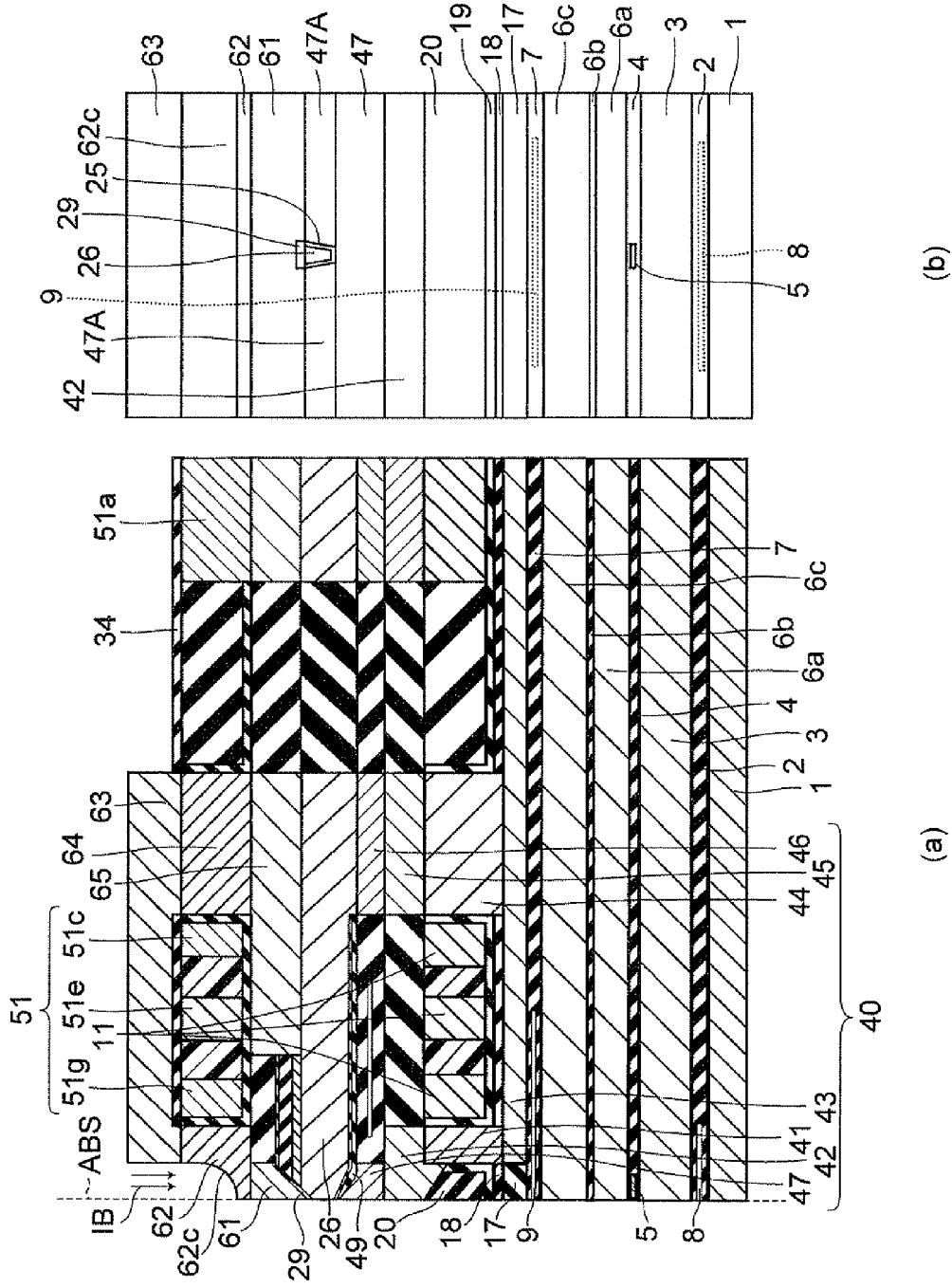
FIG. 38 illustrates a step subsequent to that of FIG. 37, in which (a) is a sectional view corresponding to FIG. 1, in which (b) is a front view corresponding to FIG. 2.

Further, as illustrated in FIG. 1, the upper thin-film coil 51 has an upper end face 51A. The upper end face 51A is disposed at a position most distanced from the substrate 1. The upper end face 51A is formed without level difference to a later-described shield upper end face 62f to form a common flat surface 59 (see FIG. 36) together with the shield upper end face 62f. Further, the upper thin-film coil 51 is connected to an upper face of a later-described upper yoke layer 65 via only the interlayer insulating layer 32. The upper thin-film coil 51 is connected to the upper yoke layer 65 without a magnetic layer made of a magnetic material intervening therebetween.

In the thin-film magnetic head 300, the connecting part 11h of the lower thin-film coil 11 is connected to the connecting part 51a of the upper thin-film coil 51. By this, the lower thin-film coil 11 and the upper thin-film coil 51 form a continuous coils. A current corresponding to data to be recorded on a recording medium is flowed through the lower thin-film coil 11 and the upper thin-film coil 51, a recording magnetic field is generated by the current.

Next, the opposing insulating layer 20 will be explained. The opposing insulating layer 20 has a tilted upper end face 20a as illustrated in FIG. 6. The tilted upper end face 20a is in direct contact with a tilted lower end face 42b of a later-described lower front shield part 42. Further, the tilted upper end face 20a is formed in a descending slope like shape closer to the substrate 1 as it is distanced more from the ABS 30. The tilted upper end face 20a is formed with a fixed tilt from the ABS 30 to a later-described connecting shield part 41. The surface is a flat surface without irregularities.

Further, the whole tilted upper end face 20a is disposed at a position closer to the substrate 1 than is an upper end face 41a of the connecting shield part 41. The tilted upper end face 20a is made by scraping the surface of the insulating layer. The tilted upper end face 20a is formed to form a depression in the surface of the opposing insulating layer 20. In the depression, a later-described front end face 41b of the connecting shield part 41 emerges.

The opposing insulating layer 20 has a front end face 20b. The front end face 20b is disposed in the ABS 30. Further, in the opposing insulating layer 20, a chipped end part 20d is formed at a position closest to the lower front shield part 42 in the front end face 20b as illustrated in FIG. 9. The chipped end part 20d is formed by chipping a small part of the opposing insulating layer 20 when polishing and the like for forming the ABS 30 are performed in the step of manufacturing the thin-film magnetic head 300.

Next, the main magnetic pole layer 26 will be explained. The main magnetic pole layer 26 is formed using a magnetic material made of a ferromagnetic body such as NiFe, CoNiFe, CoFe or the like. The ferromagnetic body such as NiFe, CoNiFe, CoFe or the like has a high magnetic permeability.

Therefore, a magnetic flux is likely to transmit through the main magnetic pole layer 26, much more magnetic flux transmit through the main magnetic pole layer 26. For this reason, more strong magnetic flux corresponding to the recording magnetic field is emitted from the main magnetic pole layer 26 to the ABS 30.

The main magnetic pole layer 26 has a magnetic pole end face 26a on the ABS 30 side, as illustrated in FIG. 2, FIG. 6. The magnetic pole end face 26a has a bevel form which is wider on the upper thin-film coil 51 side than on the lower thin-film coil 11 side and gradually decreases its width toward the lower thin-film coil 11. The width of the magnetic pole end face 26a on the upper thin-film coil 51 side defines the track width. The track width is about 0.06 to 0.12 μm, for example. The magnetic pole end face 26a is positioned in the ABS 30.

The main magnetic pole layer 26 includes a track width determining part having the magnetic pole end face 26a, a wider part and a width extending part. The track width determining part has a fixed width regardless of the distance from the ABS 30. The wider part is arranged at a position distanced more from the ABS 30 than is the track width determining part and has a width greater than that of the track width determining part. The wider part has the same width as that of the track width determining part at the boundary with the track width determining part, gradually increases the width as it is distanced more from the ABS 30. The width extending part has a fixed width greater than the wider part. In this embodiment, a part from the magnetic pole end part 26a until the width begins to increase is defined as the track width determining part.

Further, as illustrated in FIG. 6, in the main magnetic pole layer 26, an upper tilted surface 26c and a lower tilted surface 26e are formed in the track width determining part.

The upper tilted surface 26c is formed in an ascending slope like shape distanced more from the substrate 1 as it is distanced more from the ABS 30. The upper tilted surface 26c is connected to the magnetic pole end face 26a and an upper end face 26d.

The lower tilted surface 26e is formed in a descending slope like shape closer to the substrate 1 as it is distanced more from the ABS 30. The lower tilted surface 26e is connected to the magnetic pole end face 26a and the lower end face 26f of the wider part. The lower tilted surface 26e is formed from the track width determining part to wider part. The lower end face 26f is disposed on the nearest position to the substrate 1 in the main magnetic pole layer 26.

In the main magnetic pole layer 26, nonmagnetic layers 27, 28 are laminated on a part of the upper end face 26d between the opposing shield part 61 and the upper yoke layer 65 which will be explained later, as also illustrated in FIG. 1.

A length of the above-described track width determining part from the ABS 30 is referred to as neck height. The neck height is about 0.05 to 0.3 μm, for example.

The gap layer 29 is formed along the upper tilted surface 26c and the upper end face 26d of the main magnetic pole layer 26 between the opposing shield part 61, the insulating layer 31 and the main magnetic pole layer 26, the nonmagnetic layers 27, 28. The gap layer 29 is formed so as to cover the upper tilted surface 26c and the upper end face 26d. The gap layer 29 is made of an insulating material such as alumina ($Al_2O_3$), nonmagnetic conductive material such as Ru, NiCu, Ta.

Subsequently, the shield magnetic layer 40 will be explained. The shield magnetic layer 40 is arranged at substrate 1 side of the main magnetic pole layer 26, as illustrated in FIG. 1. The shield magnetic layer 40 has a connecting shield part 41, a lower front shield part 42, a linking shield part 43, a first rear shield part 44, a second rear shield part 45, a third rear shield part 46, a leading shield part 47 and s side shield part 47A. The shield magnetic layer 40 is formed using a magnetic material made of a ferromagnetic body such as NiFe, CoNiFe, CoFe or the like.

The connecting shield part 41 and lower front shield part 42 are arranged closer to the ABS 30 than are the lower thin-film coil 11.

Besides, one part of the lower front shield part 42 overlies the connecting shield part 41. The connecting shield part 41 is arranged at a position distanced from the ABS 30. But, the lower front shield part 42 has a shield end face 42a arranged in the ABS 30 (see FIG. 6).

Here, the connecting shield part 41 will be explained in detail referring to FIG. 1, FIG. 6. The connecting shield part 41 connects the lower front shield part 42 and the linking shield part 43. The connecting shield part 41 is disposed at a position more distanced from the ABS 30 than is the opposing insulating layer 20.

The connecting shield part 41 has the upper end face 41a and the front end face 41b. In the connecting shield part 41, the upper end face 41a and the front end face 41b are connected to the lower front shield part 42. The upper end face 41a is disposed at a position most distanced from the substrate 1 in the connecting shield part 41. The front end face 41b is disposed at a position closest to the ABS 30 in the connecting shield part 41.

Next, the lower front shield part 42 will be explained in detail with reference to FIG. 1, FIG. 6, FIG. 9. The lower front shield part 42 has a front end face 42a, a tilted lower end face 42b, an upper end face 42c, a standing end face 42d, an intersecting end face 42e and a front end convex part 42P.

In the lower front shield part 42, the whole front end face 42a is disposed in the ABS 30. The tilted lower end face 42b is in direct contact with the above-described tilted upper end face 20a of the opposing insulating layer 20. The tilted lower end face 42b is formed, similarly to the tilted upper end face 20a, in a descending slope like shape closer to the substrate 1 as it is distanced more from the ABS 30. Further, the tilted lower end face 42b is formed with a fixed tilt from the ABS 30 to the connecting shield part 41. The surface is a flat surface without irregularities.

Further, in the lower front shield part 42, a front end angle Xα illustrated in FIG. 9 is set at an obtuse angle. The front end angle Xα represents an angle formed between the front end face 42a and the tilted lower end face 42b. The front end angle Xα is an angle measured clockwise from the front end face 42a to the tilted lower end face 42b.

The upper end face 42c is disposed at a position most distanced from the substrate 1 in the lower front shield part 42. The whole upper end face 42c is formed flat. The standing end face 42d is formed at a position most distanced from the ABS 30 in the tilted lower end face 42b. The standing end face 42d is formed in a manner to stand along the ABS 30 from the tilted lower end face 42b. Further, the standing end face 42d is in direct contact with the front end face 41b of the connecting shield part 41. The intersecting end face 42e is formed flat along a direction intersecting the ABS 30 from the uppermost part of the standing end face 42d. Further, the intersecting end face 42e is in direct contact with the upper end face 41a of the connecting shield part 41.

Further, as illustrated in detail in FIG. 9, the front end convex part 42P corresponds to a corner part where the front end face 42a intersects the tilted lower end face 42b. The front end convex part 42P is a rounded convex-shape part and is formed by the front end face 42a and the tilted lower end face 42b gently intersecting each other, unlike the case that the front end angle is set at a right angle such as an angle Xβ illustrated in FIG. 9.

The linking shield part 43 is formed such as to straddle the turn parts 11b, 11d, 11f of the lower thin-film coil 11, and connects the connecting shield part 41 and the first rear shield part 44 to each other. The linking shield part 43 has a function as a return pole which backs the magnetic flux emitted from the main magnetic pole layer 26.

The first, second, third rear shield parts 44, 45, 46 are arranged farther from the ABS 30 than are the turn parts 11b, 11d, 11f of the lower thin-film coil 11. The second rear shield part 45 overlies the first rear shield part 44, the third rear shield parts 46 overlies the second rear shield part 45. The first, second, third rear shield parts 44, 45, 46 form a three-stage structure in which their respective front side faces closer to the ABS 30 are equidistant from the ABS 30. The first, second, third rear shield parts 44, 45, 46 has a function as a linking part which link the linking part 43 to the main magnetic pole layer 26.

Next, the leading shield part 47 will be explained with reference to FIG. 7, FIG. 8, in addition to FIG. 6. The leading shield part 47 is connected to the lower front shield part 42. The side shield parts 47A, 47A are formed on the opposite side upper face of the leading shield part 47, as illustrated in FIG. 2.

In the leading shield part 47, the whole front end face 47d is arranged in the ABS 30. Its depth W47 is, for example, about 0.5 μm to 1.0 μm. The leading shield part 47 has an upper tilted surface 47a and a front upper tilted surface 47L. The upper tilted surface 47a is arranged on the main magnetic pole layer 26 side of the leading shield part 47. The upper tilted surface 47a is formed in a descending slope like shape closer to the substrate 1 as it is distanced more from the ABS 30. Further, a tilt angle of the upper tilted surface 47a (the angle seen from the direction intersecting the ABS 30) is gentler as it is distanced more from the ABS 30, and a part of the upper tilted surface 47a most distanced from the ABS 30 is a flat surface 47b generally along the direction intersecting the ABS 30.

The front upper tilted surface 47L is arranged at a position closer to the ABS 30 than is the upper tilted surface 47a. A part on the ABS 30 side from a boundary point 47P is the front upper tilted surface 47L, and a part on the side distanced from the ABS 30 is the upper tilted surface 47a. The front upper tilted surface 47L is formed along the lower tilted surface 26e of the main magnetic pole layer 26. The front upper tilted surface 47L is arranged closer to the main magnetic pole layer 26 than is the upper tilted surface 47a. Though the front upper tilted surface 47L is in contact with the main magnetic pole layer 26 with only the nonmagnetic thin-film 25 intervening therebetween, the upper tilted surface 47a is in contact with the main magnetic pole layer 26 via the nonmagnetic thin-film 25 and the middle insulating layer 49. The upper tilted surface 47a is arranged at a position distanced more from the main magnetic pole layer 26 than is the front upper tilted surface 47L by the intervening middle insulating layer 49.

Further, as illustrated in FIG. 7, the leading shield part 47 has a foremost part 47R and a rearmost part 47Q. The foremost part 47R is arranged in the ABS 30. The foremost part 47R is arranged at a position closest to the main magnetic pole layer 26 in the leading shield part 47 and arranged at a position where the distance from the main magnetic pole layer 26 is shortest.

The rearmost part 47Q is arranged on the upper tilted surface 47a. The rearmost part 47Q is arranged at a position most distanced from the ABS 30 in the upper tilted surface 47a.

The leading shield part 47 has a structure in which the rearmost part 47Q is distanced more from the main magnetic pole layer 26 than is the foremost part 47R. In this embodiment, such a structure is called a variable distance structure.

Further, in the leading shield part 47, an angle formed between the ABS 30 and the upper tilted surface 47a (a second formed angle) β is formed to be larger than an angle formed between the ABS 30 and the above-described lower tilted surface 26e of the main magnetic pole layer 26 (a first formed angle) α (α<β). However, the angle formed between the ABS 30 and the front upper tilted surface 47L is formed to be equal to the first formed angle α.

Figure 30:
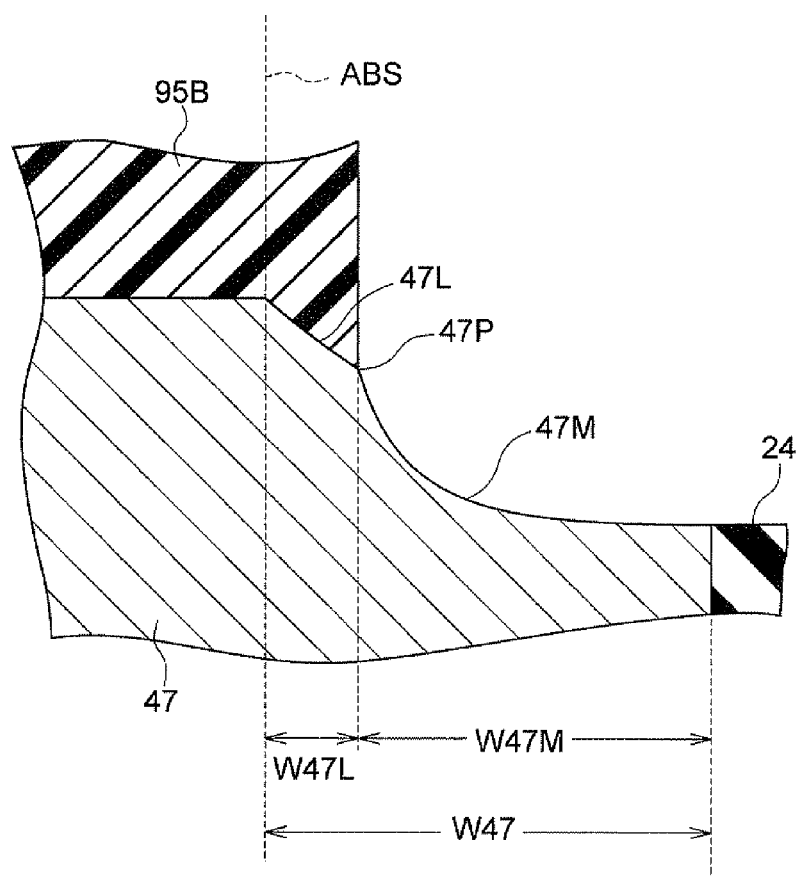
FIG. 30 is a sectional view illustrating an enlarged principal part of FIG. 26.
Figure 31:
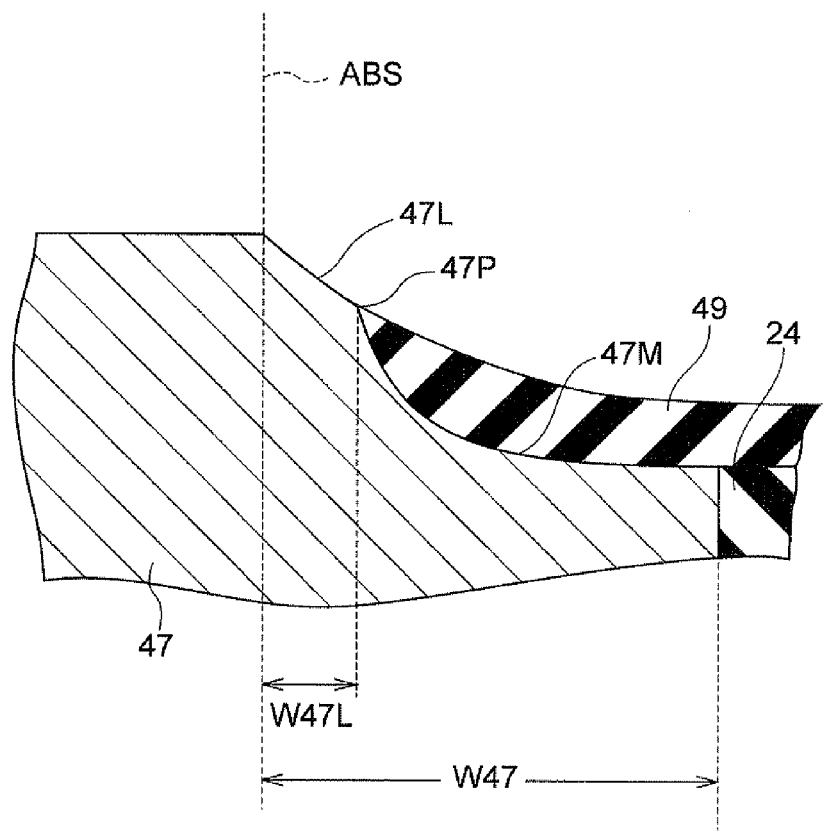
FIG. 31 is a sectional view illustrating an enlarged principal part of FIG. 28.
Figure 32:
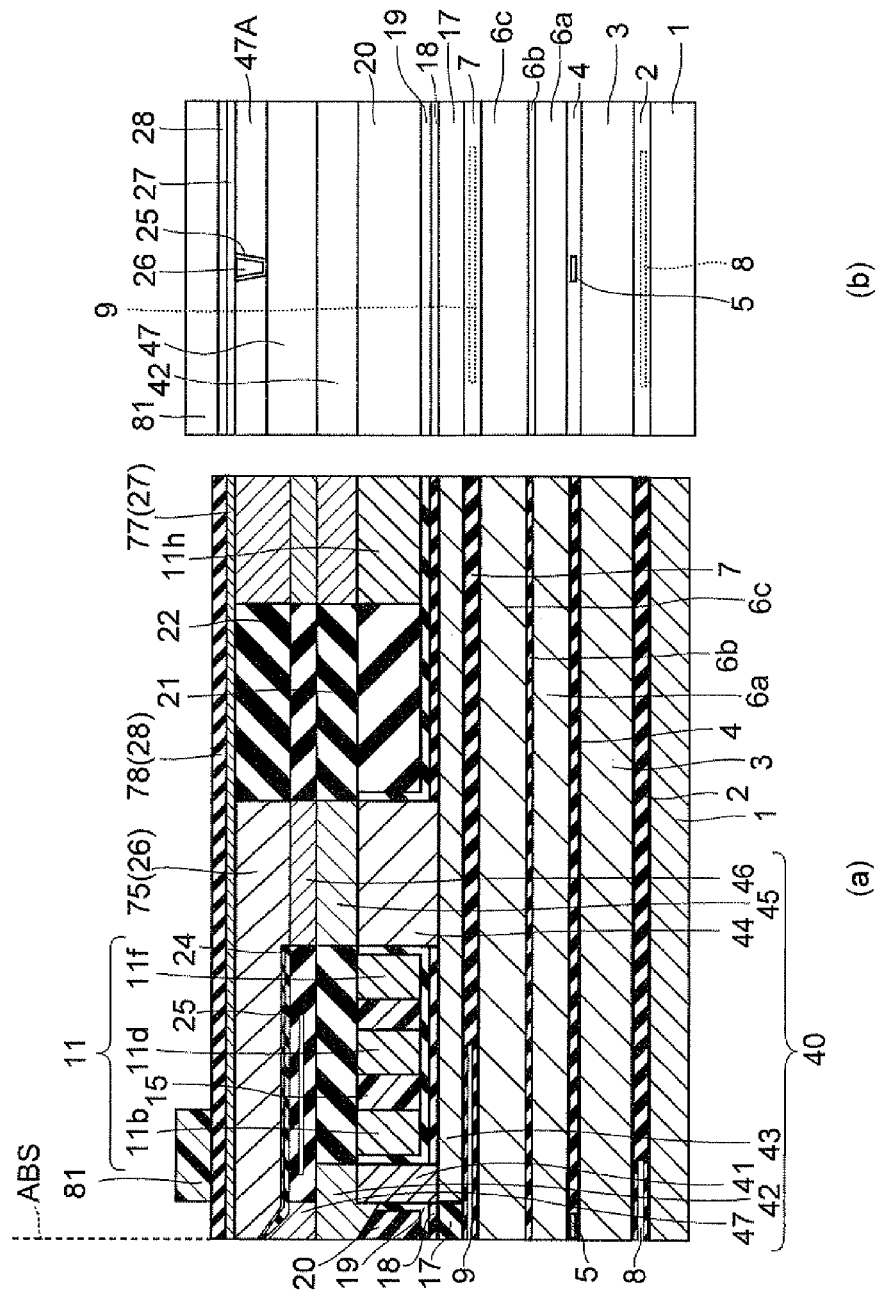
FIG. 32 illustrates a step subsequent to that of FIG. 29, in which (a) is a sectional view corresponding to FIG. 1, in which (b) is a front view corresponding to FIG. 2.

Further, in the leading shield part 47, a rearmost height H47Q including the rearmost part 47Q is formed to be smaller than a foremost height H47R along the ABS 30 including the foremost part 47R (H47R>H47Q). In addition, a depth W47M of the upper tilted surface 47a along the direction intersecting the ABS 30 is formed to be larger than a depth W47L of the front upper tilted surface 47L along the direction intersecting the ABS 30 (see FIG. 30).

The side shield parts 47A, 47A are formed on the leading shield part 47. The side shield parts 47A, 47A are arranged on both sides in the track width direction of the main magnetic pole layer 26 respectively. The side shield parts 47A, 47A also have shield end faces 47Aa arranged in the ABS 30 respectively (see FIG. 2). The side shield parts 47A, 47A and the leading shield part 47 are formed to surround the magnetic pole end face 26a via a nonmagnetic thin-film 25 and arranged near the main magnetic pole layer 26.

Further, the thin-film magnetic head 300 has the middle insulating layer 49. The middle insulating layer 49 is arranged between the lower tilted surface 26e, the lower end face 26f of the main magnetic pole layer 26 and the upper tilted surface 47a of the leading shield part 47, the base insulating layer 24. The middle insulating layer 49 has, at a part on the ABS 30 side, a structure in which the thickness in the direction along the ABS 30 becomes larger as it is distanced more from the ABS 30. In this embodiment, such a structure is called a variable thickness structure. Further, the middle insulating layer 49 is formed across the leading shield part 47 and the base insulating layer 24.

Next, the write shield layer 60 will be explained. The write shield layer 60 has the opposing shield part 61, an upper front shield part 62, a linking shield part 63 and a rear shield part 64.

The opposing shield part 61 has end face exposed at the ABS 30. The opposing shield part 61 opposes the leading shield part 47 within the ABS 30. Besides, a very small space which the gap layer 29 is arranged is formed in the front end face of the opposing shield part 61 exposed at the ABS 30. A part of ABS 30 side of the gap layer 29 is formed in the very small space. The opposing shield part 61 is formed such as to oppose the main magnetic pole layer 26, nonmagnetic layer 27, and nonmagnetic layer 28 sequentially from the ABS 30 side through the gap layer 29. The opposing shield part 61 has a flat upper face, the upper front shield part 62 is connected to the flat upper face.

The upper front shield part 62 is arranged closer to the ABS 30 than are the upper thin-film coil 51. This upper front shield part 62 will be explained with reference to FIG. 11, FIG. 12.

The upper front shield part 62 has a shield front end face 62b, a shield upper end face 62f, a shield connecting part 62c, and a shield lower end face 62r. The shield front end face 62b is disposed in the ABS 30. The shield front end face 62b is exposed in the ABS 30. In FIG. 11, a part with cross-hatching represents the shield front end face 62b. The shield upper end face 62f is disposed at a position distanced more from the substrate 1 than is the shield front end face 62b. The side distanced more from the substrate 1 is also called an upper side and the side closer to the substrate 1 is also called a lower side. The shield upper end face 62f is connected to the linking shield part 63. The shield upper end face 62f is formed along the direction intersecting the ABS 30. In addition, the shield upper end face 62f is formed separated from the ABS 30. The shield upper end face 62f has a size smaller than that of the shield lower end face 62r.

The shield connecting part 62c is a part connecting the shield front end face 62b to the shield upper end face 62f. The whole part of the shield connecting part 62c excepting a connecting part 62x with the shield front end face 62b is disposed at a position distanced from the ABS 30.

The shield connecting part 62c has a tilt structure tilted to be gradually distanced more from the ABS 30 as it gets closer, starting from the connecting part 62x, to a connecting part 62y connected to the shield upper end face 62f. The connecting part 62x is disposed in the ABS 30, but the connecting part 62y is disposed at a position distanced from the ABS 30 and thus receded from the ABS 30.

Further, as illustrated in FIG. 12, considering an imaginary flat surface 99 linking the connecting part 62x and the connecting part 62y, the flat surface 99 is a flat surface linking the shield front end face 62b and the shield upper end face 62f at a shortest distance. The shield connecting part 62c has a receding tilt structure tilted to be distanced more from the ABS 30 than is the flat surface 99. Further, the shield connecting part 62c has a lateral flat part 62c1, a longitudinal flat part 62c2, and a curved part 62c3 and has a structure that they are smoothly linked together into one body. The lateral flat part 62c1 is generally formed along the direction intersecting the ABS 30. The longitudinal flat part 62c2 is generally formed along the ABS 30.

The shield lower end face 62r is formed along the direction intersecting the ABS 30. The shield lower end face 62r has a size reaching the ABS 30. The shield lower end face 62r has a size larger than that of the shield upper end face 62f. The shield lower end face 62r is connected with the opposing shield part 61 on the ABS 30 side, and connected with the insulating layer 31 on the rear side of the shield lower end face 62r distanced more from the ABS 30.

The upper front shield part 62 has the above-described structure and therefore has an end face disposed in the ABS 30 that is smaller in size and in volume than that of the pre-trim front shield part 62A (the upper side in FIG. 12). The pre-trim front shield part 62A is a front shield part immediately before it is formed by performing a later-described trimming step. The pre-trim front shield part 62A has the shield upper end face 62f reaching the ABS 30 and has a pre-trim front end face 62a. Comparing the sizes of the pre-trim front end face 62a and the shield front end face 62b, the shield front end face 62b<the pre-trim front end face 62a.

Next, the linking shield part 63 will be explained. The linking shield part 63 is formed such as to straddle the turn part 51g, 51e, 51c of the upper thin-film coil 51. The linking shield part 63 is formed separated from the ABS 30. The linking shield part 63 is connected to the upper front shield part 62 and the rear shield part 64.

The rear shield part 64 is arranged at a position distanced more from the ABS 30 than is the turn part 51g, 51e, 51c of the upper thin-film coil 51. The rear shield part 64 is connected to the linking shield part 63 and the upper yoke layer 65. A height of the rear shield part 64 is equal to a height of the upper front shield part 62. Therefore, the rear shield part 64 forms a common flat surface 59 together with the upper thin-film coil 51 and shield upper end face 62f.

Figure 33:
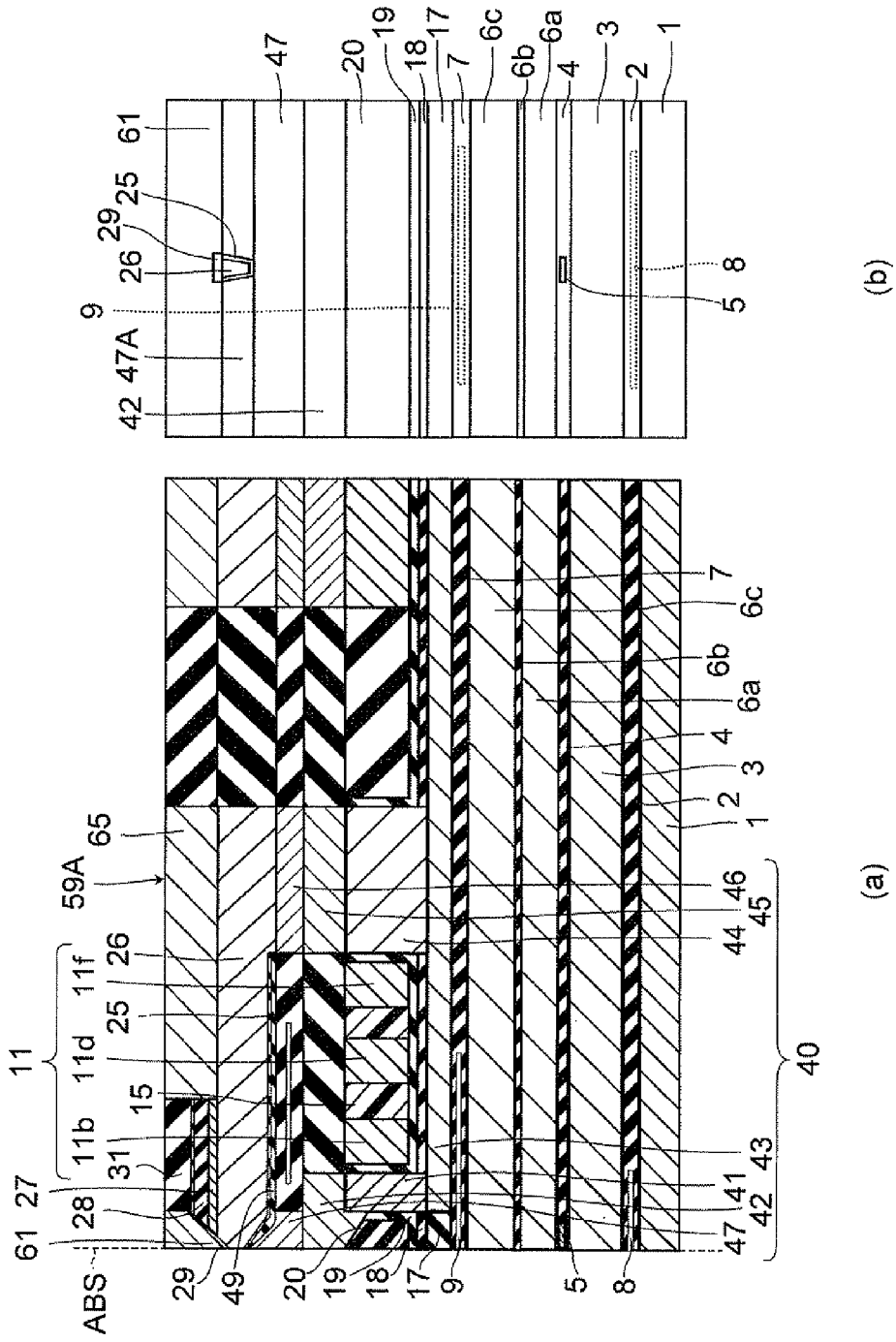
FIG. 33 illustrates a step subsequent to that of FIG. 32, in which (a) is a sectional view corresponding to FIG. 1, in which (b) is a front view corresponding to FIG. 2.
Figure 34:
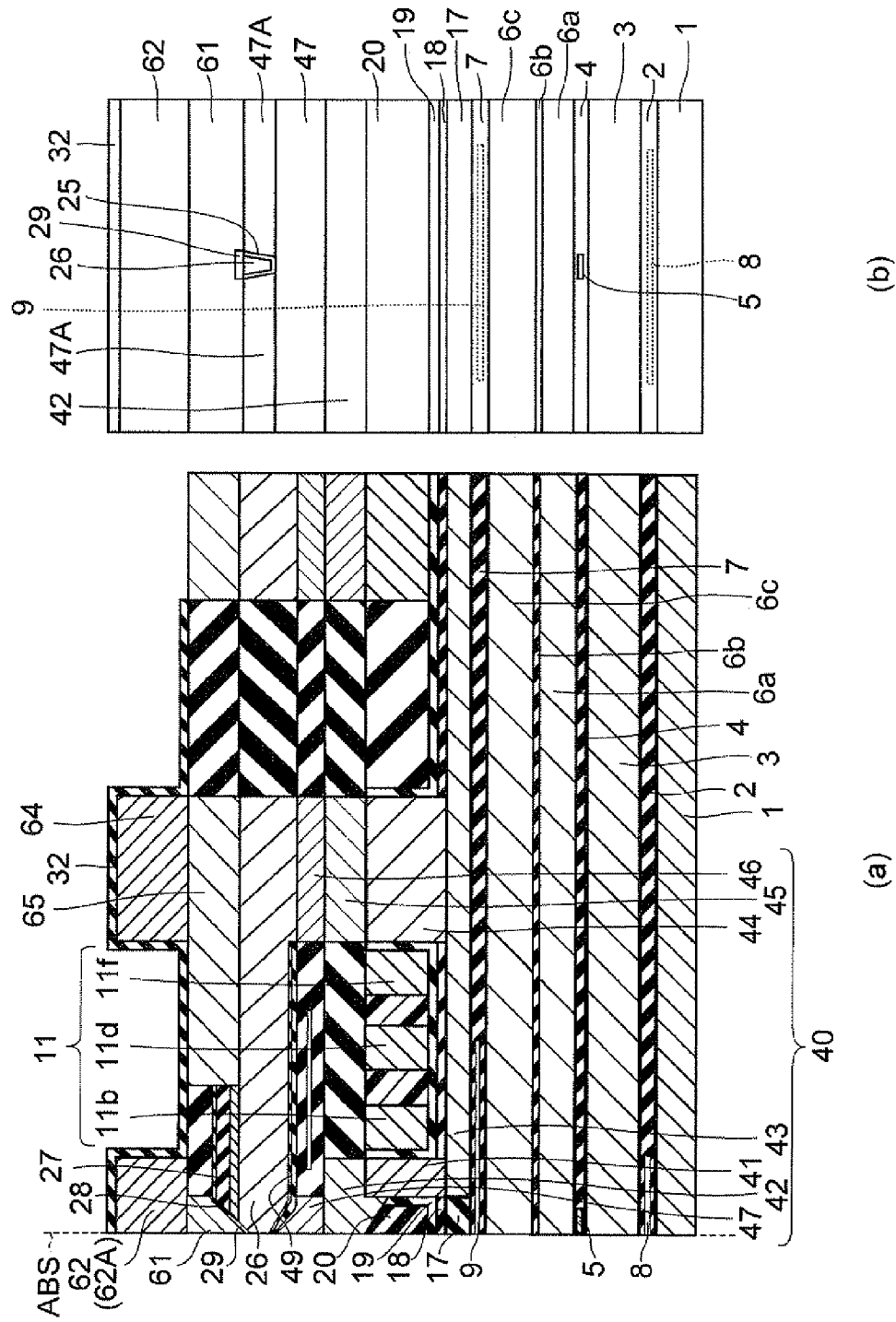
FIG. 34 illustrates a step subsequent to that of FIG. 33, in which (a) is a sectional view corresponding to FIG. 1, in which (b) is a front view corresponding to FIG. 2.
Figure 35:
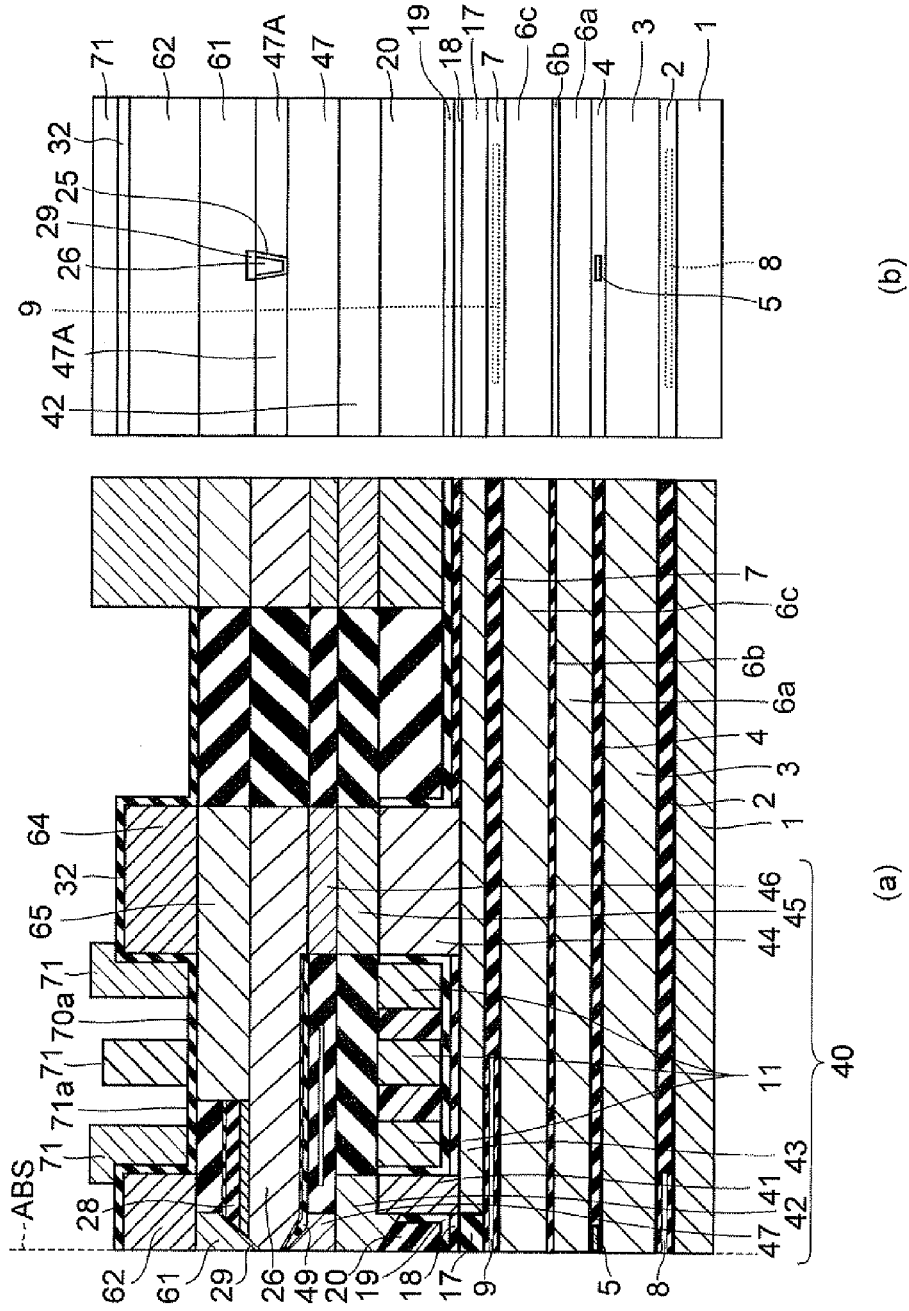
FIG. 35 illustrates a step subsequent to that of FIG. 34, in which (a) is a sectional view corresponding to FIG. 1, in which (b) is a front view corresponding to FIG. 2.

The upper yoke layer 65 is connected to a rear side of the upper end face 26d in the main magnetic pole layer 26, distanced more from the ABS 30 than is the nonmagnetic layers 27, 28. An upper end face of the upper yoke layer 65 is formed without level difference to an upper end face of the opposing shield part 61. The upper end face of the upper yoke layer 65 forms a common flat surface 59A (see FIG. 33) together with the upper end face of the opposing shield part 61.

Moreover, the thin-film magnetic head 300 has a displacement suppression layer 85. The displacement suppression layer 85 is connected an upper end face of the linking shield part 63. The displacement suppression layer 85 is formed from a nonmagnetic material having a low coefficient of linear thermal expansion. For example, the displacement suppression layer 85 is preferably made of an inorganic or metal material, examples of which include SiC, MN, $Si_3N_4$, and W (tungsten). It will be preferred in particular to use a nonmagnetic material having a high hardness for the displacement suppression layer 85. For example, the displacement suppression layer 85 is preferably made of SiC, which has a Vickers hardness higher than that of alumina.

Further, the thin-film magnetic head 300 has a protective insulating layer 90. The protective insulating layer 90 is formed using an insulating material such as alumina ($Al_2O_3$). The protective insulating layer 90 has an embedded part 90a and a cover part 90b. The embedded part 90a and the cover part 90b are formed in one body. The embedded part 90a comes in contact with an all of the shield connecting part 62c, and is embedded with no space between the shield connecting part 62c and the ABS 30. The cover part 90b is formed so as to cover the linking shield part 63 and the displacement suppression layer 85.

(Method of Manufacturing Thin-Film Magnetic Head)

A method of manufacturing the thin-film magnetic head 300 having the structure mentioned above will now be explained with reference to FIG. 13(a), FIG. 13(b) to FIG. 19(a), FIG. 19(b), FIG. 20, FIG. 21(a), FIG. 21(b), FIG. 22 to FIG. 31, FIG. 32(a), FIG. 32(b) to FIG. 38(a), FIG. 38(b), FIG. 39, together with FIG. 1, FIG. 2, FIG. 6 to FIG. 9, FIG. 12 mentioned above.

Figure 20:
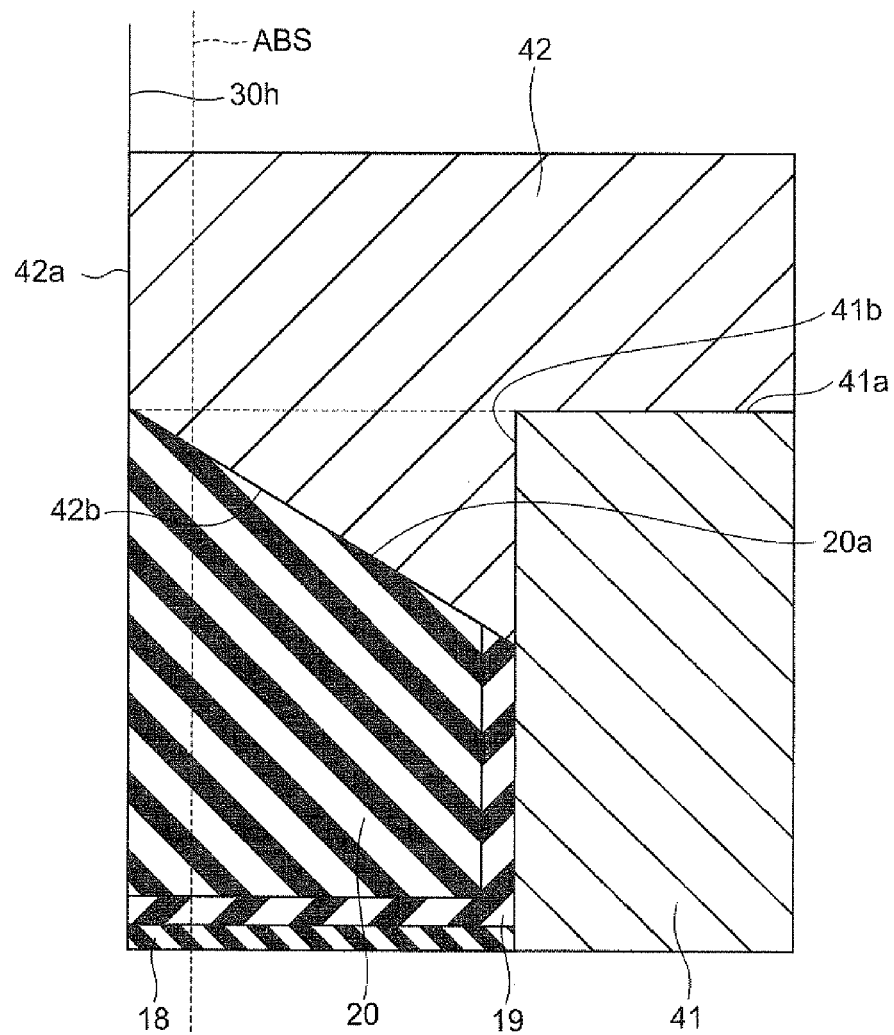
FIG. 20 is a sectional view illustrating a principal part of FIG. 19 (*a*)
Figure 39:
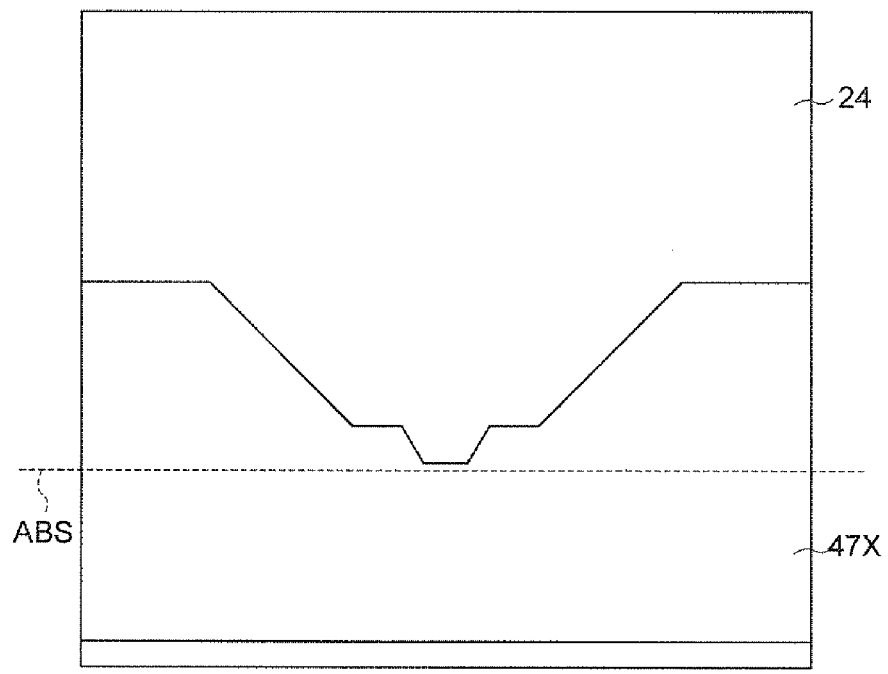
FIG. 39 is a plan view illustrating a principal part of multilayer body in a step of manufacturing a thin-film magnetic head 300.

FIG. 13(a) to FIG. 19(a), FIG. 21(a) and FIG. 32(a) to FIG. 38(a) are sectional view corresponding to FIG. 1 in respective step of manufacturing the thin-film magnetic head 300, while FIG. 13(b) to FIG. 19(b), FIG. 21(b) and FIG. 32(b) to FIG. 38(b) are front view similarly corresponding to FIG. 2. FIG. 20 is a sectional view illustrating a principal part of FIG. 19(a). FIG. 22 to FIG. 29 are sectional views illustrating an enlarged principal part in respective step of manufacturing the thin-film magnetic head 300. FIG. 39 is a plan view illustrating a principal part of multilayer body in a step of manufacturing the thin-film magnetic head 300. In each drawing, "ABS" represents a planned line which the ABS will be formed later. The planned line is formed on straight line, as illustrated in FIG. 39.

First, the substrate 1 made of a ceramic material such as aluminum oxide-titanium carbide ($Al_2O_3$.TiC) is prepared. Subsequently, as illustrated in FIG. 13(a), FIG. 13(b), the insulating layer 2 made of an insulating material such as alumina ($Al_2O_3$) and the lower shield layer 3 made of a magnetic material are successively formed on the substrate 1. The heating part 8 is formed when the insulating layer 2 is formed.

Then, the shield gap film 4 is formed by an insulating material such as to shield the MR device 5. Here, an undepicted lead connected to the MR device 5 is formed, and the MR device 5 and the lead are covered with the shield gap film 4. Thereafter, using a magnetic material and an insulating material, the upper shield layer 6 (the first shield part 6a, the insulating part 6b, the second shield part 6c) is formed on the shield gap film 4.

Next, the insulating layer 7 for separating the upper shield layer 6 and a recording head to be formed later from each other is formed on the upper shield layer 6 with an insulating material such as alumina ($Al_2O_3$). The heat sensing part 9 is formed when the insulating layer 7 is formed. The foregoing steps yield a multilayer body for forming the recording head. Thereafter, a magnetic layer (having a thickness of about 0.6 μm) for forming the linking shield part 43 is formed by using a magnetic material such as NiFe or CoNiFe or the like, so as to form an insulating layer on the surface of the multilayer body, and the surface of the multilayer body is flattened by chemical mechanical polishing (hereinafter, referred to as "CMP"). This forms an opposing insulating layer 17 and the linking shield part 43. Here, the linking shield part 43 is formed such as to be separated from the ABS 30 by 0.3 to 1 μm (about 0.5 μm in this embodiment).

Subsequently, an insulating layer 18 (having a thickness of about 0.1 μm to 0.3 μm) made of alumina ($Al_2O_3$) is formed on the whole surface of the multilayer body. Then, after applying a photoresist to the whole surface of the multilayer body, patterning is performed with a predetermined photomask, so as to form a resist pattern (not depicted). Using this resist pattern as a mask, etching such as RIE is performed, so as to selectively perforate the insulating layer 18. Thereafter, a connecting shield part forming step is performed. In this step, by frame plating method using a magnetic material made of a ferromagnetic body such as NiFe or CoNiFe or the like, the connecting shield part 41, the first rear shield part 44 are formed by a thickness of about 1-1.5 μm each.

Next, as illustrated in FIG. 14(a), FIG. 14(b), an insulating layer 19 (having a thickness of about 0.02 μm to 0.3 μm, preferably about 0.1 μm to 0.2 μm) made of alumina ($Al_2O_3$) is formed on the whole surface of the multilayer body by CVD (Chemical Vapor Deposition) according to an atomic layer method. The insulating layer 19 is formed so as to cover the connecting shield part 41 and the first rear shield part 44.

Then, a conductor layer 70 is formed by performing a conductor layer forming step. The conductor layer 70 is formed to form the lower thin-film coil 11. In this step, first, a conductor layer 70 is formed between the connecting shield part 41 and the first rear shield part 44 by frame plating method. The conductor layer 70 is formed such as to have two interstices 70a between the connecting shield part 41 and the first rear shield part 44 and come into contact with the connecting shield part 41 and the first rear shield part 44 through the insulating layer 19 without gaps. The conductor layer 70 is an intermittent conductor layer, since it is provided with interstices 70a.

Next, as illustrated in FIG. 15(a), FIG. 15(b), a photoresist layer 80 (having a thickness of about 1.5 μm to 2.5 μm) is formed so as to be embedded the two interstices 70a in the conductor layer 70. Next, an insulating film 20 adapted to cover the surface of the multilayer body is formed using alumina ($Al_2O_3$) by a thickness of about 3 μm to 4 μm. Subsequently, the surface of the multilayer body is polished by CMP until the connecting shield part 41 and the first rear shield part 44 emerge, so as to become flat.

Then, as illustrated in FIG. 16(a), FIG. 16(b), a flattening step of the connecting shield part 41 and the first rear shield part 44 with the conductor layer 70 is performed. In this case, since the opposing insulating layer 20 is formed by performing the flattening step, the flattening step has meaning as an opposing insulating layer forming step. Further, the lower thin-film coil 11 is formed with the opposing insulating layer 20.

Subsequently, as illustrated in FIG. 17(a), FIG. 17(b), a resist pattern 79 exposing the surfaces of the opposing insulating layer 20 and the insulating layer 19 therein is formed. Subsequently, a tilt processing step is performed. In tilt processing step, wet etching, ion beam etching and so on are performed with the resist pattern 79 as a mask to scrape off the surfaces of the opposing insulating layer 20 and the insulating layer 19 as illustrated in FIG. 18(a), FIG. 18(b) to thereby form a depression in the surface of the opposing insulating layer 20. In this case, the surface of the opposing insulating layer 20 and the surface of the insulating layer 19 are scraped such that the surfaces after the scraping are formed in a descending slope like shape, whereby the tilted upper end face 20a is formed at the uppermost surface of the opposing insulating layer 20. Further, in the tilt processing step, wet etching and so on are performed so as to expose a part on the ABS 30 side of the connecting shield part 41. Furthermore, in the tilt processing step, wet etching and so on are performed such that the whole uppermost surface (the upper end face most distanced from the substrate 1) of the opposing insulating layer 20 is disposed at a position closer to the substrate 1 than is the upper end face 41a.

Subsequently, as illustrated in FIG. 19(a), FIG. 19(b), an insulating layer 21 (having a thickness of about 0.3 μm to 0.7 μm) made of alumina ($Al_2O_3$) is formed on the whole surface of the multilayer body. After that, the insulating layer 21 is selectively perforated.

Next, a lower front shield part forming step is performed to form the lower front shield part 42 whose front end angle Xα is an obtuse angle. In this step, by frame plating method using a magnetic material made of a ferromagnetic body such as NiFe or CoNiFe or the like, both the lower front shield part 42 and the second rear shield part 45 are formed by a thickness of about 0.5 μm to 1.2 μm each. In this case, since the tilted upper end face 20a in a descending slope like shape is formed in the uppermost surface of the opposing insulating layer 20 by the above-described tilt processing step, the frame plating method is performed such that the magnetic material comes into direct contact with the tilted upper end face 20a, whereby the lower front shield part 42 is formed. The lower front shield part forming step is performed in this manner. Further, since the connecting shield part 41 on the ABS 30 side is exposed in the tilt processing step, the lower front shield part 42 is formed to come into contact with not only the upper end face 41a but also the front end face 41b.

Note that the ABS 30 is not formed yet at this point of time. Therefore, a flat front end face 30h without level difference is formed of the front end face of the lower front shield part 42 and the front end face of the opposing insulating layer 20 as illustrated in FIG. 20.

Figure 21:
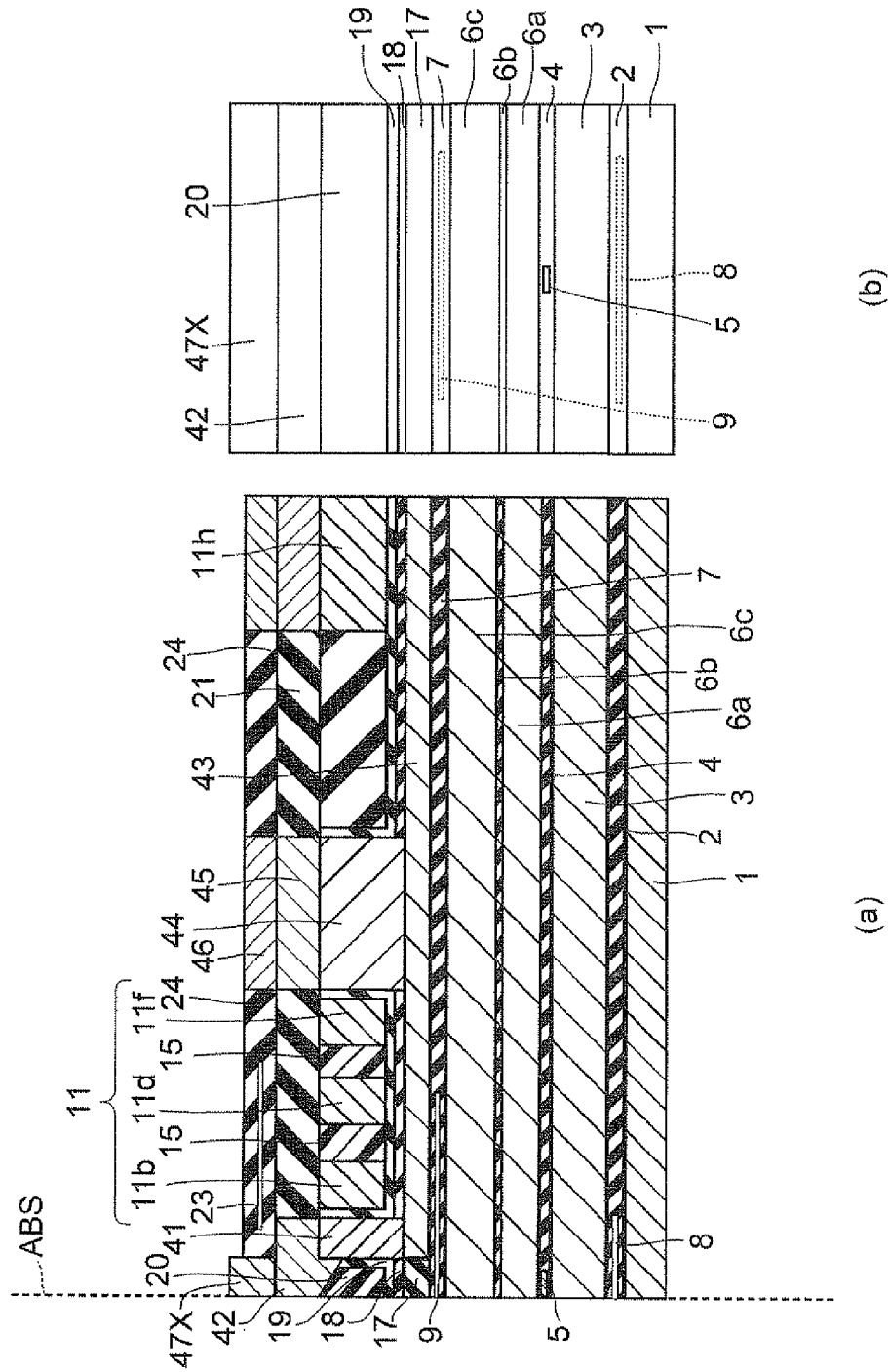
FIG. 21 illustrates a step subsequent to that of FIG. 19, in which (a) is a sectional view corresponding to FIG. 1, in which (b) is a front view corresponding to FIG. 2.

After that, the surface of the multilayer body is polished by CMP so as to become flat. Then, as illustrated in FIG. 21(a), FIG. 21(b), the base insulating layer 24 is formed using an insulating material such as alumina ($Al_2O_3$) or the like. The heating part 23 is formed when the base insulating layer 24 is formed. After that, the base insulating layer 24 is selectively perforated. Subsequently, a magnetic part 47X (a leading magnetic part) for forming the leading shield part 47 and the third rear shield parts 46 are formed at the perforated part in a thickness of 0.5 µm to 1.0 µm by the frame plating method using a magnetic material made of a ferromagnetic body such as NiFe or CoNiFe.

Figure 22:
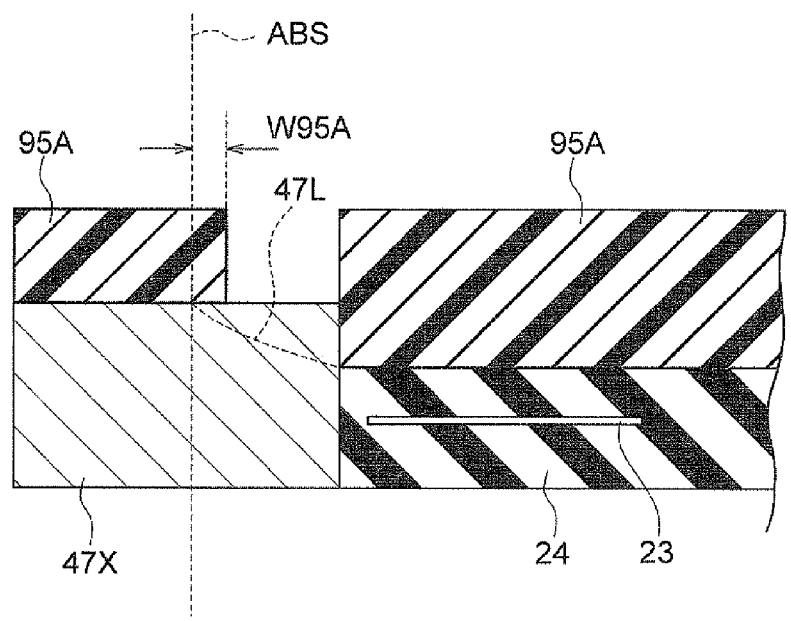
FIG. 22 is a sectional view illustrating an enlarged principal part in a step subsequent to that of FIG. 21.

Further, photoresist is applied on the surface of the multilayer body and then patterned using a predetermined photomask to form a resist pattern 95A on the surface of the multilayer body, as illustrated in FIG. 22. In this case, the resist pattern 95A is formed such that a part of the leading magnetic part 47X most distanced from the ABS 30 ("ABS") is exposed. In this case, the resist pattern 95A is formed in such a form that the end part of the resist pattern 95A bulges out by a width W95A from the "ABS." The leading magnetic part 47X is arranged in an area including the planned line of the surface of the multilayer body as illustrated in FIG. 39.

Figure 23:
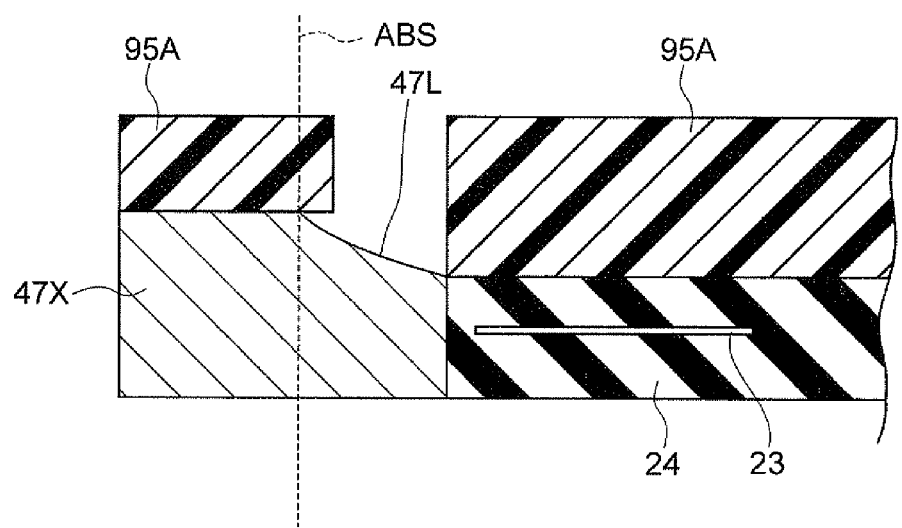
FIG. 23 is a sectional view illustrating an enlarged principal part in a step subsequent to that of FIG. 22.

Subsequently, a first removal step is performed. In this step, isotropic etching such as plasma etching is performed using the resist pattern 95A as a mask to remove the exposed surface of the leading magnetic part 47X on the main magnetic pole layer 26 side which is not covered with the resist pattern 95A. Then, as illustrated in FIG. 23, an undercut is formed at a part covered with the resist pattern 95A, and the appearing surface 47L in a descending slope like shape with a gentle slope appears.

Figure 24:
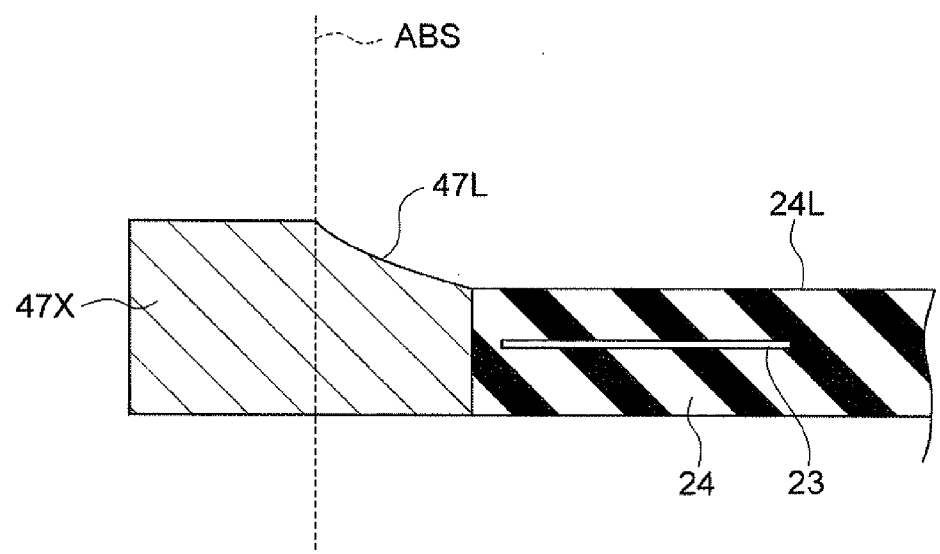
FIG. 24 is a sectional view illustrating an enlarged principal part in a step subsequent to that of FIG. 23.

Thereafter, by removing the resist pattern 95A, the leading magnetic part 47X including the appearing surface 47L is obtained as illustrated in FIG. 24.

Figure 25:
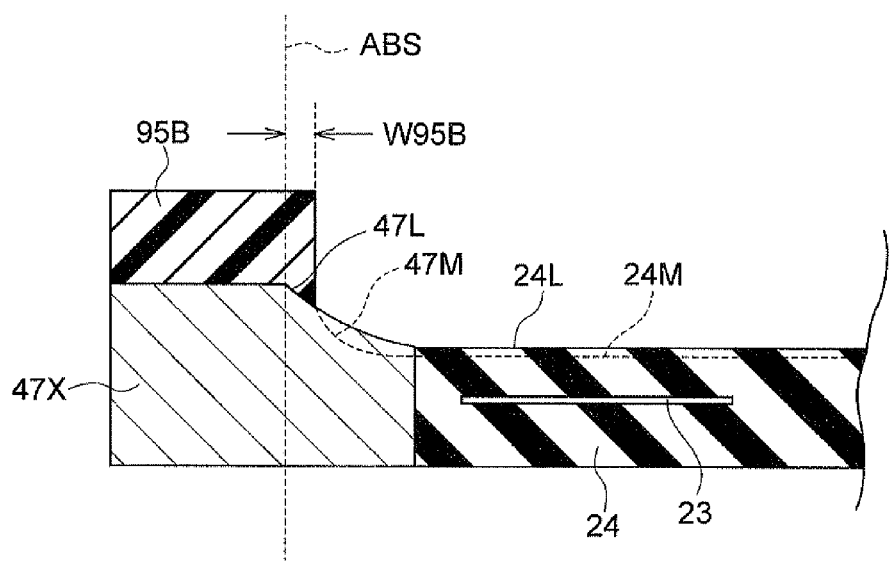
FIG. 25 is a sectional view illustrating an enlarged principal part in a step subsequent to that of FIG. 24.

Subsequently, a second removal step is performed. In this step, a photoresist is applied on the surface of the multilayer body, and patterning using a predetermined photomask is performed thereon to form a resist pattern 95B on the surface of the multilayer body as illustrated in FIG. 25. In this case, the resist pattern 95B is formed in such a form to bulge out by a width W95B from the "ABS." The resist pattern 95B is formed to cover a part of the appearing surface 47L on the "ABS" side. Further, the depth of a part of the appearing surface 47L not covered with the resist pattern 95B is made larger than the depth along the direction intersecting the ABS 30 of the part covered with the resist pattern 95B. In other words, the resist pattern 95B is formed such that the width W47M is larger than the width W47L illustrated in FIG. 30.

Figure 26:
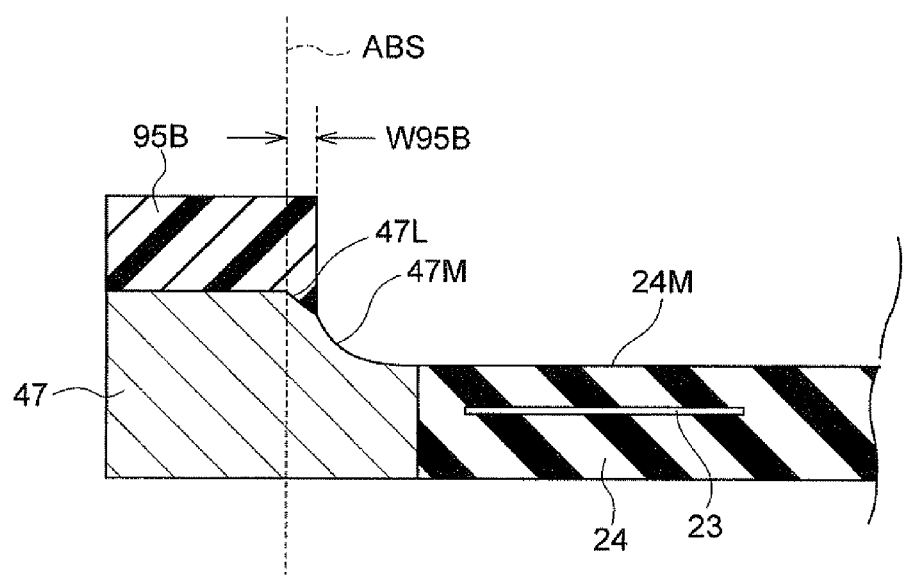
FIG. 26 is a sectional view illustrating an enlarged principal part in a step subsequent to that of FIG. 25.

Then, reactive ion etching (hereinafter, referred also to as "RIE") or the like is performed using the resist pattern 95B as a mask to remove the part of the appearing surface 47L not covered with the resist pattern 95B, that is, the part most distanced from the "ABS" together with the surface 24L of the base insulating layer 24. Then, as illustrated in FIG. 26, a tilted surface 47M in a descending slope like shape appears at a part of the appearing surface 47L distanced from the "ABS." Since the tilted surface 47M is formed by removing a part of the appearing surface 47L, the tilted surface 47M is arranged at a position closer to the substrate 1. The tilted surface 47M is larger in tilt angle than the appearing surface 47L. Further, by removing the surface 24L, a surface 24M appears on the base insulating layer 24. The tilted surface 47M obtained by performing the second removal step corresponds to the above-described upper tilted surface 47a and the remaining part of the appearing surface 47L corresponds to the front upper tilted surface 47L.

Next, a middle insulating layer forming step is performed. In this step, lift-off procedures are performed as follows to form the above-described middle insulating layer 49.

Figure 27:
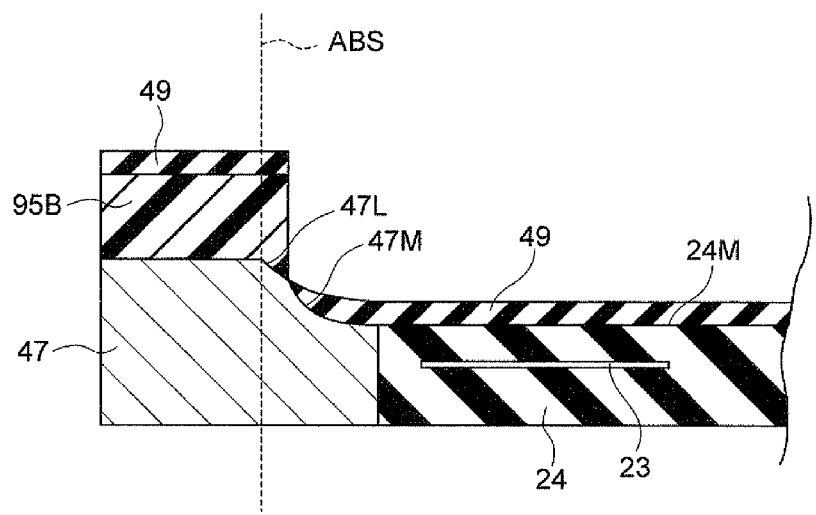
FIG. 27 is a sectional view illustrating an enlarged principal part in a step subsequent to that of FIG. 26.

First, as illustrated in FIG. 27, sputtering, evaporation or the like is performed with the resist pattern 95B left to form an insulating layer 49 made of aluminum on the surface of the multilayer body. This insulating layer 49 is formed on the tilted surface 47M and the surface 24M of the base insulating layer 24 and also formed on the resist pattern 95B. Thereafter, the resist pattern 95B is removed using a resist stripping solution. Then, the resist pattern 95B is removed together with the insulating layer 49 formed thereon, whereby the middle insulating layer 49 is formed of the remaining insulating layer 49 as illustrated in FIG. 28.

Figure 28:
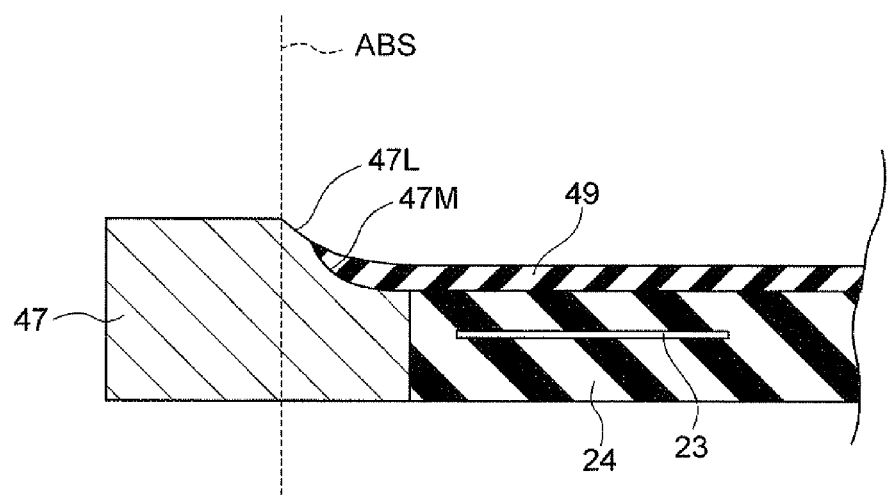
FIG. 28 is a sectional view illustrating an enlarged principal part in a step subsequent to that of FIG. 27.
Figure 29:
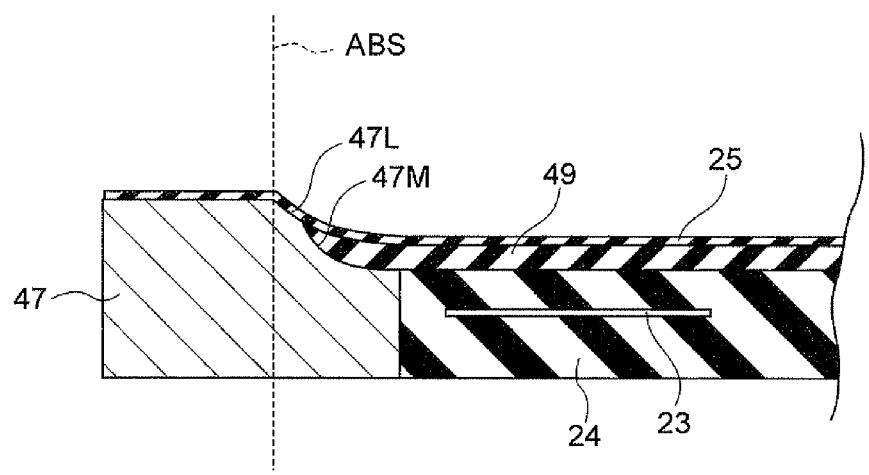
FIG. 29 is a sectional view illustrating an enlarged principal part in a step subsequent to that of FIG. 28.

Next, the side shield parts 47A are formed on the leading shield part 47, by frame plating method using a magnetic material made of a ferromagnetic body such as NiFe or CoNiFe by a thickness of about 0.5 µm to 0.8 µm each (the side shield parts 47A are not illustrated in FIG. 28, FIG. 29).

After that, as illustrated in FIG. 29, FIG. 32(a), FIG. 32(b), a nonmagnetic thin-film 25 is formed so as to cover the middle insulating layer 49 and the side shield parts 47A. The nonmagnetic thin-film 25 is formed by sputtering with a nonmagnetic metal material such as Ru, NiCr, or NiCu, or an insulating material such as alumina.

Subsequently, the main magnetic pole layer 26 is formed by performing a main magnetic pole layer forming step. The main magnetic pole layer 26 is formed on an "ABS" side part of the appearing surface 47L and the surface of the middle insulating layer 49 through the nonmagnetic thin-film 25.

In this case, a magnetic layer 75 having a thickness of about 0.4 to 0.8 µm is formed with a magnetic material made of a ferromagnetic body such as CoNiFe, CoFe, NiFe, for example by sputtering. By this magnetic layer 75, the main magnetic pole layer 26 will be formed later. Further, the whole surface of the multilayer body is polished by CMP, so as to become flat.

After that, a nonmagnetic layer 77 (having a thickness of about 0.04 to 0.1 µm) is formed on the surface of the multilayer body by sputtering with a metal material such as Ru, NiCr, or NiCu. The nonmagnetic layer 77 will partly be etched away later, so as to become the above-mentioned nonmagnetic layer 27. Further, using an inorganic insulating material such as alumina ($Al_2O_3$) or silicon oxide, a nonmagnetic layer 78 (having a thickness of about 0.1 to 0.3 µm) is formed on the whole surface of the multilayer body. The nonmagnetic layer 78 will partly be etched away later, so as to become the above-mentioned nonmagnetic layer 28.

Subsequently, after applying a photoresist to the whole surface of the multilayer body, patterning with a predetermined photomask is performed, so as to form a resist pattern 81 near the ABS 30.

Next, using the resist pattern 81 as a mask, etching such as RIE, for example, is performed, so as to remove a part of the nonmagnetic layer 78. The etching in this case is performed such as to stop at the time when the bottom part of a groove formed by etching reaches the upper face of the nonmagnetic layer 77. To this aim, a material yielding an etching rate lower than that of the nonmagnetic layer 77 is used for the nonmagnetic layer 78.

After that, the resist pattern 81 is removed. Then, using the remaining nonmagnetic layer 78 as a mask, a part of the nonmagnetic layer 77 is etched away by IBE, for example. Further, using the remaining nonmagnetic layer 77 as a mask, a part of the nonmagnetic layer 75 is etched away by IBE, for example. This step forms the upper tilted surface 26c on the ABS side of the magnetic layer 75.

Subsequently, as illustrated in FIG. 33(a), 33(b), the gap layer 29 is formed on the whole surface of the multilayer body by sputtering or CVD with an insulating material such as alumina ($Al_2O_3$) or a nonmagnetic conductive material such as Ru, NiCu, or Ta.

Further, an undepicted stopper film is formed by sputtering, for example, and a nonmagnetic film is formed thereon. Subsequently, an undepicted photoresist is applied to the whole surface of the multilayer body. Then, patterning with a predetermined photomask is performed, so as to form an undepicted resist pattern. Using this resist pattern as a mask, the nonmagnetic film is etched by RIE, for example. This etching is performed such as to stop when the bottom part of a groove formed by etching reaches the upper face of the stopper film. Then, after removing the resist pattern that is not depicted, the remaining nonmagnetic film is used as a mask for partly etching the gap layer 29, nonmagnetic layer 77 and nonmagnetic layer 78 away by RIE or the like. Here, the gap layer 29, nonmagnetic layer 77 and nonmagnetic layer 78 are partly removed, so as to secure a space for forming the above-mentioned upper yoke layer 65.

Subsequently, the opposing shield part 61 is formed by performing an opposing shield part forming step. In this step, first, a magnetic layer is formed on the surface of the multi-layer body. This magnetic layer is formed by plating method using a magnetic material made of a ferromagnetic body such as CoNiFe, CoFe, CoFeN, NiFe or the like by a thickness of about 0.5 to 1.2 μm. This magnetic layer will later form the opposing shield part 61 and the upper yoke layer 65.

Subsequently, an insulating layer (having a thickness of about 1 to 3 μm) is formed on the whole surface of the multilayer body using an insulating material such as alumina ($Al_2O_3$). Further, the whole surface of the multilayer body is polished by CMP until a surface of the magnetic layer is exposed, so as to be made flat. This forms the opposing shield part 61, the upper yoke layer 65 and an insulating layer 31. At this time, the surface of the multilayer body is polished such that the opposing shield part 61 has a thickness of about 0.5 to 1.0 μm.

Next, a first shield part forming step is performed. In this step, as illustrated in FIG. 34(a), FIG. 34(b), at parts of the surface of the multilayer body where the upper front shield part 62 and the rear shield part 64 will be formed, the pre-trim front shield part 62A and the rear shield part 64 are formed respectively. In this event, the pre-trim front shield part 62A is disposed in the ABS 30 and therefore corresponds to the first shield part. In the first shield part forming step, the pre-trim front shield part 62A and the rear shield part 64 are formed by, for example, frame plating method using a magnetic material made of a ferromagnetic body such as NiFe or CoNiFe. In this event, the space between the pre-trim front shield part 62A and the rear shield part 64 is made to range from about 3.0 μm to about 3.5 μm.

In addition, the pre-trim front shield part 62A is formed to be connected to the opposing shield part 61 and disposed in the ABS 30. The pre-trim front shield part 62A has a shape illustrated on the upper side in FIG. 12. In the pre-trim front shield part 62A, the whole front end face 62a is disposed in the ABS 30.

Then, after forming an interlayer insulating layer 32 on the surface of the multilayer body using alumina ($Al_2O_3$) and so on, as illustrated in FIG. 35(a), FIG. 35(b), a conductor layer 71 is formed on the surface of multilayer body between the first shield part (pre-trim front shield part 62A) and the rear shield part 64. This conductor layer 71 will later form the upper thin-film coil 51. The conductor layer 71 is formed such as to have two interstices 71a and come into contact with the first shield part (pre-trim front shield part 62A) and the rear shield part 64 through an interlayer insulating layer 32 without gaps. The conductor layer 71 is an intermittent conductor layer, since it is provided with interstices 71a.

After that, a photoresist layer 55 (having a thickness of about 2 μm to 3 μm) is formed so as to cover the two interstices 71a in the conductor layer 71, a cover insulating film adapted to cover the surface of the multilayer body is formed using alumina ($Al_2O_3$) by a thickness of about 3 μm to 4 μm. Subsequently, the surface of the multilayer body is polished by CMP until the pre-trim front shield part 62A and the rear shield part 64 emerge, so as to become flat.

This forms the upper thin-film coil 51 and the photoresist layer 55, as illustrated in FIG. 36(a), FIG. 36(b). In this event, flattening of the surface of the multilayer body is performed so that the thickness of the upper thin-film coil 51 is about 1.0 μm to 1.8 μm. Besides, the above-described common flat surface 59 is formed by the flattening of the surface of the multilayer body.

Subsequently, as illustrated in FIG. 37(a), FIG. 37(b), an insulating layer 34 is formed on the whole surface of the multilayer body using an insulating material such as alumina ($Al_2O_3$), and the insulating layer 34 is partially perforate. After that, a linking shield part forming step is performed. In this step, the linking shield part 63 is formed by frame plating method using a magnetic material made of a ferromagnetic body such as NiFe, CoNiFe or the like. The linking shield part 63 is formed so as to connect to the pre-trim shield part 62A. The linking shield part 63 is formed so as to straddle the turn parts 51g, 51e, 51c of the upper thin-film coil 51 through the insulating layer 34.

Further, the linking shield part 63 is receded from the front end face 30h (also receded from the ABS 30) and formed at a position distanced from the ABS 30. In other words, the linking shield part 63 is formed at a position where a receding space 63h is ensured between the linking shield part 63 and the ABS 30. The receding space 63h becomes an elongated part having a width, for example, about 0.4 μm to 0.7 μm along the ABS 30 and the same height as that of the linking shield part 63.

Next, a trimming step is performed. In this step, as illustrated in FIG. 38(a), FIG. 38(b), IBE is performed by applying ion beams IB from the upper direction using the linking shield part 63 as a mask to cut off the part of the pre-trim front shield part 62A which is not covered with the linking shield part 63. Since the part of the pre-trim front shield part 62A on the ABS side is not covered with the linking shield part 63, the part on the ABS side of the pre-trim front shield part 62A is cut off by performing IBE. In this event, IBE is performed in a manner to leave a part of the pre-trim front end face 62a of the pre-trim front shield part 62A disposed in the ABS 30. Thus, as shown in FIG. 12, the above-described shield front end face 62b is formed of the part of the pre-trim front end face 62a which has not been cut off but left. Further, IBE is performed in a manner to cause the shield connecting part 62c having the above-described receding tilt structure to appear.

Though the linking shield part 63 itself is used as a mask in the above-described trimming step, a mask such as a photoresist or the like covering the upper face of the linking shield part 63 may be used instead of using the linking shield part 63. More specifically, a mask equal in size to the linking shield part 63 may be formed on the upper face of the linking shield part 63 using photoresist or the like, and the part of the pre-trim front shield part 62A which is not covered with the linking shield part 63 may be cut off using the mask.

Further, with chemical action of gas plasma used in etching, the etching can proceed not only in the vertical direction (the longitudinal direction in FIG. 38) but also in the horizontal direction (the lateral direction in FIG. 38) of the pre-trim front shield part 62A. Therefore, it is preferable to perform non-active IBE, namely, ion milling in the trimming step. Etching performed utilizing physical impact when inactive ions are applied is also called ion milling for distinction from reactive ion etching.

Subsequently, as illustrated in FIG. 1, the displacement suppression layer 85 is formed. After that, the protective insulating layer 90 is formed by an insulating material such as alumina ($Al_2O_3$) so as to cover the displacement suppression layer 85. After that, the ABS 30 is formed by performing polishing processing or mechanical processing to the front end face 30h, whereby the thin-film magnetic head 300 is completed.

The protective insulating layer 90 is formed such as to come into contact with an entire the shield connecting part 62c and be embedded without gap between the shield connecting part 62c and the ABS 30.

(Operation and Effect of Thin-Film Magnetic Head 300)

As in the foregoing, the thin-film magnetic head 300 has the leading shield part 47. The leading shield part 47 has the above-described variable distance structure and thus has a structure in which the rearmost part 47Q is distance more from the main magnetic pole layer 26 than is the foremost part 47R. When such a leading shield part 47 is provided, a gap is ensured between the leading shield part 47 and the main magnetic pole layer 26 at least on the rearmost part 47Q side, so that the size of the magnetic material arranged near the main magnetic pole layer 26 becomes smaller. Therefore, it is unnecessary to decrease the depth W47 of the leading shield part 47 for the purpose of reducing the magnetic flux leaking from the main magnetic pole layer 26 to the leading shield part 47.

Accordingly, the part where the leading shield part 47 is in contact with the lower front shield part 42 is not reduced, and therefore the path for the magnetic flux from the leading shield part 47 toward the lower front shield part 42 is never narrowed. Therefore, the saturation of the magnetic flux is less likely to occur in the leading shield part 47, thus avoiding such a state that the magnetic flux flowing back from the recording medium is not taken into the leading shield part 47 but remains. Accordingly, the thin-film magnetic head 300 can improve Adjacent Track Erasure (ATE) and Wide Area Track Erasure (WATE) more than by the conventional thin-film magnetic head.

Further, in the thin-film magnetic head 300, the second formed angle β is formed to be larger than the first formed angle α. Therefore, the gap is surely ensured between the leading shield part 47 and the main magnetic pole layer 26. In the gap, the middle insulating layer 49 is able to be formed.

Further, the leakage of the magnetic flux from the main magnetic pole layer 26 can be surely reduced by the middle insulating layer 49 so as to prevent the magnetic flux from leaking from the main magnetic pole layer 26 and reaching the leading shield part 47.

The middle insulating layer 49 has the variable thickness structure and therefore can be surely arranged in the gap between the lower tilted surface 26e of the main magnetic pole layer 26 and the upper tilted surface 47a of the leading shield part 47.

Furthermore, since the leading shield part 47 has the front upper tilted surface 47L, only the nonmagnetic thin-film 25 is arranged between the main magnetic pole layer 26 and the leading shield part 47 near the ABS 30. The space for arranging the middle insulating layer 49 is ensured at a part of the leading shield part 47 distanced from the ABS 30. The arrangement space for the middle insulating layer 49 is ensured without decreasing the size of the part of the leading shield part 47 arranged in the ABS 30 (that is, the front end face 47d). Therefore, even if the arrangement space for the middle insulating layer 49 is ensured in the leading shield part 47, the shielding function provided by the leading shield part 47 is never lost. A function of taking in the magnetic flux spreading in the direction different from the direction intersecting the ABS 30 among the magnetic fluxes released from the magnetic pole end face 26a of the main magnetic pole layer 26 to prevent ATE and so on is the shielding function.

Meanwhile, the thin-film magnetic head 300 has the lower front shield part 42. The lower front shield part 42 has the front end convex part 42P, and the front end convex part 42P is a rounded convex-shape part. The magnetic flux then leaks from the main magnetic pole layer 26 to the lower front shield part 42, and when the magnetic flux leaks to the outside of the lower front shield part 42, the magnetic flux proceeds to the outside from the front end convex part 42P while appropriately dispersing as magnetic fluxes B0, B1, B2 as illustrated in FIG. 10(a).

However, since the front end convex part 42P is a rounded gentle convex-shape part, the difference in intensity among the magnetic fluxes B0, B1, B2 is little. Therefore, even when the magnetic fluxes B0, B1, B2 reach the recording medium, there hardly occur a poor condition that the data recorded on the recording medium is erased or rewritten. Accordingly, data erasure and the like are reduced.

On the other hand, since the front end angle of the lower front shield part 712 is set at a right angle in the conventional thin-film magnetic head 700 as illustrated in FIG. 10(b), the convex part 712P is sharply angulated. Therefore, when magnetic fluxes leak from the main magnetic pole layer 710 to the lower front shield part 712, the magnetic fluxes tend to concentrate to the convex part 712P. Accordingly, the intensity of the magnetic flux B0 at the middle becomes stronger than those of the magnetic fluxes B1, B2 on the outside thereof. Therefore, when the magnetic fluxes B0, B1, B2 reach the recording medium, the strongest magnetic flux B0 often causes the poor condition that the data recorded on the recording medium is erased or rewritten.

As described above, the thin-film magnetic head 300 according to the embodiment of the present invention has the lower front shield part 42 and is thereby configured to be able to reduce the data erasure and the like caused from the structure of the shield magnetic layer.

Further, the front end convex part 42P corresponds to the corner part where the front end face 42a intersects the tilted lower end face 42b. Since the front end angle Xα is set at an obtuse angle, an angle formed between the front end face 20b and the tilted upper end face 20a of the opposing insulating layer 20 in contact with the lower front shield part 42 (an angle measured counterclockwise from the front end face 20b to the tilted upper end face 20a, referred also to as a counter-front end angle) becomes an acute angle. Then the volume of the acute part facing the lower front shield part 42 in the front end face 20b of the opposing insulating layer 20 (precisely, the front end face 30h) is smaller than the case that the counter-front end angle is set at a right angle. For this reason, when the polishing processing or mechanical processing to the front end face 30h is performed in order to form the ABS 30, the acute part facing the lower front shield part 42 is likely to chip (the above-described chipped end part 20d is formed caused from this chipping). Accompanying the chipping of the acute part, a small gap is formed at a boundary part between the lower front shield part 42 and the opposing insulating layer 20. Then, polishing proceeds not only from the direction intersecting the ABS 30 but also from a direction different therefrom at the boundary part of the front end face 42a with the opposing insulating layer 20 in the lower front shield part 42, resulting in formation of the rounded front end convex part 42P. By setting the front end angle Xα of the lower front shield part 42 to an obtuse angle as described above, the front end convex part 42P can be easily and surely formed.

Note that when the front end angle is set at a right angle as in the prior art, the counter-front end angle is also set at a right angle. Then, the corner parts at right angles of the lower front shield part 42 and the opposing insulating layer 20 face each other at the front end face 30h, so that the corner part facing the lower front shield part 42 never chips. Accordingly, the rounded front end convex part 42P is not formed.

Further, the thin-film magnetic head 300 has the opposing insulating layer 20 and its tilted upper end face 20a is formed in a descending slope like shape. Therefore, when a magnetic layer in contact with the opposing insulating layer 20 is formed, the front end angle of the magnetic layer becomes an obtuse angle. Accordingly, by forming a magnetic layer to overlie the opposing insulating layer 20, the lower front shield part 42 is obtained, so that the lower front shield part 42 can be surely formed.

Further, the thin-film magnetic head 300 has the connecting shield part 41, and the upper end face 41a and the front end face 41b are connected to the lower front shield part 42. Therefore, the contact area between the lower front shield part 42 and the connecting shield part 41 is made larger than the case that the front end angle is set at a right angle. Accordingly, the magnetic flux is surely transmitted from the lower front shield part 42 to the connecting shield part 41.

Meanwhile, the thin-film magnetic head 300 is structured such that only the upper front shield part 62 is formed as the magnetic layer which is to be disposed between the opposing shield part 61 and the linking shield part 63. Therefore, as compared to the case where the two magnetic layers such as the front shield part 703 and the connecting shield part 702 are formed between the opposing shield part 701 and the linking shield part 704 as in the above-described conventional PMR 700, the length of the magnetic path along the top-down direction is shorter so that the magnetic path length is able to be reduced in the thin-film magnetic head 300.

Hence, the thin-film magnetic head 300 is able to improve the flux rise time, non-linear transition shift (NLTS) characteristic, overwrite characteristic, and the like of the recording head, and follow rapid changes in recording signals having a high frequency and changing fast. This makes the thin-film magnetic head 300 suitable as a recording head for hard disk drives mounted to servers in particular.

In addition, the upper front shield part 62 has a lateral width capable of reaching, from the ABS 30, the upper thin-film coil 51 via the interlayer insulating layer 32. Therefore, even though the write shield layer 60 has a different-distance structure, the upper front shield part 62 is surely connected to both of the opposing shield part 61 and the linking shield part 63. Accordingly, the opposing shield part 61 opposing the main magnetic pole layer 26 and the linking shield part 63 straddling the turn parts 51g, 51e, 51c of the upper thin-film coil 51 are liked together as a continuous line and are able to form the magnetic circuit as a continuous line. Note that the different-distance structure means a structure that the respective distances of the opposing shield part 61 and the linking shield part 63 from the ABS 30 are different because the opposing shield part 61 is disposed in the ABS 30 and the linking shield part 63 is receded from the ABS 30.

A structure is discussed here which is intended to surely connect both of the opposing shield part 61 and the linking shield part 63 by the upper front shield part 62 in the different-distance structure of the write shield layer 60. Since the sizes of the upper end face and the lower end face are maximum when the whole front end face is disposed in the ABS 30 as in the pre-trim front shield part 62A, it is preferable that the whole front end face is disposed in the ABS 30 like the pre-trim front shield part 62A in order to realize the aforementioned structure.

However, this causes the pre-trim front end face 62a to be largely exposed in the ABS 30. The upper front shield part 62 and the pre-trim front shield part 62A are formed of a magnetic material made of a ferromagnetic body such as CoNiFe, CoFe, CoFeN, NiFe or the like. Therefore, if the whole pre-trim front end face 62a is exposed in the ABS 30 like the pre-trim front shield part 62A, the pre-trim front shield part 62A will be affected more strongly when the photoresist layer 55 expands due to the heat generation of the upper thin-film coil 51.

Since the frying height is very small, collision between the thin-film magnetic head 300 and the recording medium can occur even when only a limited and small part of the pre-trim front end face 62a projects. That the whole pre-trim front end face 62a is exposed in the ABS 30 means that many such small parts which will project exist in the ABS 30, which means that there are accordingly many projecting forms which can collide with the recording medium and collision between the thin-film magnetic head 300 and the recording medium is more likely to occur.

Hence, in the thin-film magnetic head 300, the upper front shield part 62 having the structure illustrated on the lower side in FIG. 12 is formed. Thus, the part exposed in the ABS 30 is the shield front end face 62b.

Further, in the upper front shield part 62, the shield upper end face 62f is disposed at a position distanced more from the substrate 1 than is the shield front end face 62b, and the upper front shield part 62 has the shield connecting part 62c connecting the shield front end face 62b to the shield upper end face 62f. In such a structure, the front end face disposed in the ABS 30 is smaller in size than that when the shield upper end face 62f reaches the ABS 30, namely, the pre-trim front shield part 62A as illustrated on the upper side in FIG. 12. Therefore, provision of the upper front shield part 62 makes it possible to suppress the situation that the thin-film magnetic head 300 collides with the recording medium.

Hence, the thin-film magnetic head 300 is able to restrain the write shield layer 60 from projecting as the upper thin-film coil 51 generate heat especially. Consequently, the thin-film magnetic head 300 is very unlikely to be damaged by the protrusion of the recording head and thus can approach recording media.

While the thin-film magnetic head 300 is incorporated in an undepicted slider, the flying height of the slider from the recording medium surface can be reduced. Therefore, the thin-film magnetic head 300 can enhance the resolution of recording and reproducing heads, thereby improving their signal-to-noise ratio. This can also increase the recording density of the thin-film magnetic head 300.

On the other hand, the upper front shield part 62 is formed, after the formation of the linking shield part 63, by cutting off a part thereof on the ABS 30 side where the linking shield part 63 is not in contact therewith. For this reason, though the part exposed in the ABS 30 is small, the shield upper end face 62f is surely ensured, resulting in a structure in which the upper front shield part 62 and the linking shield part 63 can be surely connected.

Further, when cutting off the part of the upper front shield part 62 on the ABS 30 side, the shield front end face 62b is ensured so that a part of the pre-trim front end face 62a is left as the shield front end face 62b without cutting off the whole pre-trim front end face 62a. If IBE proceeds to the degree that the shield front end face 62b is not ensured when cutting off the part of the pre-trim front shield part 62A on the ABS 30 side, the shield lower end face 62r can also be cut off. In this case, the part which is to be connected to the opposing shield part 61 becomes smaller, so that the connection between the opposing shield part 61 and the upper front shield part 62 can be insufficient. However, there is no such possibility in the thin-film magnetic head 300.

Further, the upper front shield part 62 has the shield connecting part 62c, and the shield connecting part 62c has the tilt structure. Therefore, the upper front shield part 62 has a structure which can be surely formed by the above-described IBE from the upper direction. Without the tilt structure, for example, when a surface part extending from the shield front end face 62b to the shield upper end face 62f is bent in an S-shape, it is difficult to form the upper front shield part 62 by IBE. However, in the thin-film magnetic head 300, there is no such possibility and the upper front shield part 62 is able to be surely formed by IBE from the upper direction.

Further, since the shield connecting part 62c has the receding tilt structure, the volume of the upper front shield part 62 is reduced as compared to the case without the receding tilt structure. This further suppresses the possibility of projection of the upper front shield part 62.

Further, the shield connecting part 62c has the lateral flat part 62c1. The lateral flat part 62c1 is generally formed along the direction intersecting the ABS 30. Accordingly, the shield connecting part 62c is able to surely receive the pressure received in the longitudinal direction from the embedded part 90a of the protective insulating layer 90 as compared to the case without the lateral flat part 62c1. Accordingly, in the thin-film magnetic head 300, the embedding state of the protective insulating layer 90 is stable.

Additionally, the shield connecting part 62c has the longitudinal flat part 62c2. The longitudinal flat part 62c2 is generally formed along the ABS 30. Accordingly, the upper front shield part 62 has a structure which can be surely formed by IBE from the upper direction or the like to the pre-trim front shield part 62A.

As has been described, in the thin-film magnetic head 300, the magnetic path length can be reduced and projection of a part of the ABS 30 can be suppressed, so that both of the suppression of projection of a part of the medium-opposing surface and the reduction in magnetic path length can be realized. Accordingly, the thin-film magnetic head 300 is configured such that the projection of a part of the ABS 30 can be suppressed without affecting the reduction in magnetic path length.

Since the lower thin-film coil 11 and upper thin-film coil 51 have the variable width structures as mentioned above, current flows are less likely to be obstructed, whereby the resistance value is able to be restrained from rising. Accordingly, generation of heat from the lower thin-film coil 11 and the upper thin-film coil 51 are able to be suppressed effectively in the thin-film magnetic head 300.

Second Embodiment

Figure 40:
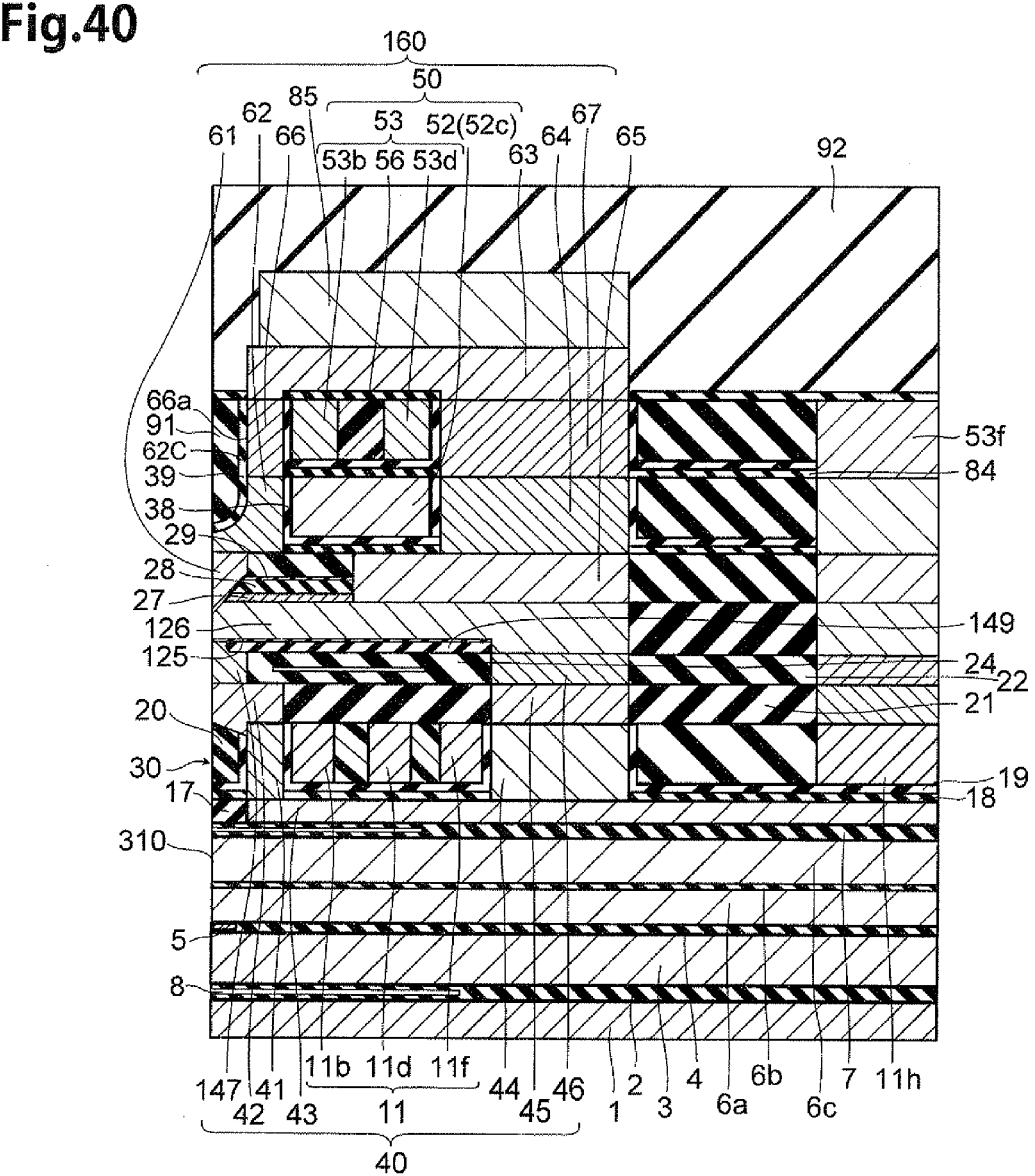
FIG. 40 is a sectional view, corresponding to FIG. 1, of the thin-film magnetic head according to a second embodiment of the present invention along by a direction intersecting its air bearing surface.
Figure 41:
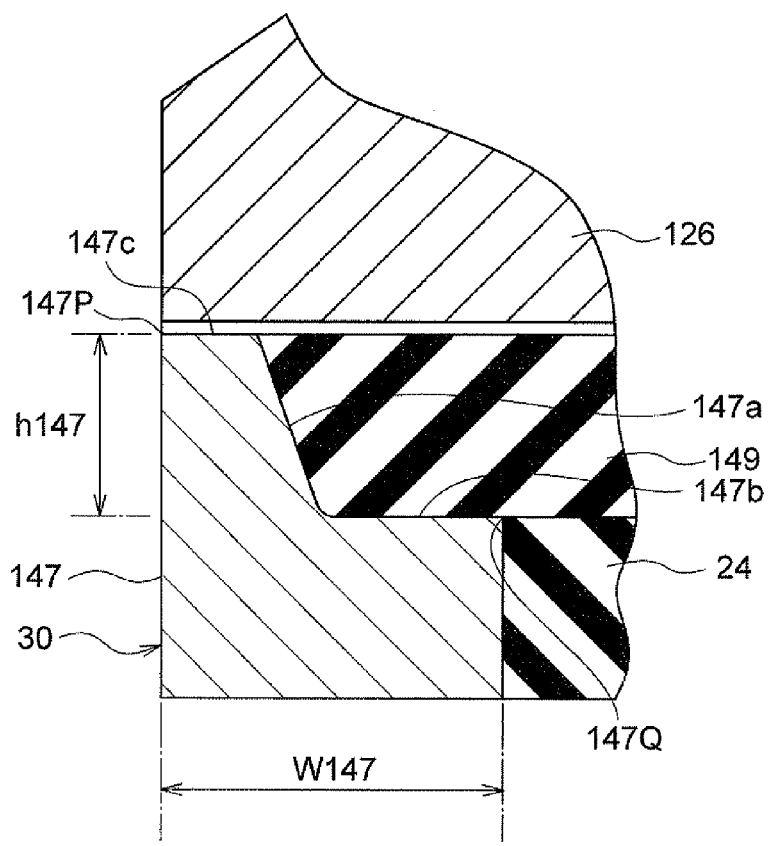
FIG. 41 is a sectional view illustrating an enlarged principal part of a leading shield part, a middle insulating layer and a main magnetic pole layer in FIG. 40.
Figure 43:
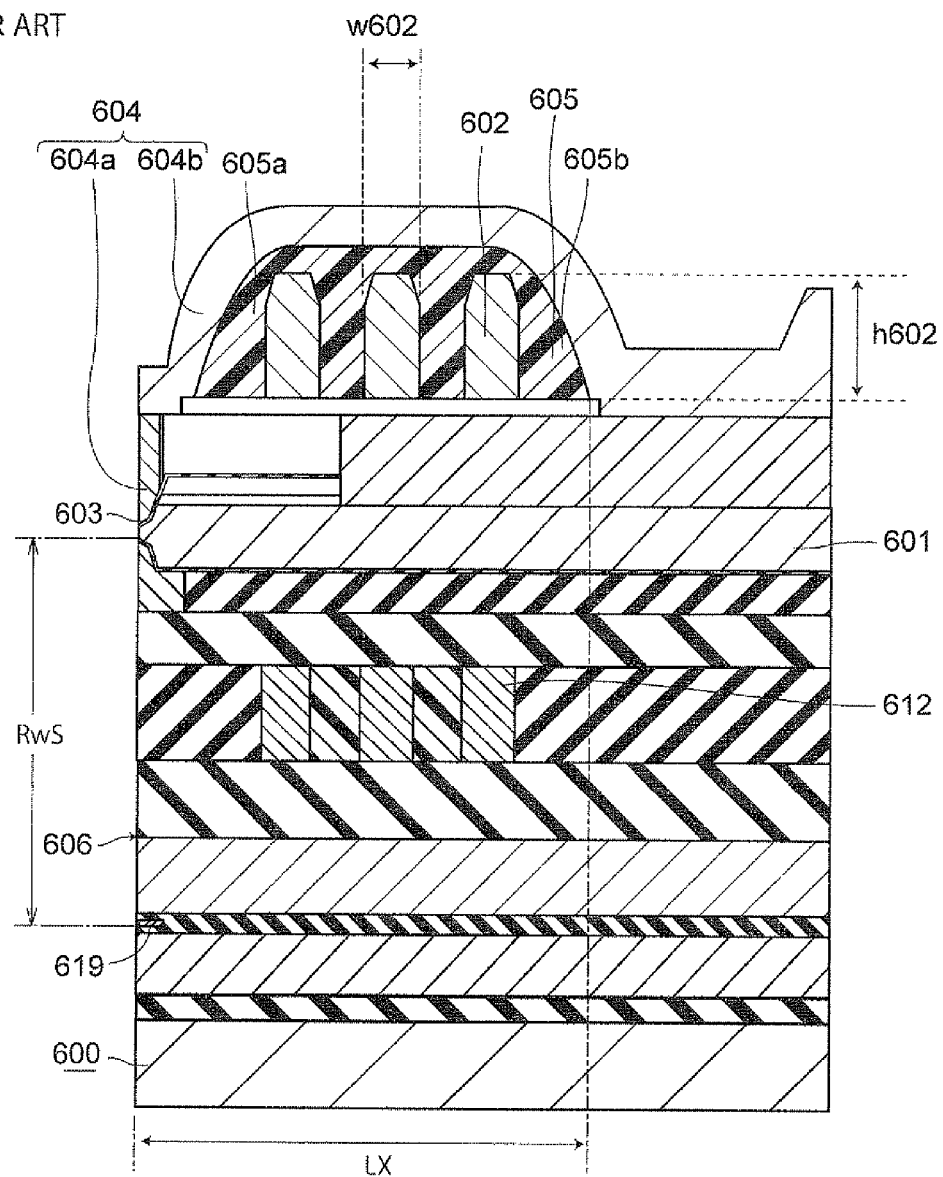
FIG. 43 is a sectional view illustrating an example of a conventional thin-film magnetic head.
Figure 44:
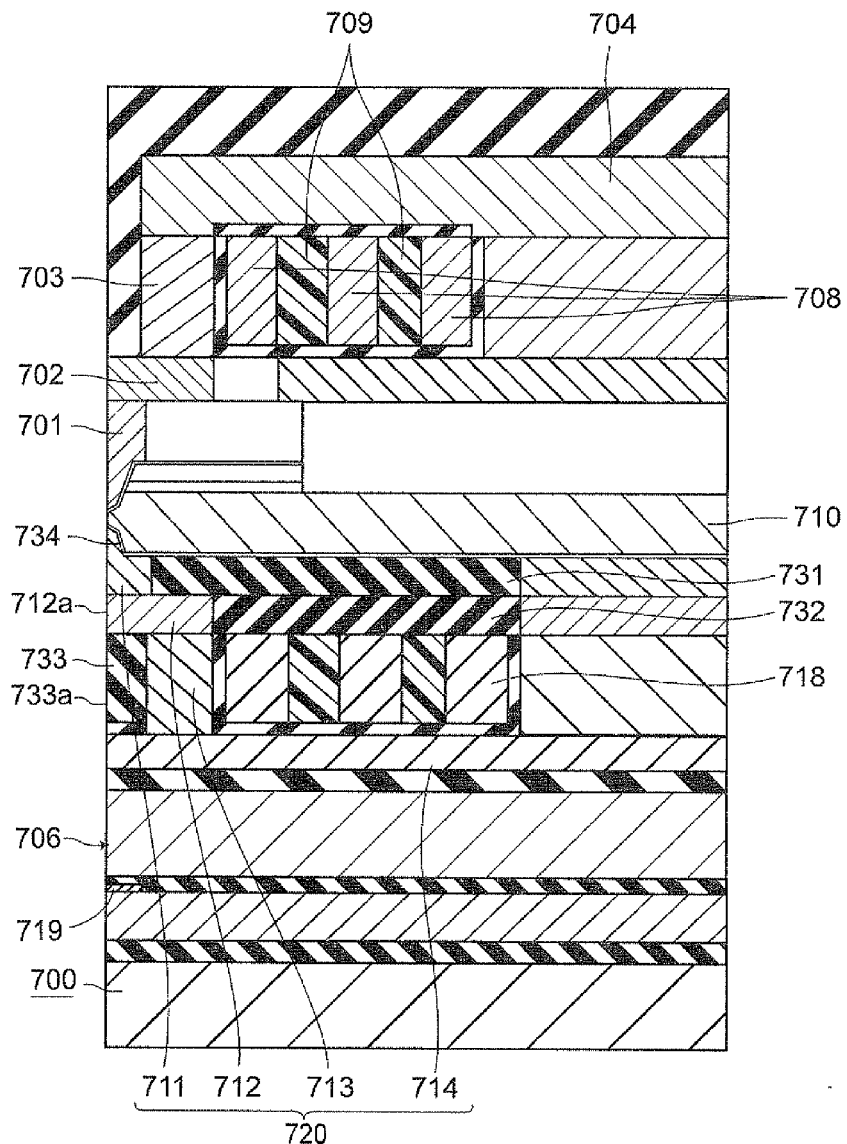
FIG. 44 is a sectional view illustrating an another conventional thin-film magnetic head.

The thin-film magnetic head of perpendicular magnetic recording type according to the second embodiment of the present invention will now be explained with reference to FIG. 40, FIG. 41. Here, FIG. 40 is a sectional view of the thin-film magnetic head 310 according to a second embodiment of the present invention corresponding to FIG. 1, along by a direction intersecting ABS 30. FIG. 41 is a sectional view illustrating an enlarged principal part of a leading shield part 147, a middle insulating layer 149 and a main magnetic pole layer 126.

Since the thin-film magnetic head 310 includes configurations identical to those of the thin-film magnetic head 300, configurations of the thin-film magnetic head 310 different from those of the thin-film magnetic head 300 will mainly be explained in the following, while omitting or simplifying their common configurations.

The recording head of the thin-film magnetic head 310 is different in that it has the main magnetic pole layer 126, the leading shield part 147 and the middle insulating layer 149 in place of the main magnetic pole layer 26, the leading shield part 47 and the middle insulating layer 49, as compared with the recording head of the thin-film magnetic head 300. Besides, the recording head of the thin-film magnetic head 310 is different in that it has an upper thin-film coil 50 in place of the upper thin-film coil 51, and that it has the write shield layer 160 in place of the write shield layer 60, as compared with the recording head of the thin-film magnetic head 300. Further, the recording head of the thin-film magnetic head 310 is different in that it has a continuous insulating film 39, and that it has the protective insulating layer 91 and the protective insulating layer 92 in place of the protective insulating layer 90, as compared with the recording head of the thin-film magnetic head 300.

The main magnetic pole layer 126 has a lower surface that is a flat surface, unlike the main magnetic pole layer 26. The leading shield part 147 has an upper tilted surface 147a, a first flat surface 147c, and a second flat surface 147b.

The upper tilted surface 147a connects the first flat surface 147c and the second flat surface 147b and is formed in a descending slope like shape distanced more from the ABS 30 as it is closer from the first flat surface 147c to the second flat surface 147b. The first flat surface 147c has a size of about 0.1 μm and has a foremost part 147P. Further, the first flat surface 147c is formed along the direction intersecting the ABS 30.

The foremost part 147P is arranged in the ABS 30 and arranged at a position closest to the main magnetic pole layer 126 in the leading shield part 147. The second flat surface 147b has a rearmost part 147Q and is formed along the direction intersecting the ABS 30. In the leading shield part 147, a height h147 illustrated in FIG. 41 is formed in a size of about 0.1 μm to 0.3 μm. Further, a depth W147 is formed in a size of about 0.5 μm.

The middle insulating layer 149 is arranged between the main magnetic pole layer 126 and the leading shield part 147. The middle insulating layer 149 has a structure in which a width in the direction intersecting the ABS 30 increases as it is closer to the main magnetic pole layer 126. In this embodiment, such a structure is called a variable width structure.

In the thin-film magnetic head 310, the surfaces of the first flat surface 147c of the leading shield part 147 and the middle insulating layer 149 are formed in a shape according to the shape of lower surface of the main magnetic pole layer 126.

As described above, in the thin-film magnetic head 310, the leading shield part 147 has the foremost part 147P and the rearmost part 147Q and has the variable distance structure as with the leading shield part 47. Accordingly, also in the thin-film magnetic head 310, a gap is ensured between the leading shield part 147 and the main magnetic pole layer 126 on the rearmost part 147Q side as in the thin-film magnetic head 300, so that the magnetic material arranged near the main magnetic pole layer 126 is reduced. Therefore, it is unnecessary to decrease the depth W147 of the leading shield part 147 for the purpose of reducing the magnetic flux leaking from the main magnetic pole layer 126 to the leading shield part 147. Further, the saturation of the magnetic flux is less likely to occur also in the leading shield part 147 as in the leading shield part 47, thus avoiding such a state that the magnetic flux flowing back from the recording medium is not taken into the leading shield part 147 but remains. Therefore, the thin-film magnetic head 310 can also improve Adjacent Track Erasure (ATE) and Wide Area Track Erasure (WATE).

Further, the leakage of the magnetic flux from the main magnetic pole layer 126 can be surely reduced by the middle insulating layer 149.

Meanwhile, in the above-described thin-film magnetic head 300, both of the lower thin-film coil 11 and the upper thin-film coil 51 have a single-layer structure. A structure that the turn parts are arranged in the direction intersecting the ABS 30 and not overlapped in the direction along the ABS 30 is the single-layer structure. However, in the thin-film magnetic head 310, the lower thin-film coil 11 has the single-layer structure, whereas the upper thin-film coil 50 has an overlapping structure by two layers.

The upper thin-film coil 50 has the first coil-layer 52 and second coil-layer 53 arranged at positions separated from the ABS 30, while an upper conductor group is constituted by the first coil-layer 52 and second coil-layer 53.

Further, the first coil-layer 52 and second coil-layer 53 arranged in the direction (up and down direction) along the ABS 30. The second coil-layer 53 overlies the first coil-layer 52 while interposing the coil interlayer insulating layer 84 therebetween. The upper thin-film coil 50 has the overlapping structure by two layers. The upper thin-film coil 50 has an equidistant two-stage structure in which the first and second coil-layers 52, 53 have the same front distance and the same rear distance.

The first coil-layer 52 have the turn parts 52c. The turn parts 52c is arranged between the first upper front shield part 62 and the first rear shield part 64. The first coil-layer 52 is wound as a flat spiral about the write shield layer 160, thus forming a two-turn loop as a whole.

The second coil-layer 53 has two turn parts 53b, 53d. The turn parts 53b, 53d are arranged between a later-described second upper front shield part 66 and a second rear shield part 67. The second coil-layer 53 has a structure which the turn parts 53b, 53d align with each other while interposing a photoresist layer 56 therebetween.

The second coil-layer 53 is wound as a flat spiral about the write shield layer 160, thus forming a two-turn loop as a whole. For convenience of illustration, FIG. 40 illustrates only the connecting part 53f and the turn parts 53b, 53d, in the second coil-layer 53. Besides, the second coil-layer 53 has the variable width structure similarly to the lower thin-film coil 11.

The first coil-layer 52 and the second coil-layer 53 connect with each other, whereby the upper thin-film coil 50 forms a continuous 3-turn loop.

Namely, the upper thin-film coil 50 has a (1+2) turn structure in which the first coil-layer 52 forms a 1-turn loop, and the second coil-layer 53 positioned directly thereabove forms a 2-turn loop, thereby yielding a 3-turn loop. The (A+B) turn structure in this embodiment refers to an overlapping structure in which a coil-layer having "B" turns overlies a coil-layer having "A" turns.

The write shield layer 160 is different in that it has the second upper front shield part 66 and the second rear shield part 67, as compared with the write shield layer 60.

The second upper front shield part 66 is connected to the first upper front shield part 62 and the linking shield part 63. The entire second upper front shield part 66 is arranged at positions separated from the ABS 30. The second upper front shield part 66 is connected to the first upper front shield part 62 without straddling the turn parts 53b, 53d of the second coil-layer 53. Besides, the second upper front shield part 66 is arranged closer to the ABS 30 than are the second coil-layer 53 constituting the upper thin-film coil 50.

The second rear shield part 67 is connected to the first rear shield part 64 and the linking shield part 63. The second rear shield part 67 has the lateral width corresponding to the first rear shield part 64.

The continuous insulating film 39 is continuously formed extending from the front end face 66a of the second upper front shield part 66 to the shield connecting part 62c on the surface of the front end face 66a and the shield connecting part 62c.

Besides, the thin-film magnetic head 310 has the lower thin-film coil 11 and the upper thin-film coil 50. Both of the lower thin-film coil 11 and the upper thin-film coil 50 have three turns respectively. However, the upper thin-film coil 50 has an overlapping structure by the first coil-layer 52 and the second coil-layer 53. Therefore, the upper thin-film coil 50 is able to secure 3 turns, while having only 1 or 2 turns per plane. Accordingly, the thin-film magnetic head 310 is able to reduce the depth from the ABS 30.

In addition, the thin-film magnetic head 310 has a first upper front shield part 62 similar to that of the thin-film magnetic head 300. This first upper front shield part 62 also has a shield front end face 62b, a shield upper end face 62f and a shield connecting part 62c as in the thin-film magnetic head 300, and a part exposed in the ABS 30 is the shield front end face 62b. Therefore, in the thin-film magnetic head 310, the front end face disposed in the ABS 30 is smaller in size than the pre-trim front end face 62a as illustrated on the upper side in FIG. 12. Accordingly, the possibility of projection of the first upper front shield part 62 can be suppressed. Therefore, the thin-film magnetic head 310 is configured such that the projection of a part of the ABS 30 can be suppressed without affecting the reduction in magnetic path length as in the thin-film magnetic head 300.

Further, the front end face 66a of the second front shield part 66 is a flat front end face and connected without level difference to the shield connecting part 62c. Therefore, it is possible to surely form the continuous insulating film 39 on the second front shield part 66 and the first upper front shield part 62. Further, in the trimming step, since the parts of the second shield part and the first shield part on the ABS 30 side are collectively cut off, a continuous flat face without level difference can be surely formed. In addition, it is unnecessary to align the second front shield part 66 with the shield upper end face 62f of the first upper front shield part 62, so that the manufacturing steps are able to be accordingly simplified.

(Embodiments of Head Gimbal Assembly and Hard Disk Drive)

Next, embodiments of the head gimbal assembly and hard disk drive will now be explained with reference to FIG. 42.

FIG. 42 (a) is a perspective view illustrating a hard disk drive 201 equipped with the above-mentioned thin-film magnetic head 300. FIG. 42 (b) is a perspective view illustrating a rear side of HGA 210. As illustrated in FIG. 42 (a), the hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding thin-film magnetic head 300.

The hard disk drive 201 positions a slider 208 illustrated in FIG. 42 (b) on a track by an assembly carriage device 203. The thin-film magnetic head 300 is formed on this slider 208. Further, the hard disk drive 201 has a plurality of drive arms

209. The drive arms pivot about a pivot bearing shaft 206 by means of a voice coil motor (VCM) 205, and are stacked in a direction along the pivot bearing shaft 206. Further, an HGA 210 is attached to the tip of each drive arm.

Further, the hard disk drive 201 has a control circuit 204 controlling recording/reproducing.

The HGA 210 will now be described with reference to FIG. 42 (*b*). In the HGA 210, the slider 208 is fixed to a tip portion of a suspension 220. Further, in the HGA 210, one end portion of a wiring member 224 is electrically connected to a terminal electrode of the slider 208.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

In the hard disk drive 201, when the HGA 210 is rotated, the slider 208 moves in a radial direction of the hard disk 202, i.e., a direction traversing track lines.

Such HGA 210 and hard disk drive 201 have the thin-film magnetic head 300 are able to improve ATE and WATE.

Especially, in the hard disk drive 201 having the thin-film magnetic head 300, the magnetic path length can be made shorter than the hard disk drive 201 having the conventional thin-film magnetic head 700. Therefore, the inductance of the thin-film magnetic head 300 is able to be reduced. Accordingly, it is possible to pass recording signals having a high frequency through the thin-film coil and increase the recording density on the recording medium.

In the each above-described embodiments, the thin-film magnetic head having the displacement suppression layer is explained by way of example. The present invention is also applicable to thin-film magnetic head not having the displacement suppression layer. Besides, the thin-film coil is wound as a flat spiral about the shield magnetic layer 40, the write shield layer 60, but the thin-film coil may be wound about the main magnetic pole layer 26.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thin-film magnetic head comprising:
a main magnetic pole layer having a magnetic pole end face on a side of a medium-opposing surface opposing a recording medium;
a write shield layer having a write shield end face disposed in the medium-opposing surface;
a gap layer formed between the main magnetic pole layer and write shield layer;
a shield magnetic layer connected to the main magnetic pole layer; and
a thin-film coil wound around any of the main magnetic pole layer, the write shield layer or the shield magnetic layer, wherein
the main magnetic pole layer, the write shield layer, the gap layer and the thin-film coil are laminated on a substrate, and
the shield magnetic layer includes a leading shield part arranged on a substrate side of the main magnetic pole layer and arranged on the medium-opposing surface side of the thin-film coil, and the leading shield part has a variable distance structure in which a rearmost part most distanced from the medium-opposing surface on the main magnetic pole layer side is distanced more from the main magnetic pole layer than is a foremost part closest to the medium-opposing surface on the main magnetic pole layer side, an upper tilted surface formed in a descending slope like shape closer to the substrate as the upper tilted surface is distanced more from the medium-opposing surface, and
a flat surface, the flat surface being distanced more from the medium-opposing surface than the upper tilted surface.

2. The thin-film magnetic head according to claim 1, wherein the main magnetic pole layer has a lower tilted surface formed in a descending slope like shape closer to the substrate as the lower tilted surface is distanced more from the medium-opposing surface, the leading shield part has a front upper tilted surface along the lower tilted surface of the main magnetic pole layer at a position closer to the medium-opposing surface than is the upper tilted surface, and an angle between the upper tilted surface and the medium-opposing surface is larger than an angle between the lower tilted surface and the medium-opposing surface.

3. The thin-film magnetic head according to claim 2, wherein the front upper tilted surface is arranged closer to the main magnetic pole layer than is the upper tilted surface.

4. The thin-film magnetic head according to claim 3, wherein a depth of the upper tilted surface along a direction intersecting the medium-opposing surface is formed to be larger than a depth of the front upper tilted surface along the intersecting direction in the leading shield part.

5. The thin-film magnetic head according to claim 2, further comprising:
a middle insulating layer having a variable thickness structure in which a thickness in a direction along the medium-opposing surface becomes larger as the middle insulating layer is distanced more from the medium-opposing surface, the middle insulating layer being not arranged between the front upper tilted surface of the leading shield part and the lower tilted surface of the main magnetic pole layer but being arranged between the upper tilted surface and the lower tilted surface; and
a nonmagnetic thin-film arranged between the main magnetic pole layer and the leading shield part.

6. The thin-film magnetic head according to claim 1, further comprising:
a middle insulating layer arranged between the main magnetic pole layer and the leading shield part and having a variable thickness structure in which a thickness in a direction along the medium-opposing surface becomes larger as the middle insulating layer is distanced more from the medium-opposing surface; and
a nonmagnetic thin-film arranged between the main magnetic pole layer and the leading shield part.

7. The thin-film magnetic head according to claim 6, further comprising:
a base insulating layer formed on a side of a rear surface of the leading shield part distanced from the medium-opposing surface, wherein the middle insulating layer is formed across the leading shield part and the base insulating layer.

8. The thin-film magnetic head according to claim 1, wherein the shield magnetic layer further includes:
a linking shield part;
a lower front shield part disposed on the substrate side of the leading shield part; and
a connecting shield part, wherein
the leading shield part is connected to the linking shield part by the lower front shield part and the connecting shield part, and
the leading shield part is formed such that a rearmost height including the rearmost part is smaller than a foremost height including the foremost part along the medium-opposing surface.

9. The thin-film magnetic head according to claim 1, wherein the shield magnetic layer comprises a lower front shield part disposed on the substrate side of the leading shield part, and a front end angle representing an angle formed between a front end face disposed in the medium-opposing surface of the lower front shield part and a lower end face connected to the front end face and disposed at a position closest to the substrate in the lower front shield part is set at an obtuse angle.

10. The thin-film magnetic head according to claim 9, wherein when a part where the front end face and the lower end face of the lower front shield part intersect each other is a front end convex part, the front end convex part corresponds to a convex-shape part where the front end face and the lower end face intersect each other more gently than a case that the front end angle is set at a right angle.

11. A head gimbal assembly comprising a thin-film magnetic head formed on a support and a gimbal for securing the support, wherein
the thin-film magnetic head includes:
a main magnetic pole layer having a magnetic pole end face on a side of a medium-opposing surface opposing a recording medium;
a write shield layer having a write shield end face disposed in the medium-opposing surface;
a gap layer formed between the main magnetic pole layer and write shield layer;
a shield magnetic layer connected to the main magnetic pole layer; and
a thin-film coil wound around any of the main magnetic pole layer, the write shield layer or the shield magnetic layer, wherein
the main magnetic pole layer, the write shield layer, the gap layer and the thin-film coil are laminated on a substrate, and
the shield magnetic layer includes a leading shield part arranged on a substrate side of the main magnetic pole layer and arranged on the medium-opposing surface side of the thin-film coil, and the leading shield part has a variable distance structure in which a rearmost part most distanced from the medium-opposing surface on the main magnetic pole layer side is distanced more from the main magnetic pole layer than is a foremost part closest to the medium-opposing surface on the main magnetic pole layer side, an upper tilted surface formed in a descending slope like shape closer to the substrate as the upper tilted surface is distanced more from the medium-opposing surface, and a flat surface, the flat surface being distanced more from the medium-opposing surface than the upper tilted surface.

12. A hard disk drive comprising a head gimbal assembly having a thin-film magnetic head and a recording medium opposing the thin-film magnetic head, wherein
the thin-film magnetic head includes:
a main magnetic pole layer having a magnetic pole end face on a side of a medium-opposing surface opposing a recording medium;
a write shield layer having a write shield end face disposed in the medium-opposing surface;
a gap layer formed between the main magnetic pole layer and write shield layer;
a shield magnetic layer connected to the main magnetic pole layer; and
a thin-film coil wound around any of the main magnetic pole layer, the write shield layer or the shield magnetic layer, wherein
the main magnetic pole layer, the write shield layer, the gap layer and the thin-film coil are laminated on a substrate, and
the shield magnetic layer includes a leading shield part arranged on a substrate side of the main magnetic pole layer and arranged on the medium-opposing surface side of the thin-film coil, and the leading shield part has a variable distance structure in which a rearmost part most distanced from the medium-opposing surface on the main magnetic pole layer side is distanced more from the main magnetic pole layer than is a foremost part closest to the medium-opposing surface on the main magnetic pole layer side, an upper tilted surface formed in a descending slope like shape closer to the substrate as the upper tilted surface is distanced more from the medium-opposing surface, and a flat surface, the flat surface being distanced more from the medium-opposing surface than the upper tilted surface.

* * * * *